United States Patent [19]

Hutchins

[11] Patent Number: 5,222,188
[45] Date of Patent: Jun. 22, 1993

[54] METHOD AND APPARATUS FOR SPEECH RECOGNITION BASED ON SUBSYLLABLE SPELLINGS

[75] Inventor: Sandra E. Hutchins, Del Mar, Calif.

[73] Assignee: Emerson & Stern Associates, Inc., San Diego, Calif.

[21] Appl. No.: 570,459

[22] Filed: Aug. 21, 1990

[51] Int. Cl.⁵ .............................................. G10L 5/04
[52] U.S. Cl. ......................................................... 395/2
[58] Field of Search ................................... 381/41–46; 364/513.5

[56] References Cited

U.S. PATENT DOCUMENTS

| | | | |
|---|---|---|---|
| 4,277,644 | 7/1981 | Levinson et al. | 381/43 |
| 4,581,756 | 4/1986 | Togawa et al. | 381/43 |
| 4,665,548 | 5/1987 | Kahn | 381/43 |
| 4,696,042 | 9/1987 | Goudie | 381/41 |
| 4,833,712 | 5/1989 | Bahl et al. | 381/43 |
| 4,852,180 | 7/1989 | Levinson | 381/43 |
| 4,888,823 | 12/1989 | Nitta et al. | 381/43 |
| 4,975,959 | 12/1990 | Benbassatt | 381/41 |
| 4,980,917 | 12/1990 | Hutchins | 381/41 |
| 4,994,966 | 2/1991 | Hutchins | 364/900 |
| 4,996,707 | 2/1991 | O'Malley et al. | 381/52 |

Primary Examiner—Michael R. Fleming
Assistant Examiner—Michelle Doerrler
Attorney, Agent, or Firm—Burns, Doane, Swecker & Mathis

[57] ABSTRACT

In a digital computer, there is provided a method of recognizing speech, comprising the steps of: entering a cohesive speech segment; determining gross acoustic attributes of the entered segment; determining fine acoustic attributes of the entered segment; assigning at least one subsyllable to the entered segment based on the gross and fine acoustic attributes determined; repeating the foregoing steps on successive cohesive speech segments to generate at least one sequence of subsyllables; converting the sequence of subsyllables into a sequence of syllables by finding the sequence of subsyllables in a table in which predetermined subsyllable sequences correspond with respective syllables and syllable sequences; combining the converted sequence of syllables into words; and verifying the conformance of the words to a first predetermined set of grammatical rules. An apparatus implementing the method is also disclosed.

20 Claims, 39 Drawing Sheets $$\left.\begin{array}{l}\text{FREQUENCY}\\ \text{COMM\_1}\\ \text{UNIFORM}\\ \text{U-H-F}\end{array}\right\}\left\{\begin{array}{l}2\left\{\begin{array}{l}20\ \{5\text{-}9\}\\ 30\text{-}90\ (1\text{-}9)\end{array}\right\}\\ 3\left\{\begin{array}{l}\text{OH }\{0\text{H-}9\}\\ \text{TEENS}\\ 20\text{-}90\ (1\text{-}9)\end{array}\right\}\end{array}\right\}\left\{\begin{array}{l}\text{POINT}\\ \text{DECIMAL}\end{array}\right\}\{\text{OH, 0-9}\}$$

$$\left.\begin{array}{l}\text{FREQUENCY}\\ \text{COMM\_2}\\ \text{VICTOR}\\ \text{V-H-F}\end{array}\right\}1\left\{\begin{array}{l}\text{TEENS}\\ \{20\text{-}50\}\ (1\text{-}9)\\ \text{OH }\{\text{OH,0-9}\}\\ \{0\text{-}9\}\{\text{OH,0-9}\}\end{array}\right\}\left\{\begin{array}{l}\text{POINT}\\ \text{DECIMAL}\end{array}\right\}\left\{\begin{array}{l}\{10,12,15,17\}\\ \{20\text{-}90\}\ (2,5,7)\\ \text{OH }\{\text{OH,0,2,5,7}\}\\ \{0\text{-}9\}\{\text{OH,0,2,5,7}\}\end{array}\right\}$$

$$\text{I-L-S}\ \ 1\left\{\begin{array}{l}\{\text{OH, 0, 1}\}\{8\text{-}9\}\\ \{10,\ 11\}\end{array}\right\}\left\{\begin{array}{l}\text{POINT}\\ \text{DECIMAL}\end{array}\right\}\{\text{OH, 0-9}\}$$

$$\left.\begin{array}{l}\text{BUTTON}\\ \text{CHANNEL}\end{array}\right\}\left\{\begin{array}{l}(\text{OH, 0-9})\ \{1\text{-}9\}\\ \text{TEENS}\\ 20\end{array}\right\}$$

$$\text{TACAN}\left\{\begin{array}{l}0\\ 1\end{array}\right\}\left\{\begin{array}{l}\text{TEENS}\\ 20\qquad\qquad (1\text{-}6)\\ 2\qquad\qquad \{\text{OH, 0-6}\}\\ \{\text{OH, 0-1}\}\ \{\text{OH, 0-9}\}\end{array}\right\}$$

$$\left.\begin{array}{l}\text{I-F-F}\\ \text{SQUAWK}\end{array}\right\}\left\{\begin{array}{l}\{\text{OH, 0-7}\}\ \{\text{OH, 0-7}\}\ \{\text{OH, 0-7}\}\ \{\text{OH, 0-7}\}\\ \{10\text{-}17\}\left\{\begin{array}{l}\{10\text{-}17\}\\ \{\text{OH, 0-7}\}\ \{\text{OH, 0-7}\}\\ \{20\text{-}70\}\ (1\text{-}7)\end{array}\right\}\\ \{20\text{-}70\}\ (1\text{-}7)\left\{\begin{array}{l}\{10\text{-}17\}\\ \{\text{OH, 0-7}\}\ \{\text{OH, 0-7}\}\\ \{20\text{-}70\}\ (1\text{-}7)\end{array}\right\}\end{array}\right\}$$

FIGURE 10

| COMMANDS | NUMBERS |
|---|---|
|  | ZERO |
|  | ONE |
| SQUAWK | TWO |
| I_F_F | THREE |
|  | FOUR |
| TACAN | FIVE |
|  | SIX |
|  | SEVEN |
| I_L_S | EIGHT |
|  | NINE |
| BUTTON |  |
| CHANNEL |  |
|  |  |
| FREQUENCY |  |
| COMM_1 | THIRTEEN |
| COMM_2 | FOURTEEN |
| VHF | FIFTEEN |
| UHF | SIXTEEN |
| VICTOR | SEVENTEEN |
| UNIFORM | EIGHTEEN |
|  | NINETEEN |
|  | THIRTY |
|  | FORTY |
|  | FIFTY |
|  | SIXTY |
|  | SEVENTY |
|  | EIGHTY |
|  | NINETY |
|  |  |
|  | POINT |
|  | DECIMAL |

FIGURE 11

Each Transmission:

<LF>  A  <v/e>  <synth. string>  <CR> where

<LF> = line feed = hex 0A

A = ASCII 'A' = hex 41

<v/e> = voice enable byte
= xxxx1xxx for PTT ON
= xxxx0xxx for PTT OFF

<synth. string> = bytes not used by SimSys

<CR> = carriage return = hex 0D

FIGURE 18

EACH TRANSMISSION:
  <LF> <MSG STATUS> <3 BYTE ID>...<3 BYTE ID> <CR>
WHERE
<LF> = LINE FEED = HEX 0A
<MSG STATUS> = HEX 00
<3 BYTE ID> =
       HEX FF FF FF = ALTERNATE DELIMITER
     OR
       3 BYTES ON ASCII '0' TO '9' (HEX 30 TO 39)
       GIVING INDEX IN NT.LIST FOR THE RECOGNIZED
       WORD.
EXAMPLE:
SCREEN DISPLAY:
( TACAN ONE ZERO NINE
/TACAN ONE ZERO FIVE
/)

MESSAGE OUT (ASCII):
<LF> <00> 066 053 087 044
<FF> <FF> <FF> 066 053 087 029
<FF> <FF> <FF> <CR>

MESSAGE OUT (HEX):
<LF> 00 30 36 36  30 35 33  30 38 37 30 34 34
FF FF FF 30 36 36 30 35 33 30 38 37 30 32 39
FF FF FF <CR>

WHERE  TACAN =066, ONE =053, ZERO=087, NINE=044,
       FIVE =029

FIGURE 19

DISPLAY PAGE

= FORWARD BY 1 SEC= 1 LINE
+ FORWARD BY 2 SEC= 2 LINES
- BACK BY 1 SEC= 1 LINE (MINUS)
_ BACK BY 2 SEC= 2 LINES (UNDERLINE)

CURSOR

. (PERIOD) FORWARD BY 1 PIXEL
\> FORWARD BY 25 PIXELS
, (COMMA) BACK BY 1 PIXEL
< BACK BY 25 PIXELS
/ TOGGLE TRACK

PLAYBACK a PLAY 0.5 SEC FROM CURSOR
A PLAY 1 SEC FROM CURSOR
P PLAY MARKED INTERVAL

MARK INTERVAL

I OR i START/END WORD INTERVAL
R REMOVE INTERVAL

FILE I/O

S SAVE MARKED WORDS
L LOAD NEXT SPEECH FILE

FIGURE 23

← PROGRAM DATE AND VERSION → cm5wf2[2/12/90|180paths&EndBlocks|V1.9] : speech
file[clover-D to exit]:   initializing grammar F1,and F2
File:.../groupa/artcn100.1025 ←——— FILE BEING PROCESSE
* ){3}** ){1}= SW ){1}* ){2}= SW ){1}
                            ——— LINGUIST'S WORD MA
[[TACAN]]! C^ ){2}Vn Vi Vx ){6}! k ){22}% C^ C^n ){29}VA Va Vx
){45}! w ){35}% Cv^ Cv^A ){46} @ D ){58}VA Ve Vx T Ts ){62}%
C^u ){57}Vn VI Vx ){87}Vr Vu Vx ){81}Va Vzr Vx ){52}Va Vzr V
){50}! Cv Cvn ){48} @ D ){43}                 \ SUBSYLLA
                                                        FRAMES
[[ONE]] Vn Vx ){49}Vn Vzu Vx ){48}= Vn ){54}! w ){60}% C^ C^n
){91}Vo Vzu Vx ){144}Va Vo Vx ){161}! Cv Cvu ){97} @ D ){116
[[ZERO]] Vu Vzn Vx ){124}= Vn ){84}TF TFs ){85}= TF TFs ){37}
){37}% C^ C^n ){67}Vu Vzn Vx )*{103}Vu Va Vx )*{171}Vr Va V
){177}Va Vo Vx ){104}! Cv Cvu ){69} OVERFLOW\ \ NUMBER
                                           SYMBOL    — ACTIVE PA
[[ZERO]] TFs ){86}= TFs ){13}! w ){13}% C^ ){33}Vr Va Vx ){49}'
Vza Vx ){99}Va Vr Vx ){77}Va Vzr Vx ){47}Vn Vu Vx ){39}Vn V
Vx ){36}= Vn ){36}! Cv Cvn ){38}* ){47}** ){8}= SW ){1}
(TACAN ONE ZERO ZERO [10: tacan o.k.] ←——— RECOGNIZER
/)                                                     OUTPUT

FIGURE 24

Option Symbols
= Remainder of frame can be ignored with penalty = 0
@ Remainder of frame can be ignored with penalty = 1
! Remainder of frame can be ignored with penalty = 2
% Remainder of frame can be ignored with penalty = 3

Silence
(@ #) very small gap (30-60 ms)
(#) small gap (60-150 ms)
(##) large gap (>150 ms)

Stable Vowels/Nasals
Primary: Vi  VI  Ve  VE  VA  VY  V&  Va  Vo  Vu  Vr  Vn
Secondary: Vzi  VzI  Vze  VzE  VzA  VzY  Vz&  Vza  Vzo  Vzu  Vzr  Vzn
Default Vowel: Vx

Fricatives
Primary:
F    Fs
TF   TFs
T    Ts
(@ T)

Secondary:
Fz    Fzs
TzF   TzFs
Tz    Tzs

Basic Change Intervals

| | |
|---|---|
| C^ | Amplitude Rising |
| Cv | Amplitude Falling |
| C^v | Amplitude Rises then Falls |
| Cv^ | Amplitude Falls then Rises |

Change Intervals with Phonetic Estimates

C^i  C^I  C^e  C^E  C^A  C^Y  C^&  C^a  C^o  C^u  C^r  C^n
Cvi  CvI  Cve  CvE  CvA  CvY  Cv&  Cva  Cvo  Cvu  Cvr  Cvn
C^vi C^vI C^ve C^vE C^vA C^vY C^v& C^va C^vo C^vu C^vr C^vn
Cv^i Cv^I Cv^e Cv^E Cv^A Cv^Y Cv^& Cv^a Cv^o Cv^u Cv^r Cv^n

Change Interval Modifiers

| | |
|---|---|
| K | very sharp onset in following change |
| k | sharp rise in following change |
| q | onset wavers in following change |
| w | very weak rise in following change |
| D | sharp fall in preceding change |

FIGURE 25(B)

```
                    THIR CAUSES TRANSITION
                    FROM STATE (0) TO STATE (1)
                              IN STATE(1) TEEN CAUSES OUTPUT
                              OF THIRTEEN THEN RESET TO (0)
thir (1) teen : thrn       IN STATE(1) TY CAUSES OUTPUT
*    (1) ty : trty         OF THIRTY THEN RESET TO (0)
--          thir- is not a word w/o -ty or -teen
*    (1) X : [dp]    IN STATE(1) ANYTHING OTHER THAN
-                    TY OR TEEN CAUSES PATH DROP
four (2) teen : frtn
*    (2) ty :L frty    COMMENTS START WITH A HYPHEN
--         four is free standing, so pass it to f2
*    (2) X : [rw1]
-                  RESET WITH 1 NON-TERMINAL, I.E.
                   OUTPUT FOUR, RESET TO (0),
fif (3) teen : fftn   THEN REPROCESS CURRENT
*    (3) ty : ffty    NON-TERMINAL
*    (3) X : [dp]
-
six (4) teen : sstn    SIX + TEEN = SIXTEEN
*    (4) ty : ssty    SIX + TY = SIXTY
*    (4) X : [rw1]
                  ELSE OUTPUT SIX THEN
                  REPROCESS CURRENT
                  NON-TERMINAL
```

FIGURE 26

STATE DEFINITION

BUTN: - saw BUTTON, CHANNEL at SOM -- 0-20
oh BUT1
zero BUT1 ——— ZERO CAUSES TRANSITION
one BUT1          FROM BUTN TO BUT1
-2 to FB2 3-9,teens and 20 to final state
two FB2
thri FBUT
          COMMENTS START
          WITH A HYPHEN
...
nine FBUT
ten FBUT
...
twen FBUT
---------start of errors for BUTN
trty ER7 : {bs}  ———THIRTY CAUSES ERROR
                    TRANSITION TO STATE ER7
...
butn ER7 : {bs}
skwk ER7 : {bs}
*BUT1: - saw BUTTON oh, 0,1 ——OK TO END COMMAND
oh FBUT                       IN STATE BUT1
zero FBUT
one FBUT
two FBUT

FIGURE 27

72 States   2546 Transitions
Max transitions per state = 47
Packed table size is 8634 bytes!
All Done with f2gd.PKD State Numbers Assigned

| | | | |
|---|---|---|---|
| 0:SOM | 1:TAC | 2:ILS | 3:SKWK |
| 4:ER | 5:TAC0 | 6:TAC1 | 7:CANC |
| 8:ER1 | 9:TC2A | 10:FTAC | 11:TC2B |
| 12:TC2D | 13:TC2C | 14:TACH | 15:ER2 |
| 16:D1 | 17:FN2 | 18:D12 | 19:ER3 |
| 20:D3 | 21:FSQK | 22:D34 | 23:ER4 |
| 24:ILS1 | 25:ER5 | 26:IL2A | 27:IL2B |
| 28:IL3 | 29:ILH | 30:PONT | 31:CONC |
| 32:FILS | 33:ER6 | 34:UHF | 35:BUTN |
| 36:FRE | 37:VHF | 38:VHF1 | 39:UH2 |
| 40:UH3 | 41:ER13 | 42:BUT1 | 43:FB2 |
| 44:FBUT | 45:ER7 | 46:ER8 | 47:ER9 |
| 48:VH1Z | 49:VH1C | 50:VH1E | 51:FVHF |
| 52:VH1D | 53:VH1F | 54:VH1H | 55:PNT2 |
| 56:FVFH | 57:PONG | 58:FVHD | 59:POND |
| 60:ER10 | 61:ER11 | 62:UH2A | 63:UH2B |
| 64:UH2C | 65:UH2H | 66:UHP | 67:PNT3 |
| 68:UH3D | 69:UH3H | 70:FUH | 71:ER12 |

FINISHED PACKING F2 TABLE: f2gd.PKD

FIGURE 29

[32: ils o.k.]
[33: ils: err after point]
[34: uhf what?]
[35: button what?]
[36: freq what?]
[37: vhf what?]
[38: Incomplete vhf]
[39: Incomplete uhf freq]
[40: Incomplete uhf freq]
[41: bad # for uhf freq]
[42: button o.k.]
[43: button o.k.]
[44: button o.k.]
[45: bad     #button]
[46: too many #s after button]
[47: bad # for vhf]
[48: Incomplete vhf]
[49: Incomplete vhf]
[50: Incomplete vhf]
[51: Incomplete vhf]
[52: Incomplete vhf]
[53: Incomplete vhf]

FIGURE 30

STOPS AND FRICATIVES: MOST COMMON REALIZATIONS

| PHONEME(S) | SYLLABLE/WORD/PHRASE POSITION | | |
|---|---|---|---|
| | INITIAL | MEDIAL | FINAL |
| /s/ /S/ | (Fs/TFs) C^ | (/Cv)(Fs/TFs)(/C^) | (/Cv) (Fs/TFs) |
| /f/ /Q/ | (F/TF/T/SW) C^ | Cv(F/TF/T/#)C^ | Cv (F/TF/T/#) |
| /t/ | SW(Ts/TFs)(k/K)C^<br>SW(T/TF)(k/K)C^ | Cv #(/T/Ts)(k/K)C^ | Cv(/D)#(/T/Ts/TF) |
| /p/ /k/ | SW(/T/TF)(/k)C^ | Cv #(/T)(k/K)C^ | Cv (/D)#(/T/TF) |
| /b/ /d/ /g/ | SW(/T)(/k)C^ | Cv^<br>Cv #(/k) (/T) C^ | Cv (/D)#(/T/TF) |

FIGURE 31(A)

| VOCOIDS: MOST COMMON REALIZATIONS | | | |
|---|---|---|---|
| PHONEME(S) | SYLLABLE/WORD/PHRASE POSITION | | |
| | INITIAL | MEDIAL | FINAL |
| /a/ | C^Va | Va$^j$ | Va (/Cv) |
| /ai/ | C^Va$^j$(VA/VE/VI/Vi)$^k$ | Va$^j$(VA/VE/VI/Vi)$^k$ | Va$^j$(VA/VE/VI/Vi) Cv$^k$ |
| /n/ /m/ | C^Vn (/w) C^ | Cv^n (/Cv) Vn (/C^) | Cvn (/Cv) Vn$^j$ |
| /w&/ | Vu$^j$(/w)C^(/Vo)V& | --- | --- |
| /yu/ | (C^ Vi/C^i) (/Vi) Vu | --- | --- |

FIGURE 31(B)

$six SIX
*END6 (/K C^/C^)(Fs/TFs/TFs Fs/T TFs/Ts F/Ts Fs) (/Cv)
*END6 (C^ Ts/Ts #)

$END6
*END2 (/D) #

$END2
*END2 (Vx/V&)
*END2 (Cv/Cvi)

$END2
-basic start pattern /sl/ ENDX=(FS/TFS/FS T)(/C^)IN SEV.SRC
*ENDX         (Vx/V&)
*ENDX         (Ve/VE/VI/VY/V&/Vo/Vr/Vi)
*(TFs/Fs/Fs T/TFs Ts/T Ts/TFs T/Ts #)(C^i/C^e) (Ve/VE/VI/Vi)
*(TFs/Fs/Fs T/TFs Ts/T Ts/TFs T/Ts #) (C^i/C^e) (VY/Vr)
-very weak vowel
*(Fs/TFs/Fs T/TFs Ts/T Ts/TFs T/Ts #) C^v
*(Fs/Fs T) Cv^
*(TFs/Ts) Cv^
*(Fs/TFs/Fs T/TFs Ts) Cv
*(Fs/TFs/Ts) Cvl
*(Fs/TFs) Cvl $END6
-forms without gap
*(Fs/Fs T) C^v
*(TFs/Ts) C^v
*(Fs/Fs T) Cv^
*(TFs/Ts) Cv^

FIGURE 33

| END name | Phonetic Path | Used In |
|---|---|---|
| ENDM | (/n)b& | button |
| ENDD | (/n)b&! | button |
| END? | (/n)b&!(/&)n | button |
| ENDo | (/n) | button,tacan,nine |
| ENDX | s | squawk,-cy,-chef,six, seven, zero |
| ENDN | sk(/w) | squawk |
| ENDY | (sk(/w)/s)O | squawk |
| ENDP | (/n)tA | tacan |
| ENDa | (d/t/Q/p) | tacan,freq-comm,point, decimal,two,ty,teen |
| ENDR | (t/k) | tacan,comm two,ty,teen |
| ENDO | (/n)tAk(/A) | tacan |
| ENDT | (/n)tAkA(/n) | tacan |
| ENDU | a(/E) | ils |
| ENDV | a(/E)lE | ils |
| END9 | fE | -fef |
| END8 | ai | ie- |
| ENDm | aiE | ie- |
| END@ | si | -cy |
| END5 | (Q/f) | freq-,three |
| ENDB | (Qr/fr) | freq-,three,thirty |
| ENDl | fri | freq- |
| ENDf | vi(/E) | ve(V_),victor |
| ENDg | (i/y) | ue(U_) |
| ENDh | yu | ue(U_) |
| ENDi | yue | ue(U_) |
| ENDd | tS | chef(_H_F) |

FIGURE 34(A)

| END name | Phonetic Path | Used In |
|---|---|---|
| ENDe | tSE | chef(_H_F),channel |
| ENDb | ka | comm |
| ENDc | kan | comm |
| ENDc | kan | comm |
| ENDn | (i/u) | uni- |
| ENDl | f(a/o)(/n) | -form |
| ENDj | vIk | victor |
| ENDk | vIktr | victor |
| ENDp | tSAn(/l) | channel |
| ENDW | po(/i) | point |
| ENDq | des | decimal |
| ENDA | w% | one |
| END& | w&n | one |
| ENDS | ti | two |
| END= | t(/i)u | two |
| END4 | (Qr | three,thirty |
| END3 | Q(r/w)i | three |
| ENDC | fo | four,forty |
| END] | fo | four |
| END_ | fou | four |
| END* | fo(/u)(&/a) | four |
| END^ | fo(/u)(/&/a)r | four |
| ENDE | fa | five |
| ENDF | faI | five |
| END2 | sI | six |
| END6 | sIk | six |
| ENDH | s | seven |
| ENDQ | sE | seven |
| ENDG | sE | seven |

Figure 34(B)

| ENDname | Phonetic Path | Used In |
|---|---|---|
| END7 | sEv& | seven |
| END+ | sEv(/&)n | seven |
| ENDI | ei | eight,eighty |
| ENDj | na | nine |
| ENDK | na(/i) | nine |
| END% | na(/i)n | nine |
| END< | zl | zero |
| END> | zl | zero |
| END[ | zla | zero |
| ENDL | zl(/a)r | zero |
| ENDO | zl(/a)ro | zero |
| END/ | ti | teen,ty |
| ENDr | tin | teen |

FIGURE 34(C)

```
echo "file:hd:aztec/tools/subls/gramtools/dogram"
echo "script for converting gram.end to end.packed"
echo "and converting gram.root to gram.packed"
echo "seh 11/18/89 with skips in root&end"
echo "shortnt.list will be junk..every nt in files repeated"
echo "making end list=gram.end"
cat ../skipend > gram.end
cat ../*.end >> gram.end
echo "making root list=gram.root"
cat ../nois.new > gram.root
cat ../skips >> gram.root
cat ../*.root >> gram.root
../mkntsyllist-Ggram.root-Egram.end-Nshortnt.list-Ssyl.list
echo "packing ends"
cat gram.end > gram.list
../gramtools > end.log
rm end.packed
mv gram.packed end.packed
echo "packing roots"
rm gram.list
cp gram.root gram.list
../gramtools > root.log
ls-lt end*root*gram.*
```

FIGURE 35

METHOD AND APPARATUS FOR SPEECH RECOGNITION BASED ON SUBSYLLABLE SPELLINGS

BACKGROUND

The present invention relates to methods and apparatus for automatic recognition of speech. Using a psycholinguistic approach to solve the problem of automatic speech recognition (ASR), a large vocabulary, speaker-independent, continuous speech recognizer that requires a minimal amount of processing power has been developed.

The standard approach to speech recognition in the prior art has been to maintain large files of speech spectra or "templates." In-coming speech (either words or phonemes) is converted into spectrograms and compared to the templates. If the speech matches a template, the system "recognizes" that bit of speech. That approach requires extensive amounts of computing space and processing power to store and search the templates for a match. Since no two speakers sound exactly alike, their spectrograms don't look alike. Using a template matching system, high accuracy, especially for a vocabulary of over 12 words, almost demands speaker-dependence; the system has to be trained by the individual who wishes to use it.

The present invention demonstrates that it is technically possible to produce a speaker-independent, large vocabulary, continuous speech recognizer using relatively limited processing power. The embodiment described below is significant in two regards since it shifts from off-line phonetic recognition to only four-times real-time recognition of a 39-word vocabulary at a 95% phonetic accuracy rate, and it uses an approach that had been considered theoretically impossible heretofore.

In the case of vocabulary size, the input speech database of 45 words did not contain enough instances of some words to permit accurate recognition analysis. Other important features are:

- 95%+ phonetic recognition accuracy; continuous speech;
- speaker independent for most dialects of American English;
- 39 avionic vocabulary words; command grammar for cockpit functions;
- grammar constrained to valid ranges; incorrect speech noted
- accuracy tested against digitized database The present invention is an extremely innovative approach to the problem of speaker-independent, continuous speech recognition, produced by a near real-time system with a 95% phonetic recognition accuracy rate on a 45-word vocabulary, while using only the minimal processing power available on a Macintosh IIx. No other speech recognition technology that is currently available or that appears to be on the horizon has these capabilities.

The present invention encompasses the derivation of articulatory parameters from the acoustic signal, the analysis and incorporation of suprasegmental data, and the inclusion of a limited context-free grammar (as contrasted with the finite state grammars typically used in speech recognizers). All elements of this approach are dramatic refutations of limits previously held to be theoretically inviolate. The derivation of articulatory parameters is described in Applicant's U.S. Pat. No. 4,980,917; context-free grammars are described in Applicant's U.S. Pat. No. 4,994,966. Both are hereby incorporated by reference.

In the newest portion of the process, phonetic output from a front end is translated into words that can be handled by the grammar.

The prescribed level of accuracy has been met on a very large database of speakers from the Midwest, Texas, California, the Pacific Northwest, the Rocky Mountain states, and parts of the South. Dialects not represented in the database include the Northeast (both New York and Boston) and the Deep South.

To measure the progress of recognition accuracy it was essential to create a fixed database of files against which performance could be accurately and quickly measured. Among other things, the establishment of a fixed database defined the dialect pool on which recognition could be fairly assessed, since random speakers testing the recognizer in real-time could easily have, and frequently did have, dialect background that the system was not prepared to handle. The database provided a relatively quick means of assuring that algorithm changes did not have a serious negative impact on previously handled words.

SUMMARY

The present invention provides, in a digital computer, a method of recognizing speech, comprising the steps of: entering a cohesive speech segment; determining gross acoustic attributes of the entered segment; determining fine acoustic attributes of the entered segment; assigning at least one subsyllable to the entered segment based on the gross and fine acoustic attributes determined; repeating the foregoing steps on successive cohesive speech segments to generate at least one sequence of subsyllables; converting the sequence of subsyllables into a sequence of syllables by finding the sequence of subsyllables in a table of predetermined subsyllable sequences stored in correspondence with syllables and syllable sequences; combining the converted sequence of syllables into words; and verifying the conformance of the words to a first predetermined set of grammatical rules.

The present invention also provides an apparatus for speech recognition comprising: means for entering a cohesive speech segment; means for determining gross acoustic attributes of the entered segment; means for determining fine acoustic attributes of the entered segment; means for assigning at least one subsyllable to the entered segment based on the gross and fine acoustic attributes determined; means for repeating the foregoing steps on successive cohesive speech segments to generate at least one sequence of subsyllables; means for converting the sequence of subsyllables into a sequence of syllables by finding the sequence of subsyllables in a table of predetermined subsyllable sequences stored in correspondence with syllables and syllable sequences; means for combining the converted sequence of syllables into words; and means for verifying the conformance of the words to a first predetermined set of grammatical rules.

BRIEF DESCRIPTION OF THE DRAWINGS

FIG. 10 illustrates the grammar used in an aircraft cockpit embodiment;

FIG. 11 shows the vocabulary used in the aircraft embodiment;

FIG. 18 shows a format for PTT-on and PTT-off signal in the SIMSYST mode;

FIG. 19 shows a format and example for a recognition message between the SIMSYST mode and a simulator host computer;

FIG. 23 shows the commands used for word marking in the CM5WF2 mode;

FIG. 24 shows an output from the CM5WF2 mode;

FIGS. 25(a)-(b) shows symbols used in an output in the CM5WF2 mode;

FIG. 26 shows source formats for the F1 tool;

FIG. 27 shows source formats for the F2 tool;

FIG. 29 shows the assignment of state numbers to state names in the aircraft cockpit embodiment;

FIG. 30 shows messages associated with the state numbers;

FIGS. 31(a)-(b) shows typical subsyllable spellings for common phonemic events;

FIG. 33 shows a source spelling for SIX;

FIGS. 34(a)-(c) shows endings and corresponding phonetic sequences;

FIG. 35 shows the contents of a DoGram file for the aircraft cockpit embodiment.

In the embodiment described in detail below, the core database consisted of 45 commands. Although memory per word is not in itself an overriding concern, the time required to search an increased memory contributes directly to processing delays. As the vocabulary grows, the per-word requirement becomes increasingly important.

As described further below, base recognition technology was delivered in three software packages or configurations, each with its own user and system interfaces. The three configurations are SIMSYST, DEMO and RESEARCH, each of which is described below.

SIMSYST (Simulator System)

Figure 1:
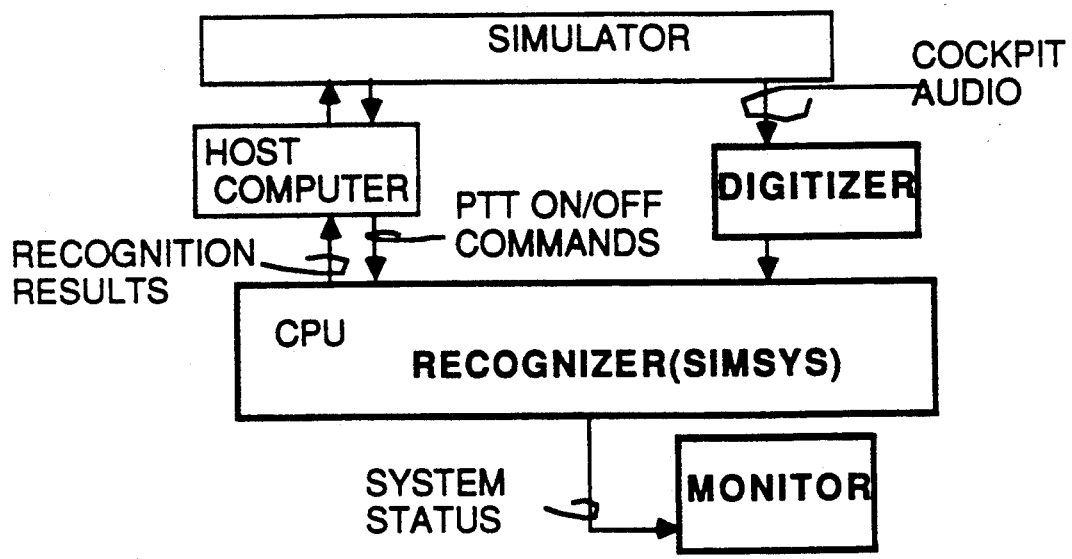
FIG. 1 is a block diagram of the SIMSYST mode of the recognizer.

This version of the recognizer is controlled by a host computer, via an RS232 link, and returns its recognition results to the host computer over the same link. Local (OFF-LINE) control is also available for the system. FIG. 1 illustrates the interfaces for the SIMSYST system.

DEMO (Demonstration System)

Figure 2:
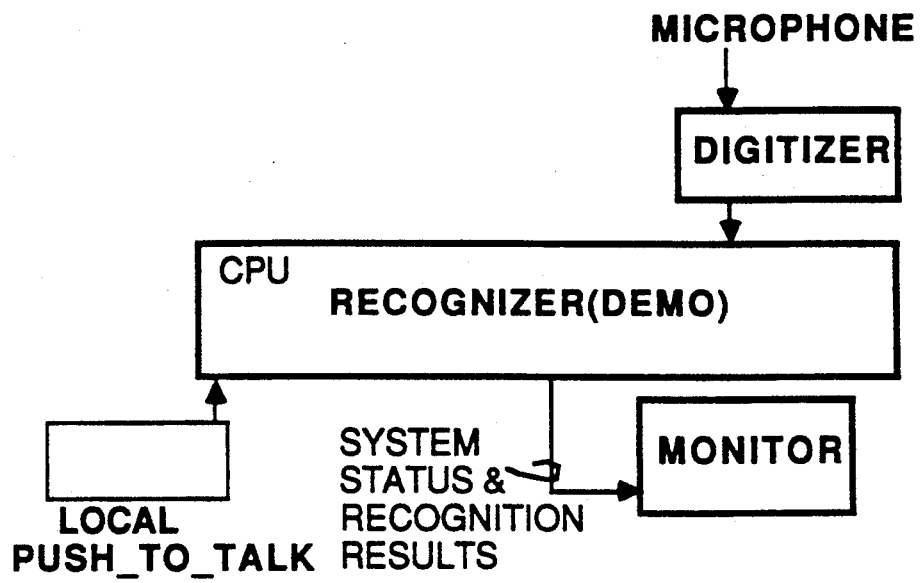
FIG. 2 is a block diagram of the DEMO mode of the recognizer.

This version, shown in FIG. 2, operates entirely under local (manual) control. It permits interactive testing of the recognizer with a microphone and local PUSH-TO-TALK (PTT) control. Digitized speech can be saved on a hard drive for later analysis, or loaded from a hard drive for re-testing. A separate control panel permits changes in the system's configuration.

RESEARCH CM4WFZ (Research System)

Figure 3:
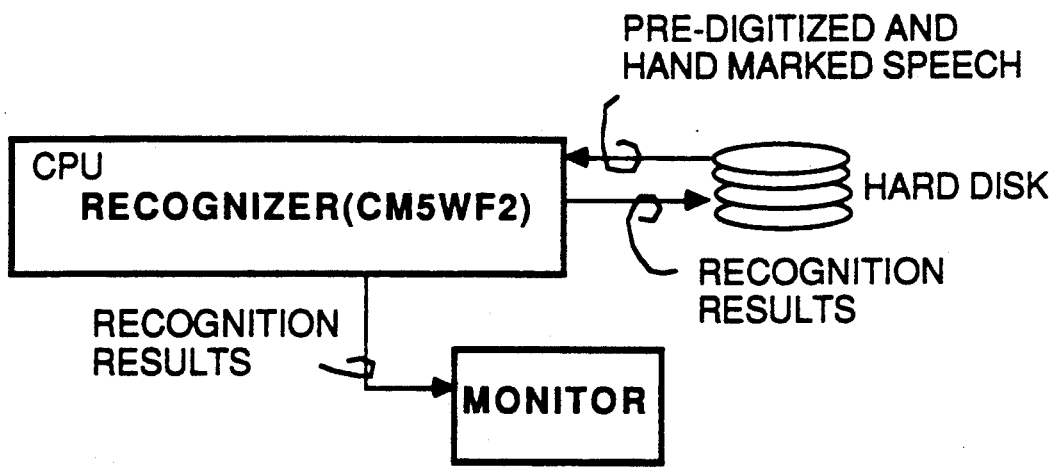
FIG. 3, is a block diagram of the CM5WF2 mode of the recognizer.

This version, shown in FIG. 3, is designed to batch process previously digitized speech samples. This is especially useful when evaluating performance on large databases, or when comparing the performance of different systems. The CM5WFZ system has a mode that provides especially detailed analysis, making it extremely useful in diagnosing the nature of mistakes that led to recognition errors. The iterative process of improving recognition accuracy of new words as they were added to the vocabulary generally included several runs through CM4WFZ.

Figure 4:
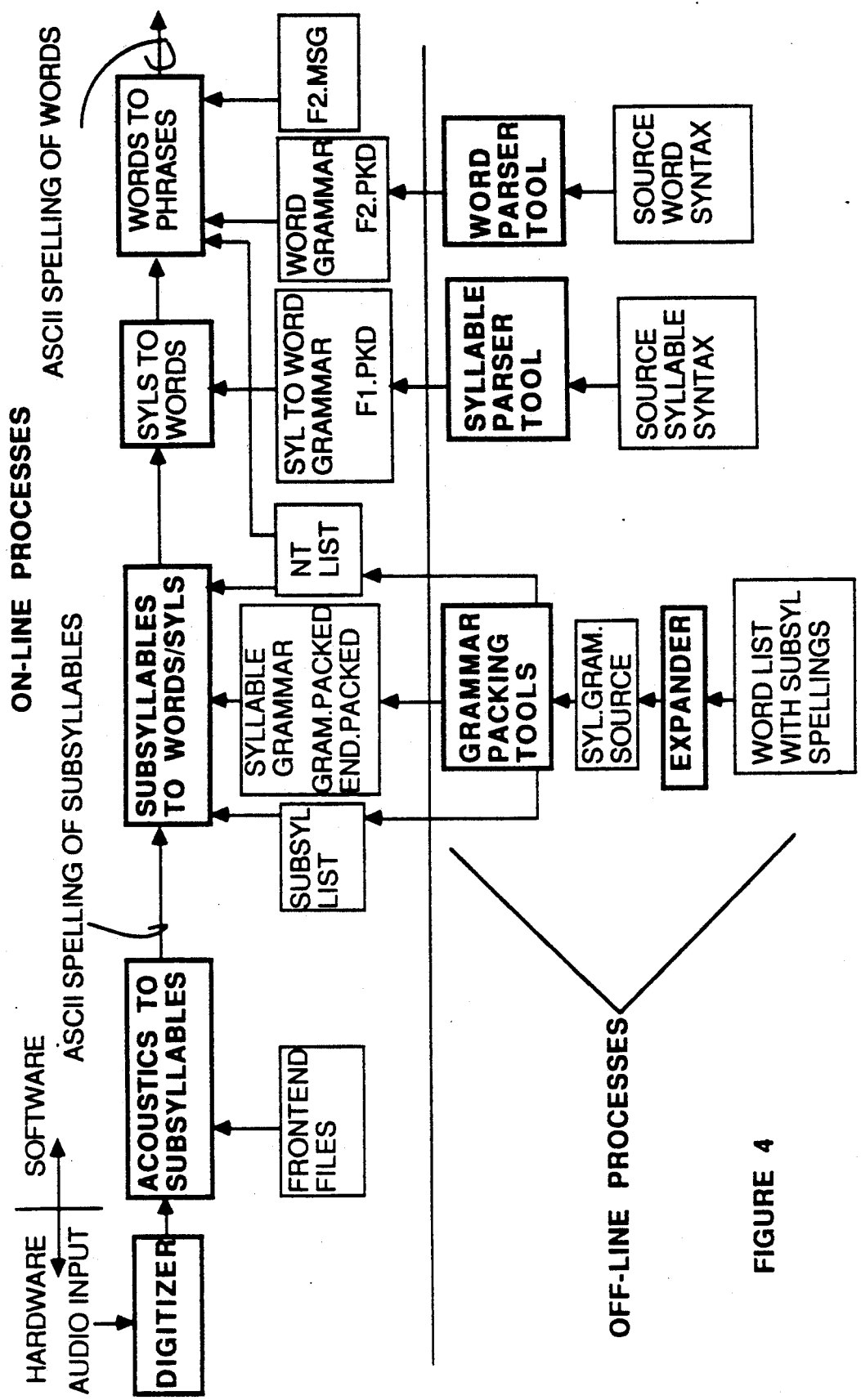
FIG. 4 is a block diagram of an automatic speech recognition system in accordance with the present invention.

All three configurations use identical recognition algorithms, structured as shown in FIG. 4. The major recognizer components are described below.

Acoustics to Subsyllables

Incoming speech data is broken into cohesive segments. Each segment results in an output frame of subsyllable symbols that characterize major and minor phonetic attributes of the segment. The four major frame designators are silence, friction, stable vowel, and change. Frames appear at a variable rate, depending on the incoming data. In the interest of robustness, most frames contains two or more subsyllable symbols.

Subsyllables to Syllables/Words

Frames are output by the phonetic front end and enter the subsyllable matching process, which evaluates all combinations of incoming options against a precomposed database of subsyllable spellings. Symbols that are deemed phonetically less likely are used in the matching process only after attaching a penalty to any potential result. Matches that produce a complete word or syllable are outputted to the next stage.

Syllables to Words

Syllable-to-word mapping permits the combination of two or more syllables normally spoken distinctly as a signal word. For example, the preceding stages recognize FOUR and -TEEN as separate syllables that can be combined to form FOURTEEN.

Word Grammar

Sequences of words are checked for acceptability in the word grammar. A sequence violating the grammatical rules is assigned penalty weights so that it will be less preferred than a sequence complying with the rules. Thus, SQUAWK SEVEN SEVEN ZERO ZERO <exhale> might be recognized as SQUAWK 7700 and SQUAWK 77001, but the latter would be rejected.

The data reduction provided by the present embodiment of the overall system presents some interesting statistics. Digitized speech enters the system at 11K bytes per second. During continuous speech, ASCII spelling of the words at a rate keeping up with speech would require about 8 bytes per second for a rate reduction from the input of a factor of about 1400. This reduction is accomplished in two primary steps (1) reduction from digitized audio to subsyllables which typically appear at a rate of 160 bytes per second; and (2) reduction from subsyllables to ASCII spellings of words primarily via the subsyllable to syllable stage.

The first stage reduces the data rate by a factor of 70 to produce subsyllables. The second stage reduces the data rate further by a factor of 20. Strange as it may seem, in the current system the first stage consumes only 20% of the processing time to provide its 70-fold reduction, while the second stage consumes almost 80% of the time to provide the remaining 20-fold reduction. The final two stages (syllable combining and word grammar) together take less than 1% of the processing time.

Support Tools

Support tools are provided for development of alternate vocabularies and grammars to handle other applications. The tools include support for subsyllable packing, syllable-to-word packing, and word grammar packing. In addition, the word marking program is provided to aid in detailed analysis of utterances and preparation of databases for performance analysis.

he operation of all three systems and support tools is described in detail below.

Acoustic to SubSyllable Processing:

The primary component of this module was taken from the speech processing product described in Applicant's U.S. patent application Ser. No. 07/289, 540 during the previous phase of this project modified somewhat to increase phonetic accuracy.

The philosophy in enhancing this module was to include only as much detail as needed to discriminate the given vocabulary, because too much detail could produce speaker dependence, decrease noise resistance, or require an inordinate number of spellings.

As words were added to the vocabulary, additional detail was required for accuracy. This was accomplished via statistical analyses of the parameters associated with various phonetic events. This analysis allowed the application of standard signal detection theory to establish thresholds, giving optimum detection while minimizing false rejections.

Figure 5:
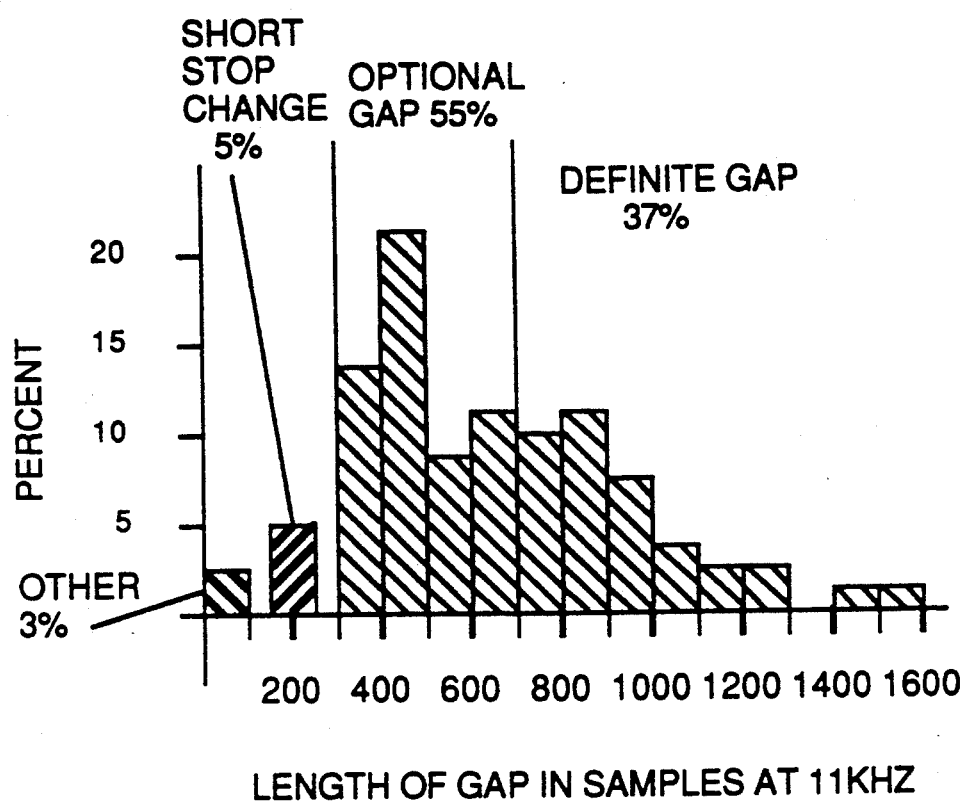
FIG. 5 is a histogram showing a statistical analysis of a phonetic element.

For instance, FIG. 5 shows the result of measurements made on the length of the gap (absence of signal) associated with word medial /k/. The object is to set thresholds that result in detecting gaps without declaring gaps elsewhere in speech where they do not occur. Separate measurements had shown that two males in the database had a tendency to creak (produce abnormally low and raspy pitch) with frequencies as low as 40 Hz. Thus, we decided that "gaps" shorter than 300 samples would be ignored. We needed to declare three types of gaps:

1. optional gaps that might result from a true stop or some error in articulation ("frog" in the throat);
2. definite stop gaps;
3. inter-word gaps (or silence) so long as to force a word boundary.

Since the distribution in FIG. 5 falls sharply after 1000 samples and no gaps greater than 1600 samples were observed, we set the inter-word boundary at 1800 samples. As a result of our assessment, 97% of /k/ are marked with some gap indicator and we had no instance of a word boundary being forced mid-word.

Figure 6:
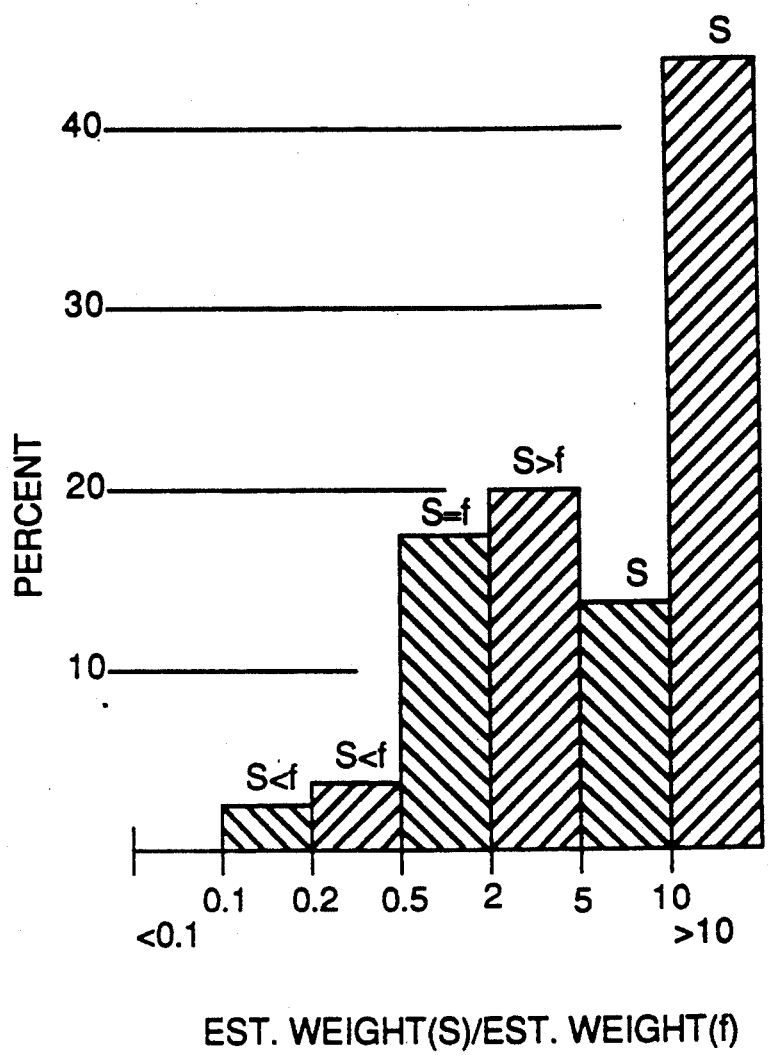
FIG. 6 is a histogram showing a statistical comparison of two phonetic elements.

FIG. 6 illustrates measurements used to optimize phonetic detection. In this case we examined the weight assigned by the phonetic estimator to 230 pronunciations of /s/ by 10 different speakers. It is inevitable that some fraction of the time /f/ is estimated as a possible phoneme when /s/ had been produced. We wanted to set thresholds to apply whenever a fricative was detected that would maximize the case in which a spoken /s/ was estimated as /s/ alone, or at least that /s/ would be weighted more likely than /f/ and vice-versa for /f/.

We selected the ratio of weights assigned as being the most consistent measure. The distribution of the ratio of weights is shown in FIG. 6, along with the resulting assignments based on the threshold set. The resulting accuracy for /s/ is classified as:

| | |
|---|---|
| /s/ alone | 58% |
| /s/ more likely than /f/ | 20% |
| /s/ and /f/ equally likely | 17% |
| /s/ less likely than /f/ | 5% |
| /f/ alone | 0% |

In no case does the system fail to detect an /s/. Only 5% of the /s/ sounds were classified as /f/ being more likely. 95% of the time, we will match an /s/ in the input with a subsyllable /s/ without a penalty.

SubSyllable to Word/Syllable Processing:

This module was ported from the parsing technology described in Applicant's U.S. Pat. No. 4,994,966, modified somewhat, e.g., to increase the processing speed.

As more and more phonetic detail was added to the system, the subsyllable spellings of each word became more complex. The original approach to subsyllable spellings employed a high speed dictionary access technique, that is, an efficient scheme for packing a list of spellings and searching through them. As the lists grew in length we first added mechanisms to speed up the search by a factor of four to ten. However, it soon became clear that the size of the lists would grow exponentially to accommodate the required phonetic detail.

As a simplified example, consider an initial, crude phonemic spelling of SQUAWK as /skO/. This requires a single rule. Adding phonetic detail to account for vowels of varying length, mispronunciations of /sk/ as s/, and dialect variations such as /skuak/, /sk&wOk/, etc. could result in:

$$\left\{ {sk \atop s} \right\} \left( \left\{ {u \atop \&} \right\} \right) \left\{ {a \atop O} \right\} \left( \left\{ {a \atop O} \right\} \right) \left( \left\{ {a \atop O} \right\} \right)_k$$

or 36 individual spellings, if written out as a dictionary style list.

In fact, it normally requires a sequence of subsyllable options to specify the equivalent of a single phoneme and the effects of the multiplicative factor are even more pronounced than in the above example.

Figure 7:
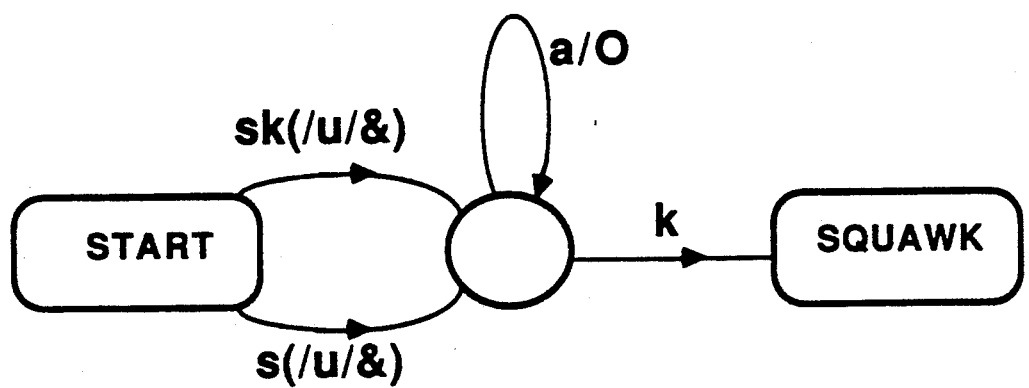
FIG. 7 shows a network for processing SQUAWK.
Figure 8:
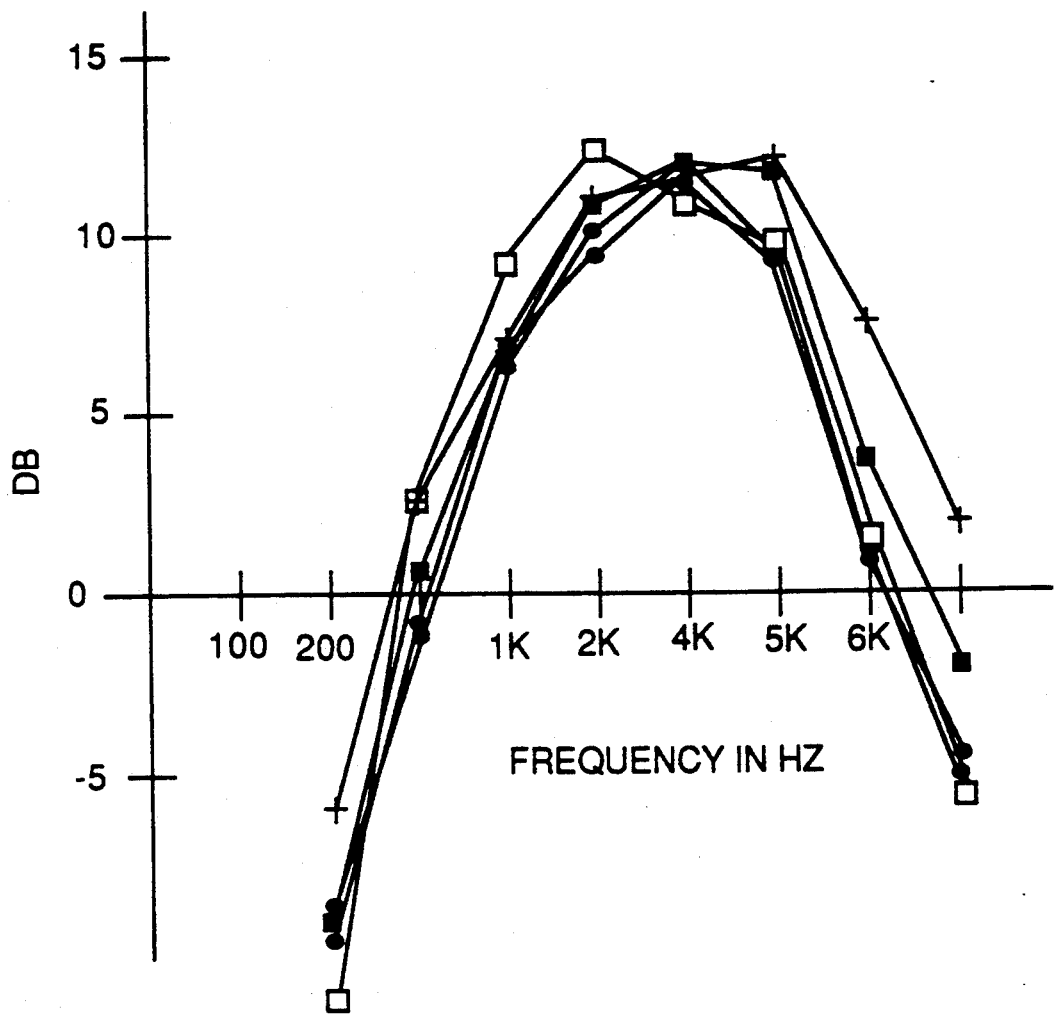
FIG. 8 shows the frequency response of several digitizers.

To constrain this geometric growth, minimizing the amount of phonetic detail in the spellings would have an effect on accuracy that was not acceptable. As a result, combination of dictionary spellings with network structures has been selected. The result for SQUAWK as spelled above phonemically is the network shown in FIG. 7.

The magnitude of the effect of this changed is best summarized by the following statistics. The current subsyllable source spelling of SQUAWK requires 9 lines of text, each ranging in length from 3 to 14 symbols. When the network for SQUAWK alone is packed, it requires 1140 bytes. Using the original scheme, this amount of phonetic detail would require 37,580 lines of text in the source file and would pack to a table requiring 132,000 bytes. This is more than a 100-fold difference in memory requirement for the on-line system and a 4,000-fold difference in the amount of text to be entered and maintained in the source files.

Syllable to Word Processing:

This stage reduces the total number of rules in subsyllable spellings and thus increases the processing speed. The software module was taken directly from the parsing technology described above without any significant modifications.

Word Grammar

This stage was also taken from the parsing technology described above without significant modifications.

Digitizer

The current hardware is conventional and built by hand with a combination of wirewrap and soldering on a perf-board base.

The final stages of the audio input to the digitizer use four op-amps in series to form the anti-aliasing filter, a buffer, and the volume control amplifier respectively. All units should be tested for dc bias, audio frequency response, and digital noise, since the last four op-amps have a tendency to develop dc offsets with age. Since there is no capacitive coupling in the final stages of the audio input, the dc bias can be amplified by the last op-amp and result in signals with enough offset at the digitizer input to produce a serious distortion (one sided clipping) of the input signals. Op-amps with internal offset compensation can also be used.

FIG. 10 indicates the range of frequency response measured on five of the hand built units. There is a noticeable variation from unit to unit even though all critical components in the audio section are specified at 1% tolerance. In some cases it appears that the combined variation in components or the random errors that occur in hand-built units were responsible for the range of the measured digitizer performance.

Software

Execution time depends geometrically on the average number of subsyllables per frame and the average number of options available at each point in the subsyllable spellings. Although this relationship was clear from the beginning, the magnitude of the effects would not be felt until high accuracy on a wide range of speakers for a number of similar words is desired.

Linguistic Issues

The collection of data had originally been intended to duplicate as closely as possible the way that users of the system would speak. Hence, many of the speakers in the original database were experienced pilots, thoroughly familiar with the command language and accustomed to speaking rapidly. Alas, pilots are rarely the ones for whom demonstrations of a recognizer are made. In a demo environment, speakers may not be familiar with the command language, or may have expectations of permissible speaking rates that were set by another companies' technology. Whatever the cause, we noticed that "demo speakers" spoke much more slowly than pilots and we had to adjust our algorithms for slow speech.

The theory for recognizer operation, including hardware and software capabilities and features specific to the aircraft cockpit embodiment is described below; the installation of the ASR on a Macintosh IIx, and detailed operational instructions are also described. Step-by-step instructions for expanding the current vocabulary are also described.

1.1 Hardware Capabilities

The present embodiment can be implemented with the following CPUs:
Macintosh IIcx;
Macintosh IIci;
Macintosh IIx;
Macintoch IIxi;
Macintosh SE/30; or the equivalent, and with the speech digitizer and cable, a standard microphone and cable, and an RS-232 cable for SIMSYST operation.

Figure 36:
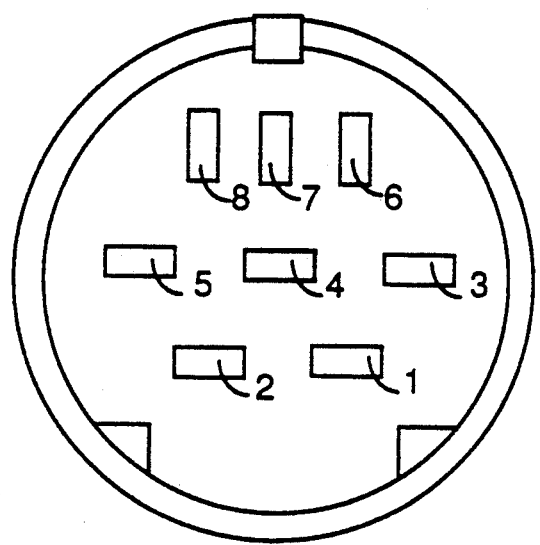
FIG. 36 shows a rear view of a computer printer port connector.

A rear view of the eight-pin Macintosh serial I/O printer port connector is shown in FIG. 36; the connector has the following pin designations: pin 1=HSKo (handshake out); pin 2=HSKi (handshake in); in 3=TxD− (transmit data minus); pin 4=ground; pin 5=RxD−(receive data minus); pin 6=TxD+(transmit data plus); pin 7=GPi (not used); and pin 8=RxD+(receive data plus.

1.2 Software

The present embodiment uses the Macintosh System/Tools Version 6.0.3 or above (but not System 7.0). The present embodiment of the system will run only under FINDER, and not MULTIFINDER. A Control Panel (described further below) should be set for a minimum RAM cache (32K) or the RAM cache should be turned off. For further settings, see the Installation Instructions below. The present embodiment ASR programs run under the Aztec -C Shell, which is referred to hereinafter as the "C-Shell," and it can be noted that operation on a Macintosh IIci computer requires version 3.6d or later of the C-Shell.

1.3 Theory of Operation

Figure 9:
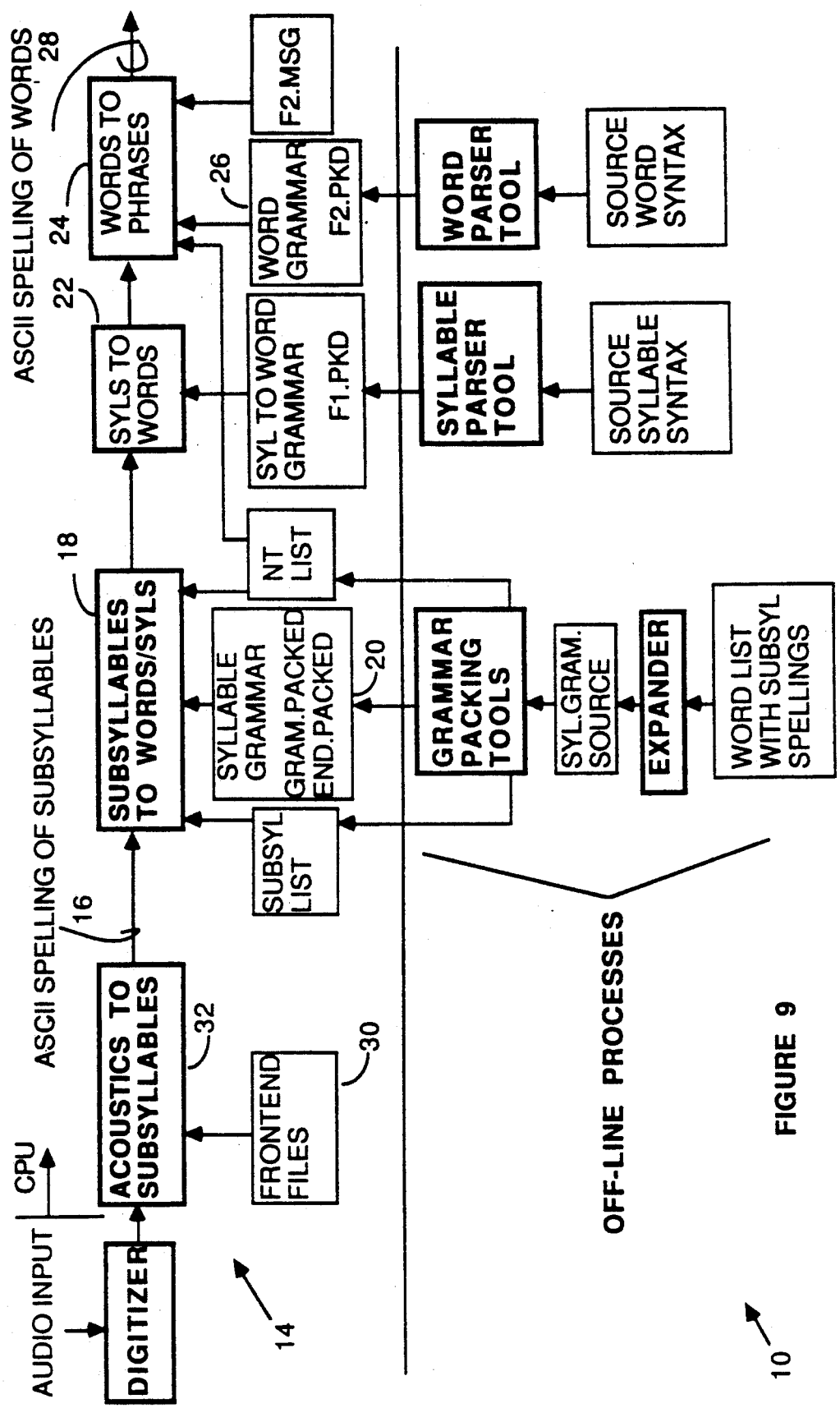
FIG. 9 is a block diagram of the overall system.

As noted above, the present system uses a psycholinguistic approach to recognition, roughly modeling the process by which a human being listens. A block diagram of the overall system 10, shown in FIG. 9, comprises four elements or steps. The output of each step becomes the input to the next one.
1. Acoustics to SubSyllables
2. SubSyllables to SubWords 3. SubWords to Words
4. Words to Phrases

1.3.1 Acoustics to SubSyllables

Rather than attempting to determine whether speech sample X matches template Y, the present system uses information about the type of sound in a given segment. For example, the sounds /s/ and /sh/ generate slightly different spectrograms, but are both classified as fricatives sounding like /s/. The present recognizer is satisfied with knowing that segment X is a fricative; its exact identity is not crucial.

When speech is loaded into the system 10, either from a saved, digitized speech sample on a disk or directly from a conventional digitizer 12, a series of modules 15 analyze the digital signal for acoustic attributes. Based on these changing attributes, the first stage 14 of the recognizer divides the speech into cohesive segments, which generally correspond to temporally stable configurations of the vocal tract and to the transition interval between such stable configurations. Thus, the results of this analysis place each segment of speech into one of four categories of gross approximation:

1. Silence
2. Fricative
3. Vowel
4. Change interval

These four gross approximation categories are further distinguished by the duration of a silence, the strength or weakness of a fricative, the articulatory quality of a vowel, or the rising or falling amplitude of a change interval. Once a segment has been analyzed to this finer level of detail, a symbol or a set of symbols, reflecting both gross and fine qualities, is assigned to the segment. An individual symbol or set of symbols constitutes the "spelling" of a SubSyllable. To ensure robustness of the overall system, primary (most likely) and secondary (next most likely) SubSyllable spellings are generated as described below. The resulting set of SubSyllable spellings is called a Frame. Frames are distinguished from one another by the mark ")".

The convenient set of symbols that is associated with gross categories are:

1. # silence
2. F fricative
3 V stable vowel
4. C change interval

The fine distinction applied to frication is /s/ to indicate a strong fricative. Weak fricatives (i.e. "f" and "th") are represented by "F" alone. The symbols "i, I, e, E, A, a, o, u, &, r, R and n" are used to further quantify stable vowels, e.g., "Vi" is a stable vowel, as in THREE.

The symbols " ^ " and "v" are used to modify change intervals. Change intervals may also have a phonetic modifier, e.g., "C^ r" is the spelling for "amplitude rising, sounds like /r/."

A SubSyllable is preferably marked as secondary by inserting "z" after the first character. Thus, the frame "Va Vz&)" indicates that /a/ is the primary choice and that /&/ ("uh") is the secondary choice. Detailed tables describing the generation of SubSyllables are discussed below.

In determining the most likely and next most likely phonetic estimates, a set of tables that relate estimates to the sounds which generate them is accessed by a phonetic estimator as described above. Each cohesive speech segment datum is located in its corresponding table and the phonetic estimates at that location and a small number of neighboring locations are examined. The most likely estimate may thus be determined as the most frequent estimate in the locations examined. Similarly, the next most likely estimate is determined as the next most frequent estimate in the table locations examined.

1.3.2 SubSyllables to SubWords

Once SubSyllables have been assigned to a sequence of speech segments, the string 16 of SubSyllables is compared (module 18) to the SubSyllable Grammar 20, which contains tables of predetermined "spellings" of words or parts of words. These tables may be compressed to limit the memory requirements, e.g., by off-line application of table packing tools, but compression is not required. If a sequence of SubSyllable spellings from successive frames matches a spelling in the table, recognition is achieved. During this comparison, penalty points are assessed to analyzed sequences that use a secondary SubSyllable to generate a match. For example, suppose the analyzed sequence is:

| F   |   | C^ | Vr | Vo |
| --- | - | -- | -- | -- |
| Fzs |   |    |    |    | and the spelling in the table is:

| Fs | C^ | Vr | Vo |
| -- | -- | -- | -- |

The two will be called a match; however, the analyzed sequence will be assessed a penalty because the fricative in the table-derived spelling (Fs) matches only the secondary (Fzs) spelling from the acoustic stage. The present ASR system keeps track of all analyzed sequences and their assessed penalties throughout the process. At the end, the sequence with the least number of penalties is considered the recognized result.

1.3.3 SubWords to Words

For some vocabulary items, it is better to break the word into constituent parts (SubWords) than to try matching long, analyzed sequences to long spellings. This has two benefits. First, it saves space in the system, which means it can work faster. Second, it reduces the potential of making mistakes while entering the spellings into the Grammar.

For example, the terms UHF and VHF were both in the vocabulary of the aircraft cockpit embodiment. These terms are represented in the Grammar with spellings for U-, V-, and -HF, thereby avoiding a need for two sets of spellings for -HF in the Grammar. In the SubWord to Word stage 22, two analyzed sequences (identified as U- followed immediately by -HF) are combined to form the complete term UHF. This approach may also be used to produce, for example, SIXTEEN from SIX- and -TEEN, as well as other suitable terms as determined by the language and vocabulary used.

1.3.4 Words to Phrases

Finally, the identified words are combined into acceptable phrases. In the aircraft communication embodiment, a phrase must begin with a command, and each command has a set of possible words that may follow it. For example, the command SQUAWK must be followed by four digits, each of which has the value of SEVEN or less. Similarly, if the first word of a string is identified as a digit, that string will be dropped from the possible responses for not complying with the Words-to-Phrases Grammar 24. The Word Grammar 26 supplied with this system is shown in FIG. 10.

1.3.5. Final Recognition

As a sequence passes through the processes, it generally matches several different SubSyllable spellings. The final reported recognition is based on a comparison of the penalty points assessed to each of the possible spellings, as well as a consideration of any grammatical errors that may have been detected in the Word Grammar 26. Of all the sequences with the minimum number of grammatical errors, the sequence with the least number of penalty points from SubSyllable matching at the end of the process is reported as the recognition result 28.

1.4 About The Aircraft Cockpit Embodiment

The embodiment for an aircraft cockpit preferably contains SubSyllable spellings for the words shown in FIG. 11 and the Word Grammar is shown in FIG. 10. In the research mode (CM4WF2, described below), the grammar may also accept the digits 8 and 9 in IFF/SQUAWK commands.

The front-end files 30 (for acoustic processing) would preferably be tailored to a standard microphone. It will be understood that the front end files include stored representations of digitized speech that are accessed by the Acoustics to Subsyllables Module 32. The Module 32 includes suitable features disclosed in Applicant's allowed U.S. Pat. No. 4,980,917, for Method and Apparatus for Determining Articulatory Parameters From Speech Data, which is hereby incorporated by reference. Testing with a flight mask revealed no need for changes, so the same front end could be used with an unpressurized oxygen mask.

Installing the recognizer programs was designed as a simple process of copying folders onto a hard drive. Each of the folders mentioned below in Section 2.2 contain all the files necessary to run that particular mode of the system; installing the folders, as described, automatically installs the complete system. Only the Shell and Edit programs were required to operate the programs, although Apple's MacWrite program can be used to process the output of CM5WF2. Edit was part of the Aztec C package.

2.1 Aztec C-Shell

The recognizer programs run under the Aztec C-Shell; the standard Aztec Development Package was used to install the Aztec C system on a hard drive. The result was:
1. A C-Shell icon in the folder hd:System Folder
2. A new folder called hd: Aztec containing the C utilities.

It will be noted that installing the C-Shell on a Macintosh IIci computer requires Version 3.6d (2/5/90) or a later version of the Shell; earlier versions will not operate on a IIci with less than 8Mbytes of RAM.

2.2 Recognizer Folders

The SIMSYST disk for implementing the SIMSYST recognizer mode contained one folder called Sim which was copied onto the hard drive in the Aztec folder. The DEMO disk contained two folders, Demo and Gram.src that were both copied into the Aztec folder on the hard drive. The SUPPORT TOOLS disk contained folders called F1 and F2 that were both copied into the Aztec folder as well. Finally, using the File menu under Finder, a new folder would be created in the Aztec folder, and named Cspc. (The Cspc directory was a folder in which saved speech samples would be kept.) These were all the folders needed for operating the recognizer in a MACINTOSH environment.

The listing for the Aztec folder typically looked like this:

```
hd:aztec/
    Sim (directory)
    Demo (directory)
    Cspc (directory)
    Gram.src
    F1
    F2
    other Aztec directories (bin,
        include, etc.)
```

The use of SIMSYS, DEMO, CM5WF2 and the SUPPORT TOOLS is described below.

2.3 Hardware Setup

Figure 12:
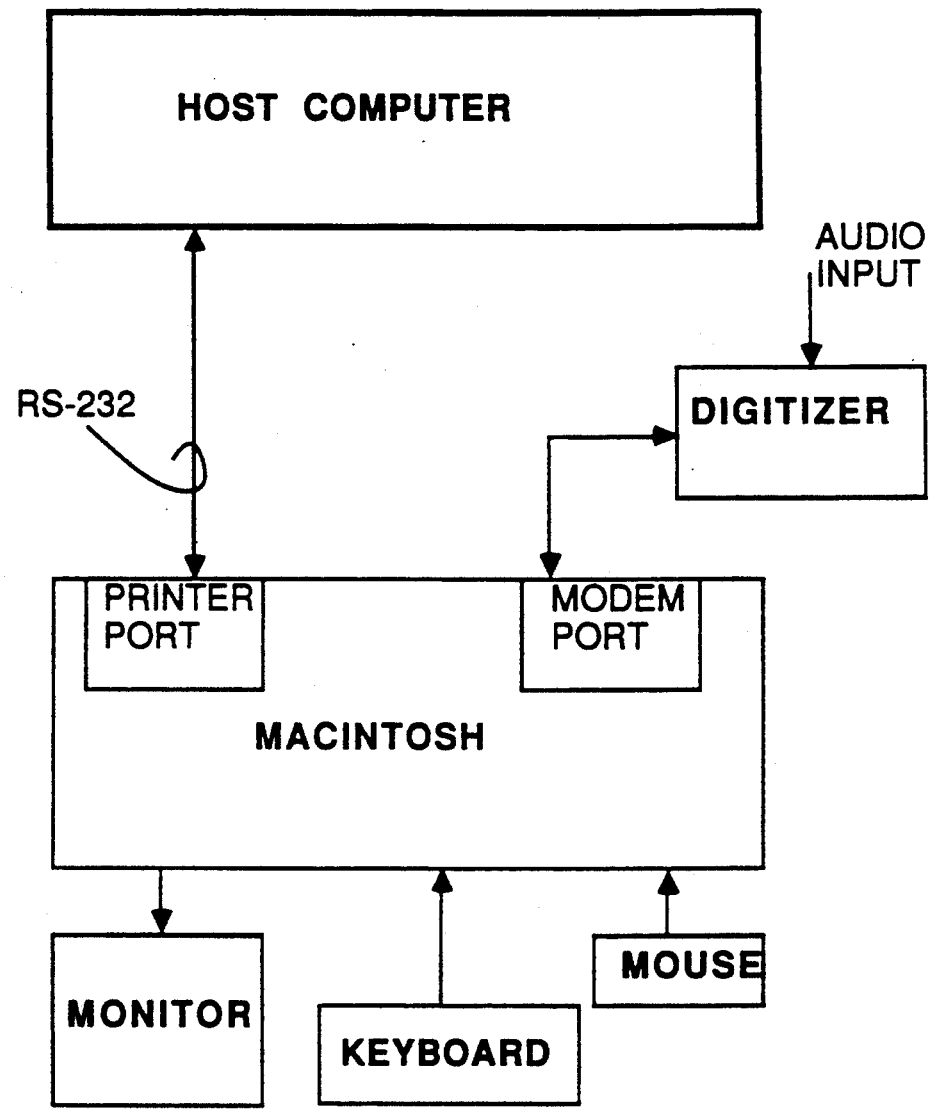
FIG. 12 shows a recognizer hardware configuration.

Setting up the hardware in the correct manner smooth operation of the recognizer. The hardware was hooked up to the computer systems as shown in FIG. 12.

Figure 13A:
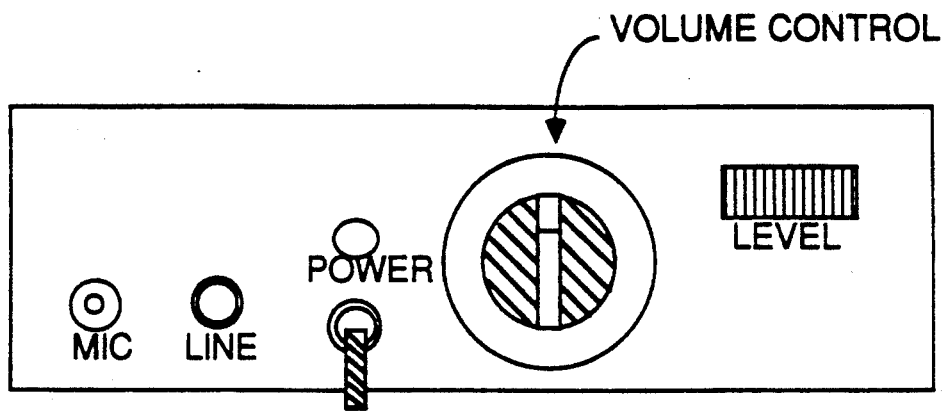
FIGS. 13(a)-(b) the front and back panels of a suitable digitizer.
Figure 13B:
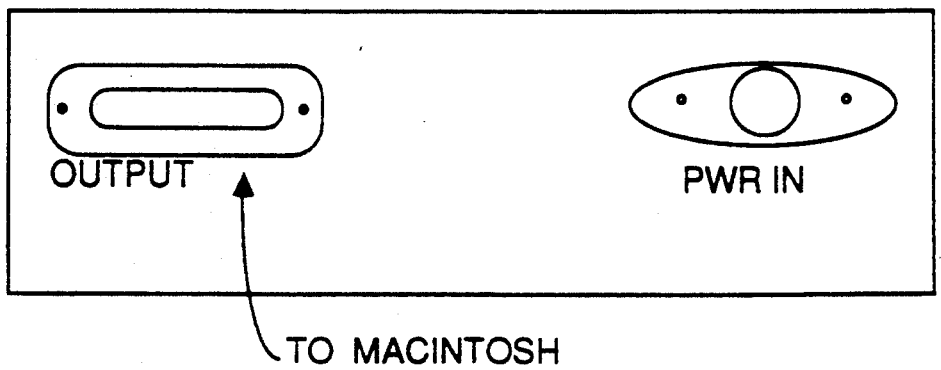

As shown in FIG. 13(A), the digitizer had two inputs on the front panel. One, labeled MIC, was for a microphone, and the other, labeled LINE, was for audiotaped speech input. As shown in FIG. 13(B), digitizer had two connectors on the back panel through PWR IN OUTPUT. The digitiizer was powered through the PWR IN hookup by an Elpac power unit (transformer), plugged into any standard outlet. A suitable cable was connected from a DB-9 OUTPUT jack on the digitizer to the mini-8 modem port of the MACINTOSH computer. The printer port (RS-232) on the MACINTOSH was connected to the simulator control computer when using SIMSYST.

2.4 System Software Setup

The present system was configured for the Apple Macintosh computer interface and operating system, Finder, which is described in documentation available from Apple Computer Corp.

The options usually set on the Mac Control Panel (a menu item under the Apple in the upper left corner of the screen) were:

```
Speaker Volume: 7
Monitors: Black and White; and
RAM Cache: 32K or OFF
```

As indicated above, each of the three modes of operation had different inputs and outputs. The modes DEMO and SIMSYST used the digitizer interface and were designed for real-time operation, while the CM5WF2 mode was designed for off-line research.

DEMO processed only individual phrases, but its input could come directly from the digitizer or from a saved speech sample in the Cspc folder. In the DEMO mode, the recognizer was activated by clicking on the RECORD button on the DEMO screen.

SIMSYST, like DEMO, processed only individual phrases, but unlike DEMO, SIMSYST operated in conjunction with a host computer, that gave the command to begin or end recording and that received the recognition results.

CM5WF2 was used to increase the accuracy of the existing vocabulary or to increase the vocabulary itself. It was designed to process a list of individual speech files from the Cspc folder as one large batch, and record the SubSyllable spellings and recognition responses in an Edit document for later review. The operation of each mode is described in detail below.

3.1 Common Menu Options

Figure 14A:
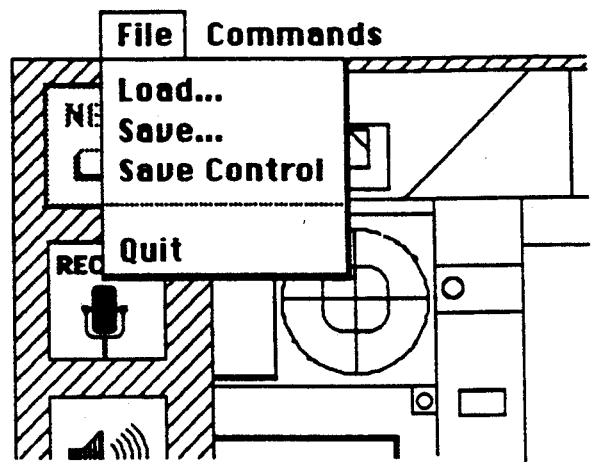
FIG. 14a illustrates menus accessed in the SIMSYST and DEMO modes.
Figure 14B:
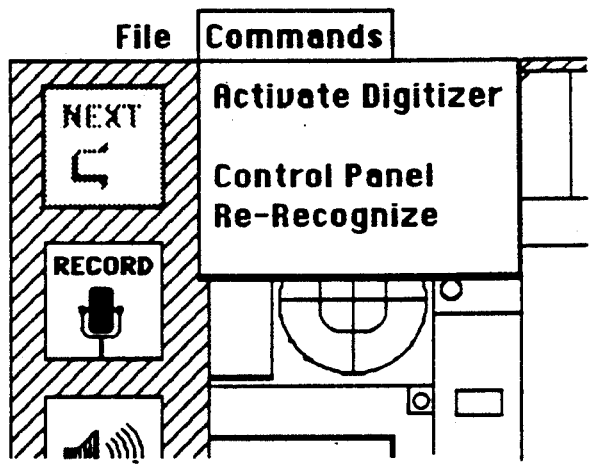
FIG. 14b, illustrates menus accessed in the SIMSYST and DEMO modes.

SIMSYST and DEMO accessed two common menus, File and Command, as shown in FIGS. 14a and 14b. (CM5WF2 did not have a comparable interface or the options discussed below.) The standard Macintosh Desk Accessories software, such as the Calculator or Chooser programs, were not used during DEMO or SIMSYST operation.

3.1.1 File Menu

The File menu shown in FIG. 14a allowed the operator to save a speech sample onto a disk, to load a previously digitized speech sample into the system, to save a control panel, or to quit the system. The Save option saved a speech file from RAM to the hard drive. When this option was selected, a normal Macintosh Save File box appeared on the display. Any Macintosh acceptable file name could be used for saved files, but it was best if all speech file names ended with .cspc and were saved in the Cspc folder. The .cspc identified the file as a speech file and was used by CM5WF2 and Mrk.Wsyl. This function was active in the DEMO mode only.

The Load option allowed a previously saved .cspc file to be loaded into the system and loading a file erased any previous speech from the system. If the digitizer had been used immediately prior to loading a saved file, the digitized sample in memory must be saved as a .cspc file before loading a new file to avoid loss. To avoid inadvertently loading non-speech files, it was arranged that only speech files that were saved with the DEMO program could be loaded, and only the DEMO mode allowed file loading.

The Save Control option saved the current control panel settings (see below) as a file called "control.file."

3.1.2 Command Menu

The Command menu shown in FIG. 14b allowed the operator to activate the digitizer, to see and to modify the control panel, and to reprocess the current speech sample.

If the digitizer was automatically activated when the system was first brought up, the message "digitizer activated!" would appear. If a dialog box appeared instead, saying that the digitizer was not connected, the digitizer would be checked to make sure it is turned on, and that all the connections were correct. Once properly connected, the Activate Digitizer option would be selected from the Command menu and the "digitizer activated!" statement would appear. The digitizer was reactivated each time it was turned off and on.

Figure 15:
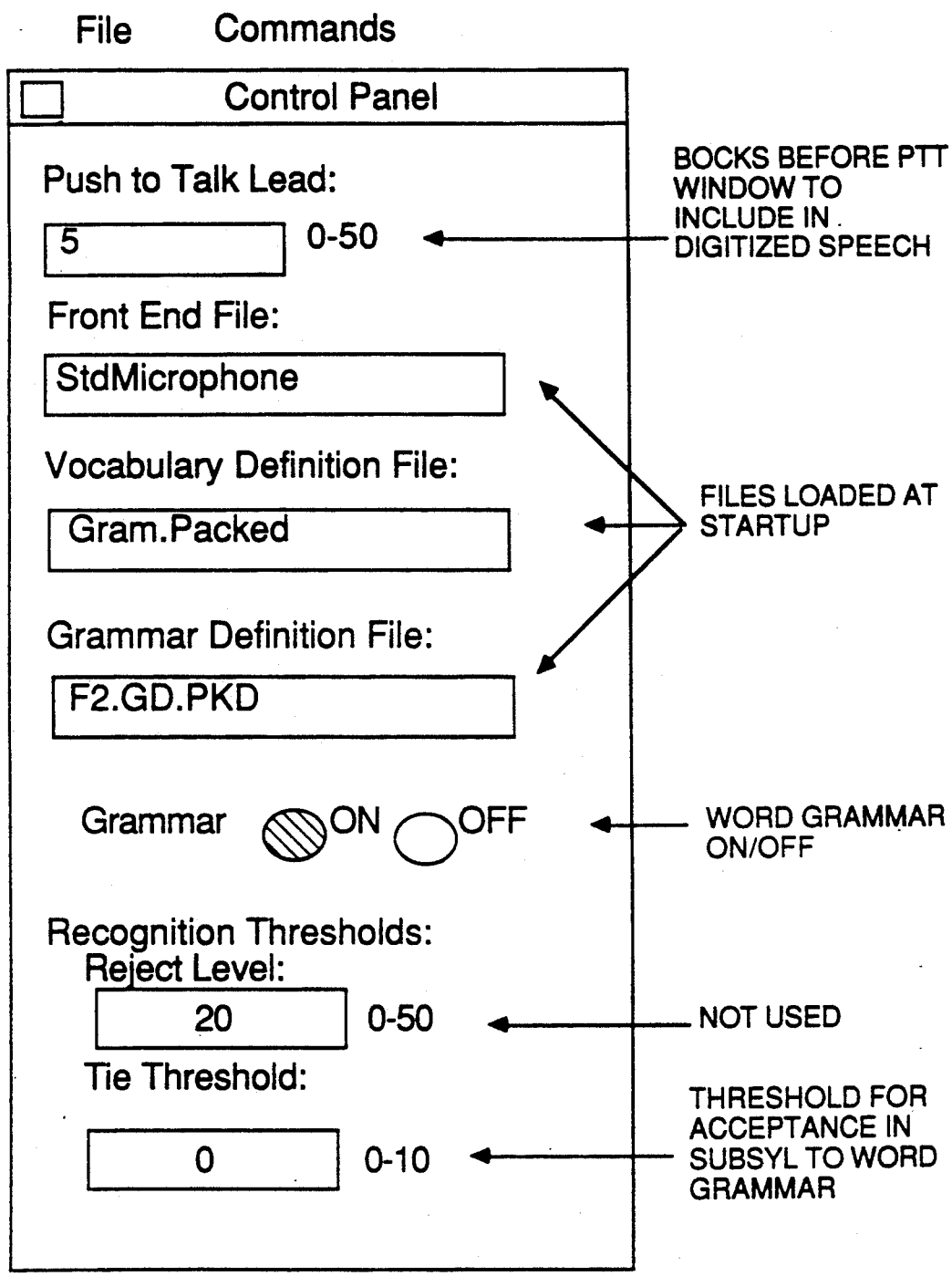
FIG. 15 illustrates menus accessed in the SIMSYST and DEMO modes.

Referring to FIG. 15, the Control Panel function allowed the operator to modify various parameters such as Grammar, Noise Thresholds, Push-to-Talk Lead, and the Tie Threshold. The parameters, ranges and values that were selected are shown in FIG. 15. On the DEMO control panel, only the Tie Threshold number would be changed. It was nominally set to zero, which means that only SubSyllable sequences with scores equal to the best sequence would be reported. On the SIMSYST Control Panel, both the Push-to-Talk Lead and the Tie Threshold could be changed.

3.2 SIMSYST

Figure 16:
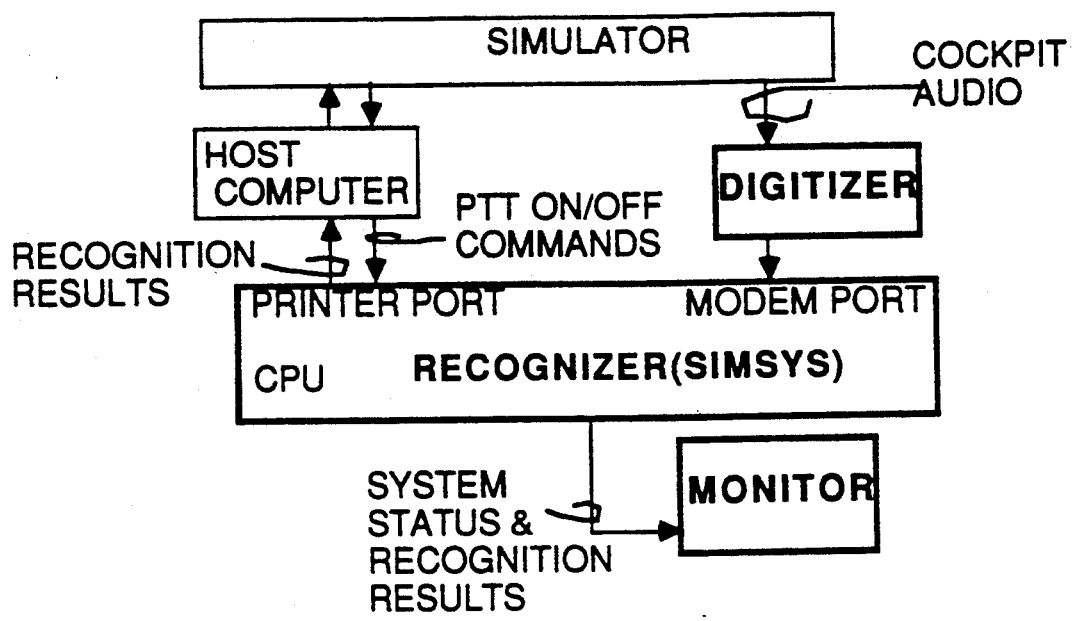
FIG. 16 is a block diagram of the SIMSYST mode of the recognizer.

SIMSYST allows a pilot in a flight simulator to use the recognizer as he would if he were in a cockpit. In the SIMSYST mode, the recognizer was connected to the simulator computer (the host), and controlled by commands given by the host. The connections required are shown in FIG. 16.

Figure 17:
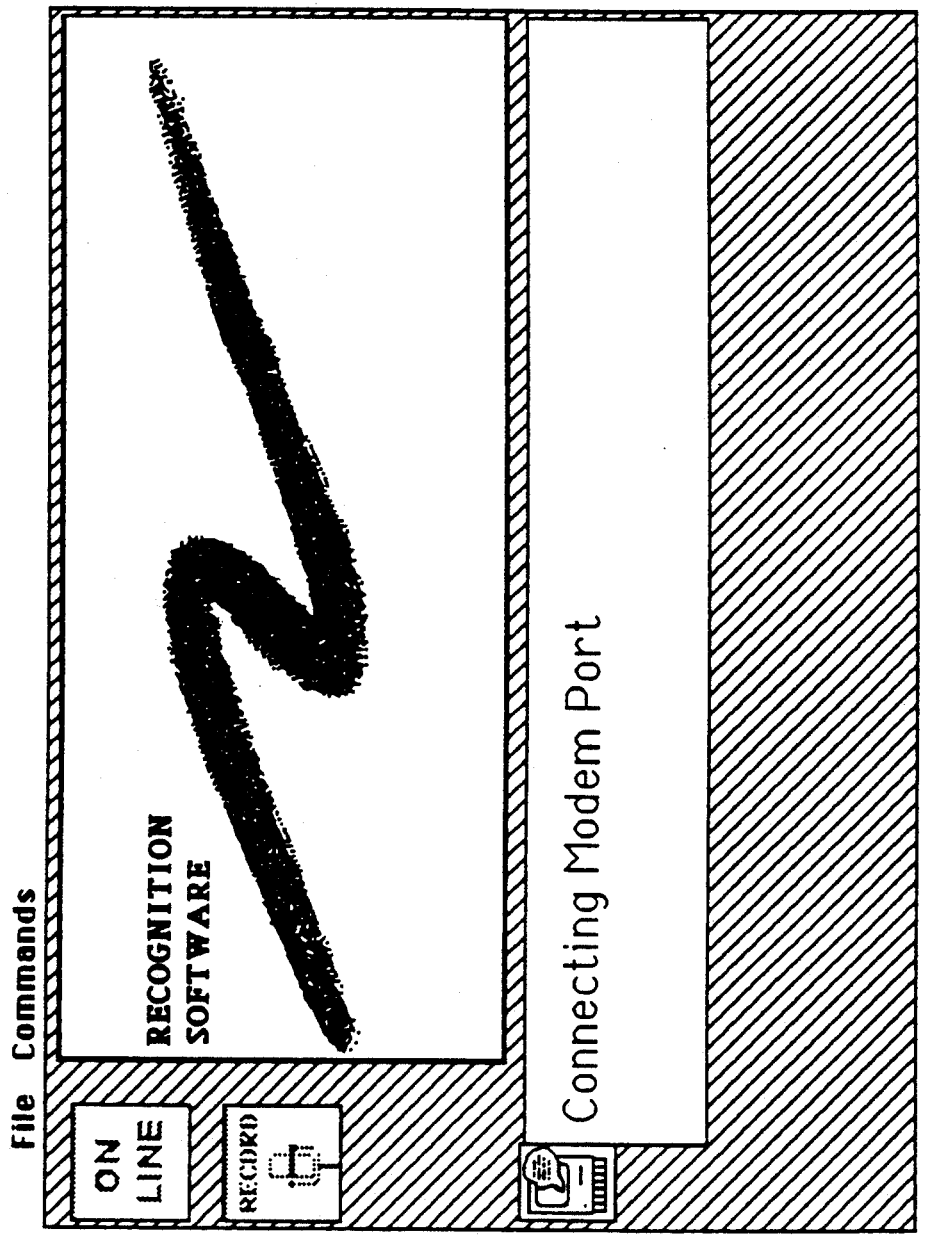
FIG. 17 shows a computer screen display used with the SIMSYST mode.

To access SIMSYST, the Shell icon has to be double clicked. Once in the Shell, the current directory was set to the SIMSYST folder by typing cd hd:aztec/simsyst followed by RETURN, then SIMSYST followed by another RETURN. The SIMSYST screen shown in FIG. 17 appeared in a few seconds.

As described above, SIMSYST can run either On-line or Off-line. A radio button reading Off- Line appeared in the upper left corner of the SIMSYST screen when it came up. When the letters were black, the system was operating on-line; when the letters were grey, the system was off-line. Clicking on this box toggles between the two states. The menus were active only in the off-line state.

The SIMSYST Control Panel menu had a box for Push-to-Talk (PTT) Lead. (See FIG. 15 above.) Increasing the number in that box increased the amount of speech processed prior to receiving a PTT-ON signal. In the PTT Lead box, 1 unit represented 0.1 seconds; the longest lead available was 5 seconds (50 in the PTT Lead box). For example, if the PTT lead was set to 0, only speech received after the PTT-ON signal would be processed. If the lead was set to 5, the recognizer would process all speech from 0.5 seconds before receiving the PTT-ON signal until it received the PTT-OFF signal.

When On-line, the recognizer in SIMSYST processed speech exactly as it did in the other two modes. The only difference was that the command to begin or end recording was given by the host computer. The pilot in the simulator pressed a PTT button when speech began, sending a signal to the host computer, which then sends an ASCII PTT-ON command over the RS232 cable plugged into the Macintosh printer port. (FIG. 18 shows a format for the ASCII PTT-ON and PTT-OFF signals.)

While the system was accepting speech from the digitizer, the RECORD button would be dark to indicate recognizer input, but there was no local (mouse) control of the RECORD function. SIMSYST then began to process the speech in the manner described above. When the pilot finished speaking, he would releases the PTT button, sending a PTT-OFF command to the host, which sent the same command to SIMSYST.

SIMSYST then sends ASCII characters back to the host, indicating the words that were recognized. SIMSYST encodes each word as a three-digit number corresponding to the word's position in the nt.list. FIG. 19 shows the Recognition Message Format and Appendix E shows the nt.list used for SIMSYST. The final report of recognition results would be made to both the host and the Macintosh screens.

3.3 DEMO

In the DEMO mode, an operator had a range of options for quick but thorough review of a speech sample. The DEMO mode operated with a mouse, and permitted all the options described in section 3.1. It also allowed for on-line digitizing of up to 18 seconds of speech. It will be appreciated that such capabilities are not to be considered restrictive of the invention.

Figure 20:
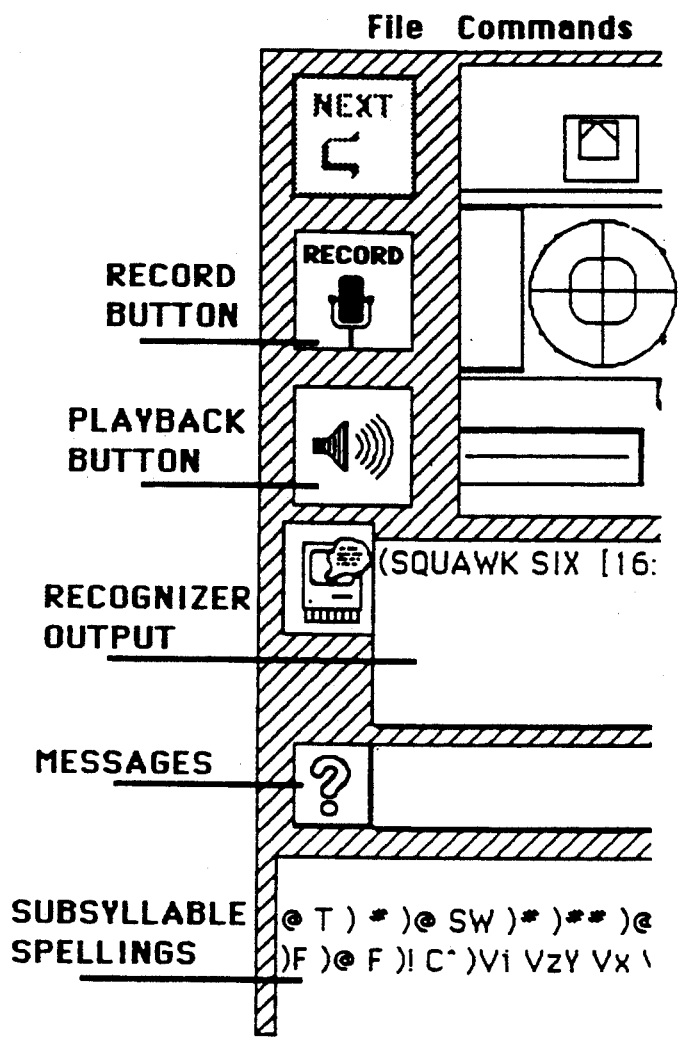
FIG. 20 shows a computer screen display used with the DEMO mode.

To use the DEMO mode, the Shell was entered and the current directory set to the DEMO folder. Type demo.flight, followed by RETURN caused the DEMO main screen, shown in FIG. 20 to appear in a few seconds. Once the main screen appeared, the system took a few more seconds to activate the digitizer. Once the "digitizer activated!" comment appeared in the Recognizer Output box, the system was ready. The digitizer activation process was identical to that in SIMSYST.

There were two ways to input speech in the DEMO mode: live speech directly from the digitizer, or saved speech from the Cspc folder. Saved speech was loaded using the Load option from the File menu. Live speech was entered by positioning the arrow cursor on the RECORD button (showing the microphone icon), which acted like a Push-To-Talk switch. The speaker pressed the mouse button just before beginning to speak and released it when finished talking.

By clicking the mouse on the PLAYBACK button (showing the loudspeaker icon), the current speech sample was played (whether recorded with the digitizer or loaded as a speech file) through the built-in speaker on the Macintosh or through an external audio speaker, if one was connected. Volume was controlled by the MACINTOSH control panel found under the Apple menu, and would be pre-set so that it could not be accessed while DEMO was running.

The recognizer output appeared in the box immediately below the cockpit graphic (and next to the one with the speech balloon emanating from a computer). SubSyllable spellings (for reference) appeared in the bottom box. (This bottom box was not visible on a MACINTOSH SE/30.)

Figure 21:
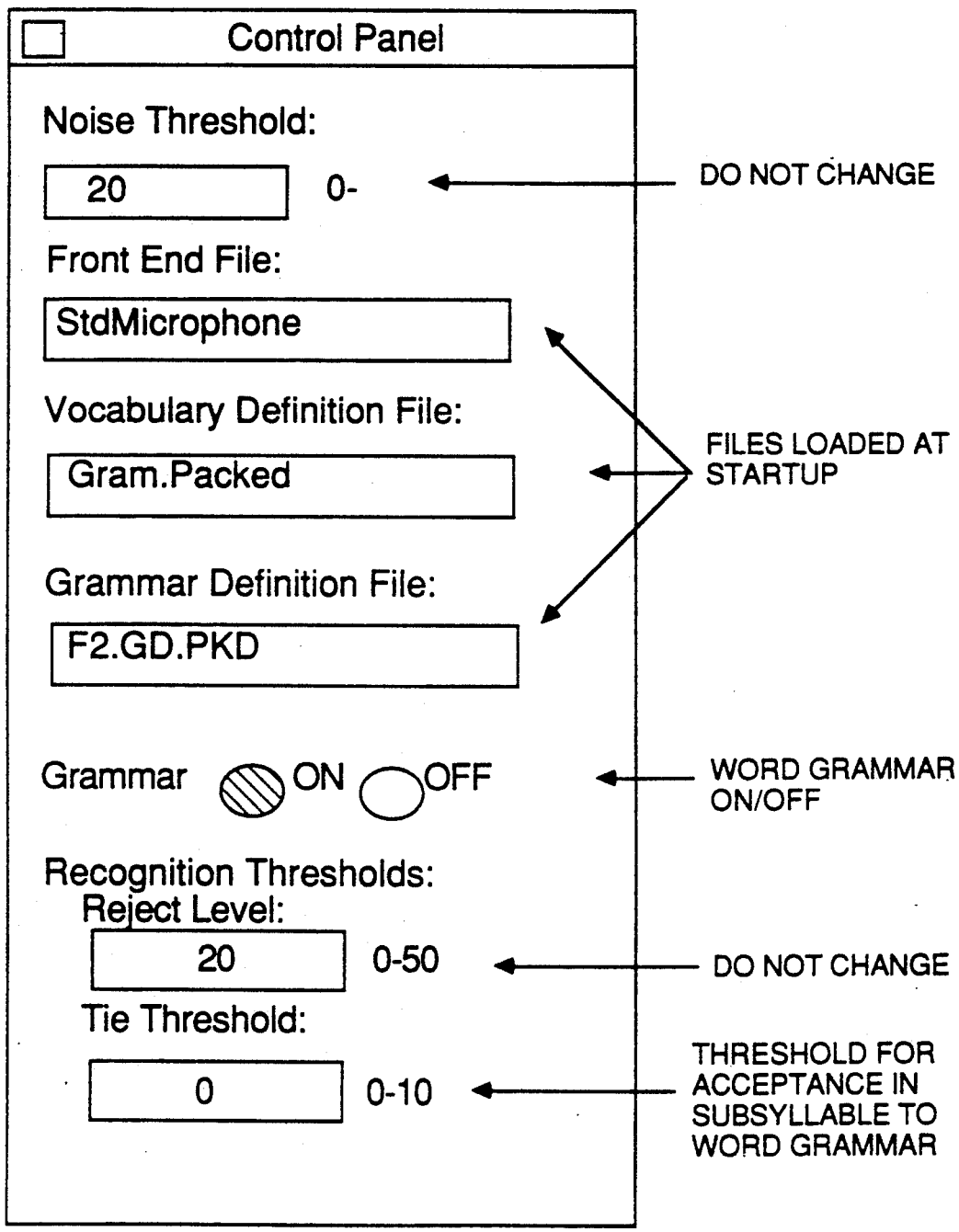
FIG. 21 shows a control panel used with the DEMO mode.

The DEMO Control Panel (FIG. 21) allowed the user to turn the Word Grammar on and off and to modify the Tie Threshold. For the best performance, the Word Grammar would be ON and the Tie Threshold would be zero (0). In the current version of DEMO, no other entries in the panel should be modified, although such adjustments would be useful for other versions.

A Re-Recognize option under the Commands menu forced recognition of the speech then currently in the memory. When a file was loaded from the memory, the re-recognize option would be selected to force recognition. When speech was entered via the RECORD button, the recognition process began automatically while the speech was being digitized.

3.4 CM5WF2

CM5WF2, the off-line research mode of the recognizer, produced detailed printouts of SubSyllable spellings for a speech file to add words to the vocabulary. It is a C program designed to take standard input from the keyboard and direct standard output to the screen. It could be run in this mode by connecting to the DEMO directory and typing CM5WF2 followed by RETURN. Prompts to enter filenames at the keyboard would appear and recognition results would be shown on the screen. However, this mode of operation was not convenient for processing and analyzing a large amount of files. Batch processing using redirection of the computer I/O is described below.

3.4.1 Getting Ready

Before CM5WF2 could be used to batch process files, the speech files to be run were processed for word-markings with the tool Mrk.Wsyl (see Section 3.4.2). In order to access these marked speech files on the hard drive or on a 3.5 inch floppy, and to run more than one file, an accessible list (filelist) of all the files to be processed needed to be created.

3.4.2 Mrk.Wsyl

The Mrk.Wsyl program was used to mark each word in a speech file for inclusion in the CM5WF2 program output. When the CM5WF2 program outputted the SubSyllable spellings of the spoken words, it also printed the words from Mrk.Wsyl to make it easier for the reader to compare the recognizer's performance to what was spoken.

The Mrk.Wsyl program was activated by double clicking the mouse on the Shell icon, typing mrk.wsyl, and then pressing RETURN. The program would prompt for the name of the speech file and ../cspc/filename would be typed without the .cspc extension in the filename. The program would then asked for three numerical settings. The first controlled the darkness of the spectrum display; the second was for smoothing the spectrogram so that its contours could be seen as continuous rises and falls. By not smoothing the spectrogram, sharper resolution in the time domain was obtained. Finally, the program asks for the Average Magnitude, a threshold below which spectra would not be displayed. A setting of 6 separated speech and noise in most files; if the noise level was high, the setting would be in the 10–20 range. A typical spectrogram produced by the Mrk.wsyl program and its settings are shown in FIG. 22.

Figure 22:
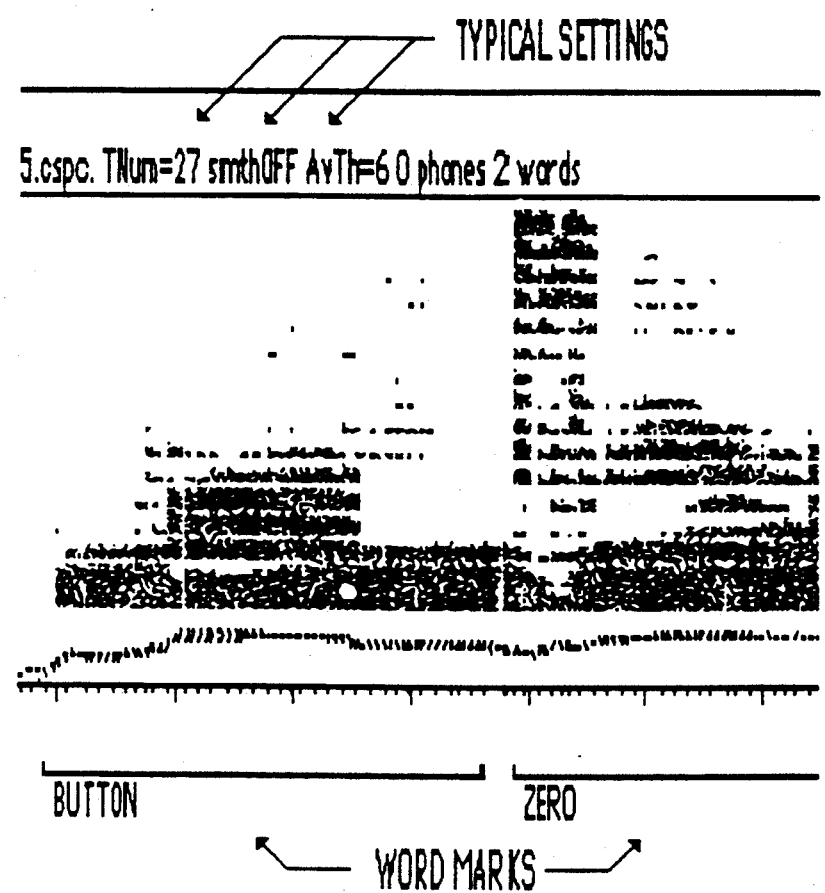
FIG. 22 is a speech spectogram produced by the CM5WF2 mode of the recognizer.

In a few seconds, the program loaded the requested speech file, displayed the spectrogram on the screen, and was ready for word marking using the commands shown in FIG. 22. After the word-marking was complete, the Save function saved the word markings in a text file using the file name requested, with the extension .wsyl. For example, word-marks for a speech file called pab456.112.cspc would be saved in the same folder as the speech file, but with the .wsyl extension instead of .cspc (the word-marked version would be called pab456.112.wsyl.) The extension .wsyl is appended automatically by the program.

3.4.3 Filelist

If there were several speech files to be run at the same time, a filelist was needed to direct CM5WF2 to the speech and wsyl files. In an Edit file, the full pathname for each file was typed on a separate line, followed by RETURN, without the ".cspc" or ".wsyl" file extensions in the file list. For example, if there were two files saved in the Cspc folder, john1 and art4, which were to be processed together, the file list would look like:

hd:cspc/john1 hd:cspc/art4

A RETURN after the last filename would be included in the list.

The name "filelist" was not required by CM5WF2; any name can be used. In some cases it may be preferable to use a different name. For example, if the Cspc folder contains speech samples from ten different individuals, it may be helpful to have one list for all the speech samples in the Cspc folder, plus ten shorter lists, one for each of the individual speakers.

The list for all the files could be called "filelist", and the short lists could be called "pat.list," "chris.list," "sandy.list," etc. For the purposes of explaining how to use CM5WF2, "filelist" is used here.

3.4.4 Running CM5WF2

Once the speech files had been word-marked and a filelist created for the files to be run, batch processing was ready to begin. To use CM5WF2, one would double click on the Shell icon, then set the current directory to the DEMO folder. Once in the shell, one would type:

```
cm5wf2<filelist>word.log
```

After pressing RETURN, the prompt disappeared and CM5WF2 began reading the first file on the filelist (in the example from 3.4.3 that would be john1). CM5WF2 searched for .cspc and .wsyl files with that name. Using the speech files, SubSyllable spellings were created and recorded in an edit file called word.log.

The output document did not have to be named "word.log". If speech samples from one speaker are being run, it could be worthwhile to name it, for example, "chris.log". Thus, rather than typing "word.log" in the above command, the preferred file name ending with the extension .log would be typed, clearly identifying that file as CM5WF2 output. Once the CM5WF2 program was finished with the first file on the filelist, it began work on the second file, and so on until there were no more files on the list.

The length of time required to complete the CM5WF2 program varied proportionally with the number of files being run. When CM5WF2 finished the last file on the filelist, the prompt reappeared. If more than one file was being run, and the prompt reappeared in only a few seconds, the filelist would usually be checked to make sure it described the file pathnames correctly.

Since the output from the CM5WF2 word.log (or whatever name was used) was not in a format that made for easy review, it usually needed some editing. There are two approaches to this editing; the one chosen depends upon the length of the word.log. For very short word.logs, it was possible to handle all the editing and printing from the Edit application. When the prompt returned, indicating the completion of CM5WF2, one would type:

```
edit word.log
``` and then see single-spaced SubSyllable spellings with no right margin. The accompanying words appear along the left margin, as shown in FIG. 24. Since Edit truncates long lines in printing, returns would be inserted in lines that extend off the screen. Once this was done, the document is ready to be printed out. For longer word.logs (more than 3 or 4 pages), hand-editing could be a time-consuming effort, and other means of editing could be provided.

For word.logs more than approximately 30 pages long, it is worthwhile to cut the word.log into several MacWrite files. It is much easier and faster to transfer the text into a MacWrite file because MacWrite automatically adjusts margins for both screen display and printing.

To do this, the machine would be restarted and double clicked on the MacWrite icon. When MacWrite is open, open the word.log. Once the text is in place, use the SELECT ALL option under the Edit menu to change the type size to 9 point, which will provide a reasonable amount of information on a line. Changing type size will take awhile to complete, and the right margin set to eight inches. At this point, creating a header with the date, a footer with page numbers, selecting double spacing, or exercising other MacWrite options before printing would be carried out as desired.

In the word.log, the program version is shown at the top of each file. The name of the file processed appears below the version information. Word marks from the .wsyl file appear at the beginning of lines in double square brackets ([[]]) to guide the eye towards the SubSyllable estimates for that word. The SubSyllable estimates for the word follow the word marks in most cases; however, due to the nature of speech, part of the spelling may extend to the following line. Finally, the recognizer output is shown in parentheses with the resulting Word Grammar state in square brackets.

Figure (?) illustrates the possible symbols in a word.log, and provide a brief explanation of each.

3.5 GramTools (SubSyllables to SubWords)

GramTools was the tool used to build the SubSyllable spellings. For each word, there are a variety of phonetic spellings acceptable during the recognition procedure. These various spellings are typed into files in the format described in section 4. Gramtools and related files were located in the Gram.src directory on the DEMO disk.

3.6 F1 Tool (SubWords to Words) F1 Tool was the tool used to build words, such as THIRTY, from SubWords, such as THIR- and -TY. The SubSyllable portion of the grammar can be simplified by allowing F1 to incorporate all possible combinations of SubWords automatically. F1 is a state diagram representation showing which SubWords may combine to form an acceptable word.

As the recognizer proceeds through an utterance, it determines whether any contiguous SubWords can be combined to form a word based on the state diagram in F1. The state transitions are entered into a file in the format shown in FIG. 26. The F1 Tool and the F1 source file are located in the F1 directory on the SUPPORT TOOLS disk and are installed when the entire folder is moved into hd:aztec.

A source listing of F1 is given in Appendix B.

To modify the Syllable-to-Word function of the recognizer, one would:

1. Connect to the F1 directory.
2. Copy the source file to a new file (e.g. NewF1.src).
3. Edit NewF1 to add new functions at the end of the file, without changes in the numbered sections as the recognizer relies on these state numbers remaining unchanged.
4. Save NewF1 and Quit the Editor.

5. Type: F1Tool followed by RETURN. When prompted for a "text file," type NewF1.src followed by RETURN.
6. Answer N to "Include lines with semi-colon?" Answer Y to "Make Listing File?"
7. After processing NewF1.src, the program will prompt, "Another file? Filename if so, else <RTN>." Press RETURN and the packed output file will be created and saved to the F1 directory.
8. Copy NewF1.pkd to DEMO/filter1.pkd.

3.7 F2 Tool (Word Grammar)

F2Tool was located in the directory F2 and was run from the Shell. The input to F2tool was a text file or files containing the current state definitions for the Word Grammar.

The format of F2 source is illustrated in FIG. 27, and a source listing is given in Appendix C. Each state name is followed by a list of transitions from that state to other states. There is at most one transition for each word in the vocabulary. Words are represented by their mnemonics as specified in the file nt.list.

Figure 28:
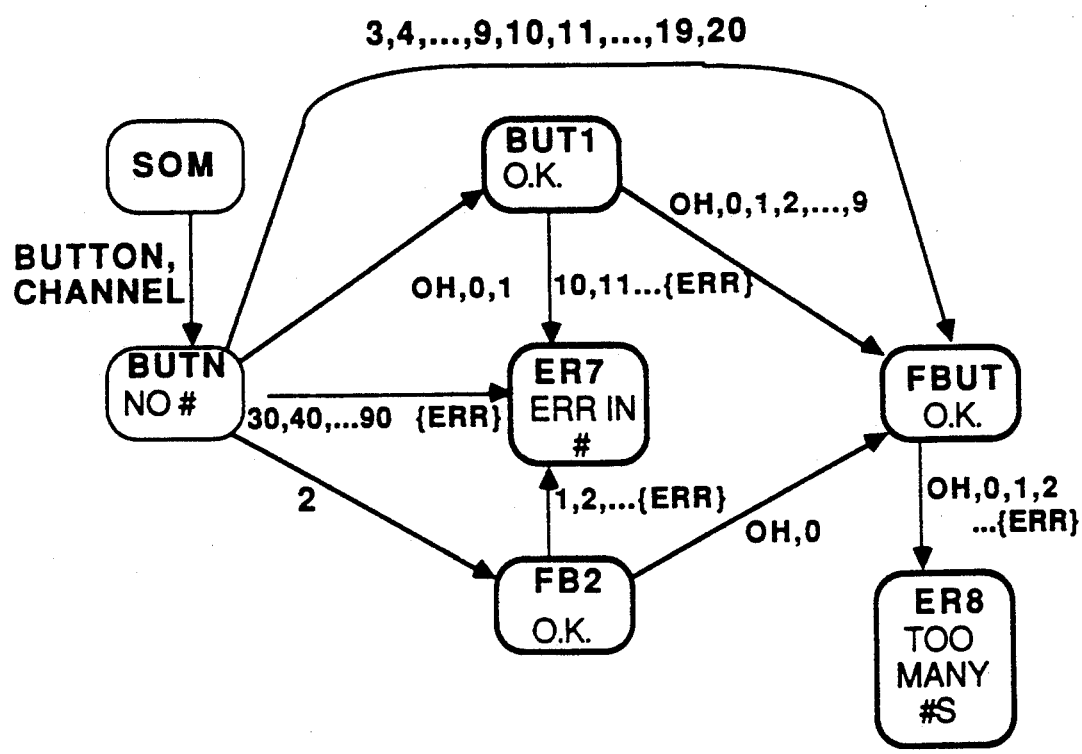
FIG. 28 is a state diagram corresponding to FIG. 27.

A transition followed by a colon and then text in curly braces specifies a grammatical error. The only error type currently recognized is (bs) for "bad syntax," although other error types such as those in Applicant's U.S. Pat. Nos. 4,980,917 and 4,994,966 can be used. FIG. 28 is a traditional state diagram corresponding to FIG. 27 F2 Source Format.

To complete rebuilding F2, one would type F2Tool, then press RETURN. The system would respond by indicating the program name and date or last revision, followed by the size of the F2 table. It then asked which text file needs to be rebuilt. One would usually answer N to "Include lines with semi-colon? (Y/N)," and answer Y to "Make Listing File? (Y/N) (recommend Y)." At this point, the system would display line after line from the text file. At the end, the system would ask "Another file? file name if so, else <rtn>." This allows several files to be chained together to define a large Word Grammar. If another file was to be added, the filename would be entered and the two questions explained above would be asked.

The process would be repeated until all the files to be added had been entered into the tool. Finally, when no other files needed to be entered, RETURN was pressed in response to the question "Another file?" The tool then packed the source files into one output file, displayed the results on the screen, and recorded the results in the Listing File. When the cursor returned, F2, the Word Grammar was rebuilt and ready to run.

The resulting packed file would be xxx.pkd, that would be copied to ..DEMO/f2gd.pkd for operation with demo.flight and to ..DEMO/f2.pkd for operation with CM5WF2. For the present embodiment, the Word Grammar for demo.flight was built from the following source files:

f2gd.aet.new f2.gd.2.new and the CM5WF2 Word Grammar for Version 1.9 was built from:

f2gd.aet.new f2.gd.3.sk89

A text file called "read me" in the F2 folder listed the current source files and recommended usage for different versions of the Word Grammar.

As a result of rebuilding, F2Tool assigned state numbers to the state names in the F2 text file (see FIG. 29). The file f2.msg (in the DEMO or SIMSYST folders) associates each of these state numbers with a message (see FIG. 30) that is displayed with recognition results when the grammar is on.

The file f2.msg can be modified using Edit. The numbers shown inside the brackets are for reference only; they may be deleted. Each line of f2.msg is assigned to a successive state independently of the text on the line. With the present hardware, messages could not be longer than 39 characters including the brackets, although other hardware could have other capabilities.

The process by which words can be added to a vocabulary is discussed below. It deals primarily with SubSyllable spellings, although the Word Grammar may also be modified, if necessary, to recognize the new words. Throughout the following, phonetic spellings are rendered in an internal phonetic alphabet detailed in Appendix F. It will, of course, be understood that other alphabets could be used.

Words are added to the vocabulary by writing SubSyllable spellings to describe them. The objectives in doing this are: (1) to maximize recognition for the word in question by including a wide variety of pronunciations in the spellings; and (2) to minimize overlap (confusion) with existing words.

These two objectives are sometimes at odds. For example, a spelling of FIVE in which the /f/ and /v/ are both assumed to be lost in the noise may look very much like a spelling of NINE in which both the initial and final /n/ are similarly lost in the noise.

The variation in pronunciation that must be accounted for in the spellings can come from a variety of sources:

| | |
|---|---|
| dialect: | FIVE may be /faiv/ in one part of the country and /faf/ in another. (See below for more discussion of dialect variation in the U.S.) |
| idioelect: | An individual may exhibit a speech pattern on occasion or constantly that differs from the "theoretical" norm for a word or group of words. In the command database, two speakers would sometimes pronounce BUTTON with a leading /m/ as in /mb&!n/, even though such a pronunciation is not phonemic (theoretically should not happen) in English. |
| speaking rate: | As speaking rate increases, there are a variety of phonological processes (changes) that come into play in American English. For example, word medial unvoiced stops may be reduced to voiced stops: normal TACAN = /tAkAn/, at speed = /tAg&n/. Word medial voiced fricatives may disappear: normal SEVEN = /sEv&n/, at speed = /sE&n/. |
| effects of background noise: | In the presence of even moderate background noise, the weak fricatives, /ff, /v/, /Q/, and /q/ may be indistinguishable from the noise. Since the system treats sounds comparable to the background as effective silence, spellings for |

-continued words involving these sounds must
include the possibility that these
sounds won't "be heard."

4.1 Physical versus Perceptual Reality

One's knowledge of speech as an individual speaker of English and, indeed, much of linguistic theory are based on a perceptual reality. That is, they are based on what one thinks one hears (phonemics) rather than what is actually said (phonetics).

If asked to produce the sound /z/, most English speakers would produce the characteristic voiced buzzing should associated with that phoneme. If, however, one looks in detail at the pronunciation of the word ZERO by a variety of speakers, one finds that it is often rendered as /szIro/ rather than /zIro/. One hears /sz/ in word initial position as /z/.

The onset of voicing also varies in the pronunciation of the word THREE, which ideally begins with unvoiced /Q/ followed by voiced /R/. In fact, detailed analysis shows the /R/ is often partially, or even mostly, unvoiced. For most of us, this effect is detectable only by listening to small segments of the speech in isolation. When the articulation is heard as a whole, we hear the phonemic sequence /QR/.

We also hear word boundaries in speech that have no physical realization. In the sequence "ONE NINE," the two words can share a single /n/ of brief duration. There is no lengthening of the /n/ or break in the acoustic signal to indicate a word boundary.

Similarly, the sequence "SIX SEVEN" has a shared /s/. Compare the rapid pronunciation of "SICK SEVEN". Both sequences are written phonetically as /sIksEv&n/, and to the best that we have been able to determine, can be produced with identical intonational patterns. The decision that the first word in SIX or SICK is made entirely from the listener's expectations based on the syntax, semantics, and pragmatics of the remainder of the utterance.

SubSyllable spellings are the mechanism for translating from physical to perceptual reality. Variations of the sort cited above explain the need for multiple spellings of perceptually simple events and the need for a grammatical component as the final arbiter of segmentation.

4.2 Acoustic Realization of Phonemic Events

FIG. 24 which shows the possible SubSyllable outputs from the acoustic front end, summarize the description of physical reality deduced by the present system. The discussion in this section provides the converse, a mapping from phonemic or perceptual reality to physical reality.

FIG. 31 gives typical spellings used for the most common phonemic events. Examples of less common events can be found in the source listings in Appendix A. Note that the spelling of a phoneme depends on its position within the word. In particular, initial and final stop consonant are spelled very differently.

There are two steps in writing SubSyllable spellings for a new word: first, breaking the word into its major physical components, and second, determining the possible variations of each component.

The major physical components are these "milestones" in the word: fricatives (especially unvoiced), stops, nasals, and vowel segments. They are events that are almost certain to be detected in some form by the phonetic front end, in spite of variation in dialect or background noise. Transitions between vowels and liquids (/l/ or /r/) or vowels and other vowels (e.g., glides) should not be boundaries between major physical components, since these transitions are subtle and often dialect dependent. The major physical components of a few words are shown below.

| SIX | F | V | # | F |
|---|---|---|---|---|
| | s | I | k | s |
| FIVE | F | V | F | |
| | f | ai | v | |
| FOUR | F | V | | |
| | f | or | | |
| ZERO | F | V | | |
| | z | Iro | | |

The variations for each component are best determined 1. considering the effects of background noise
2. considering the effects of dialect
3. considering the articulatory movements required for neighboring components and the effect they may have on the "standard" movements for this component
4. observing actual CM5WF2 output for several speakers.

Taking SIX as an example, some of the kinds of variation observed in a database of more than 50 different speakers are described below.

Fricatives can vary in length. Ideally, both fricatives in SIX should be Fs. In fact, TFs is very common, and if portions of the /s/ are weak, Ts or even Ts #Ts (/s/ so weak it is fractured into small pieces separated by silence) are possible. The weaker forms of /s/ are more common from female speakers where the higher frequency of the primary resonance is beyond the bandwidth of many standard communication systems.

Vowels can vary in length depending on dialect, idiolect, and speaking rate. SIX tends to have very short vowels. Partly this is caused by late onset of voicing (to provide a clear /s/ versus /z/ distinction) that renders a portion of the vowel unvoiced or whispered. The most common vowels in SIX are C^v (change interval only, no stable vowel) and C^VI Cv (one unit of vowel). Forms with 2 units of vowel are rare (certainly less than 10% of the utterances) but possible, as are forms with a dipthong: C ^ VI Cv V& Cv as in /sI&ks/.

For stops the gap may be missing. A stop between two vowel segments is most likely to reduce to Cv^, while a stop with a fricative adjoining may become a fricative. Sometimes in SIX, the /k/ is pronounced as a velar fricative (not phonemic in English) and classified by the phonetic front end as a portion of the second /s/.

4.4 ENDings

Figure 32:
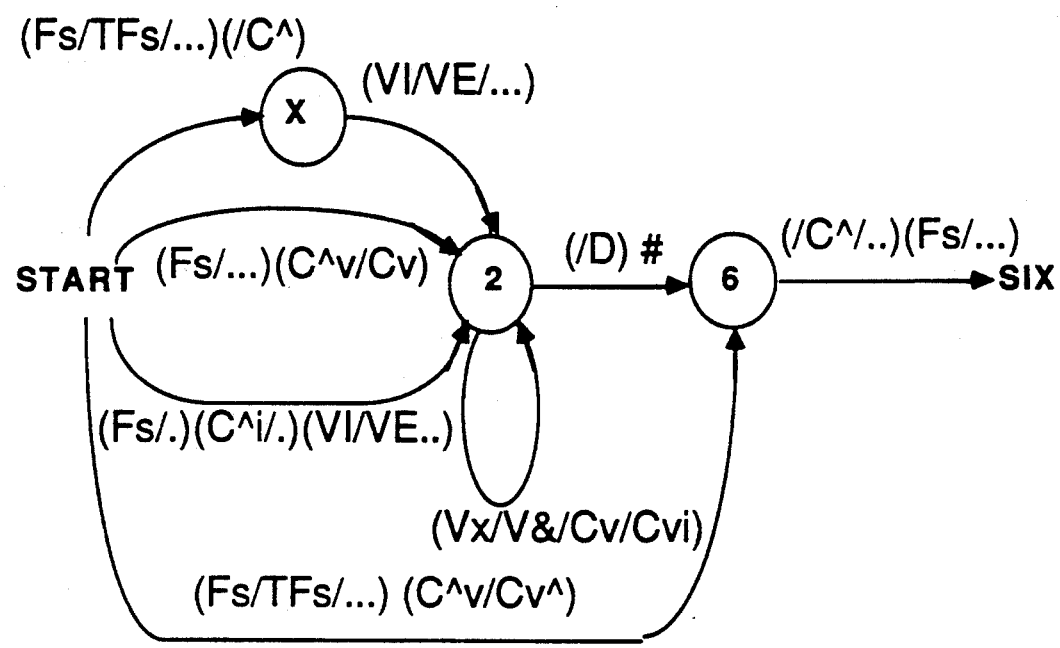
FIG. 32 shows a state diagram for SIX.

FIG. 32 is a state diagram summarizing the observed pronunciations of SIX. Such a diagram can be translated directly to source format for SubSyllable spellings as shown in FIG. 33. Each state in the diagram becomes an ENDing in the source file. ENDings can be shared between words. FIG. 34 shows the ENDings used in the present embodiment and the phonetic sequences that lead to each one.

4.5 ENDings versus Non-terminals

The function of ENDings is similar to that of the Syllable-to-Word grammar. At some point after a word is broken into its major components, one must decide whether to use ENDings or non-terminals to record the various milestones in the word. In general, ENDings are used for "prefixes" or for "suffixes" that are not commonly used. Common "suffixes" (especially those appended to existing words in the vocabulary) are best rendered as separate non-terminals that are joined by F1 (Syllable-to-Word grammar).

In the embodiment for the aircraft cockpit, -TY and -TEEN were implemented as separate non-terminals that could be pasted together with other words in F1. Had they been implemented as ENDings, we would have had separate ENDings for each case, all implementing the identical network, i.e., THIRTEEN, FOURTEEN, FIFTEEN, etc. would each have ended in a network differing only in name, not in structure. By making -TY and -TEEN separate non-terminals, we have only one copy in the on-line system, and only one copy to be maintained in the source.

4.6 Using the Tools

Programs for modifying or adding words may be provided in the /gram.src folder in the MacIntosh implementation. Source files for words have the .src extension. It is convenient, but not necessary, to place all the spellings for a given word in one file. Occasionally, more than one word may be placed in a source file, but doing so would result in entire files (not individual words) being included or excluded when packing a vocabulary. Thus everything in one file will either be in the vocabulary or not. There is no way to select a portion of a file for inclusion. The source files for the aircraft cockpit embodiment are listed in Appendix A.

The rules governing the format of source files are summarized below:
1. A non-terminal or ENDing preceded by "$" starts a block of definitions that specify paths to that entity. The "to" definition holds until another is encountered.
2. A line starting with *END_specifies that all transitions are from that ENDing.
3. A line that does not start with *END_specifies transitions that start from scratch (i.e. that can start a word).
4. Alternates are specified by enclosing the list in parentheses and delimiting individual items with "/".
5. Any line containing alternates must begin with "*".

Source files cannot be processed directly by the packing tool. The expander must first be run to undo the short hand for alternates ("/") and to separate those spellings that start from scratch from those that start from ENDings. For each source file the expander produces two output files: one with a .root extension and one with a .end extension. The root and end files should not be edited (even though they are text files) since the next time the expander is run, they will be over-written. The expander can be used on a single file by connecting to /gram.src and typing expander, then RETURN.

The expander will prompt the user for the file(s) to be processed. It can also be run in a batch mode by typing: expander<exp.list, then RETURN. The file exp.list contains a list of all the files used in the current vocabulary.

It is useful to examine the lengths of all the root and end files from time to time. If the expanded forms of a word (i.e., either the root or end file) seem excessively long (more than 10K characters), judicious inclusion of some ENDings or loops may reduce the size and thus increase on-line speed.

Once the source files have been updated and expanded, the actual on-line packed files can be built. Using the folder gram.src/cmdgram. The usual steps for re-building are:
1. connect to gram.src/cmdgram; and
2. type: DoGram, then press RETURN The file DoGram is a script for building the.packed sybsyllable spellings and producing three files, gram.-packed, end.packed, and syl.list, all of which should be copied to the operational folder (/DEMO or /SIMSYST). The contents of DoGram for the aircraft cockpit embodiment are shown in FIG. 35. The folder /cmdgram also contains several scripts (e.g., cyptoflt) for copying the three files to other directories. These can be modified to reflect any file folder set-up, and other packing schemes can also be used as suitable.

If the DoGram program failed to execute the last step (an ls −1 of the relevant files) or if the date/time stamps on the packed files were not current, the two records made of the packing process (end.log and root.log) would be examined. Error conditions that halt the packing process are noted in the logs. The packer can handle very large files. The current limit on packed file size is set by the on-line recognizer programs, which set aside 32K bytes to hold gram.packed and end.packed. Thus, the sum of the sizes of these two files should not exceed 32K for the aircraft cockpit software. It will be understood that more memory can be set aside for larger vocabularies or other reasons as desired.

A readable display of the packed subsyllable spellings can be produced with the script file mkshowlogs, which produces two files show.root and show.end displaying the packed structure of the root and ENDing spellings. This display is particularly useful for identifying commonality of spellings for words that originate in different source files.

5.1 Quick Reference

This section contains the commands used to enter each of the three modes. For an in-depth description of SIMSYST, DEMO, and CM5WF2 and how they function, see the discussion in section 3 above.

5.1.1 SIMSYST

SIMSYST is used in conjunction with a flight simulator host computer. From the Macintosh Finder:
  Double click on the Shell icon;
  Set the current directory to the SIMSYST folder; and
  Type: simsyst, then press RETURN.

The recognizer is active in the on-line mode, and receives all instructions from the host computer via PTT-ON and PTT-OFF signals. In the off-line mode, the user has access to all the menus shown across the top of the SIMSYST screen. A more complete description of SIMSYST, is given in Section 3.2.

5.1.2 DEMO

DEMO is used for phrase recognition, with input to the system either from saved speech files, or directly from the digitizer. From the Macintosh Finder:
  Double click on the Shell icon;
  Set the current directory to the DEMO folder; and Type: demo.flight, then press RETURN. Once into the system, the operator has access to all the menus shown across the top of the DEMO screen. After a file is loaded from a disk, the option Re-recognize, under the Command Menu, must be selected to force recognition. When speech is input directly from the digitizer, recognition begins automatically during the recording process and continues to completion after the mouse button has been released. A more complete description of DEMO, is given in Section 3.3.

5.1.3 CM5WF2

CM5WF2 is the research mode of the recognizer, and is used to obtain detailed printouts of SubSyllable spellings. It uses only saved speech files, and usually operates using a text file called a filelist. To batch process files from the Macintosh Finder:
Double click on the Shell icon;
Set the current directory to the DEMO folder; and
Type: cm5wf2<filelist>word.log, then press RETURN.

The recognizer will begin work on the files indicated on the filelist. When the prompt returns, the word.log will need to be edited into a form which can be printed. To process a single file with results printed to a screen:
Double click on the Shell icon;
Set the current directory to the DEMO folder; and
Type: cm5wf2, then press RETURN.

When prompted, type the name of the speech file to be processed. A more complete description of CM5WF2 is given in section 3.4.

5.2 Troubleshooting Guide

Some of the more common problems and their causes are given below.

5.2.1 SubSyllables added to spellings do not take effect

Check whether the expander was run on all modified source files. To do this, connect to gram.src and type ls-lt and then RETURN. The .root and .end files should have more recent data/time stamps than the corresponding .src files.

Check whether the tools finished packing both segments. Connect to gram.src/cmdgram and examine the files root.log and end.log using Edit. Errors in the packing process will appear here. In the Shell, type ls-lt then RETURN. The files gram.packed and end.packed should have date/time stamps nearly identical to those on the logs.

Check whether the packed files and syl.list were copied to DEMO and SIMSYST. Compare the date/time stamps on gram.packed, end.packed and syl.list in gram.src/cmdgram and DEMO/. They should be identical.

5.2.2 DEMO or SIMSYST hangs at startup

After using DEMO or SIMSYST, it is necessary to restart the system (from the Special menu in the Finder) before running again in a real-time mode.

5.2.3 F2 State messages are scrambled

If the packed F2 grammar is modified, it is necessary to check the state numbers in the F2 xx.1st file (in F2/) against the exx.msg files in DEMO/ or SIMSYST/. There should be one line in the .msg file for each state in F2.

5.2.5 Host computer is not communicating with SIMSYST

Check that the RS-232 cable from the host is connected to the printer port on the Mac. Check that the host's pin assignment for Rx and Tx is compatible with the Mac's (see appendix G for the Mac pin-outs). Try inserting a null modem (Rx/Tx interchange) between the Mac and the host.

5.3 Dialects of American English

It is well-known that spoken language varies among speakers. This inter-speaker variation has various bases. It may be the idiosyncracies of a speaker, including anatomical and physical factors (such as the size and shape of the speaker's vocal tract), or the particular lexical choices of the speaker. Other sources of variation have a socio-linguistic basis, speech differs according to both the social group of the speaker and the geographical area in which the speaker lives or was raised.

In the field of speech recognition, this variation from speaker to speaker is a pressing problem. If one is able to design a system that will recognize most of what one speaker says, the same system may not be able to recognize any speech from another speaker. The present speech recognition system is designed to take into account the dialectic variations within the United States, making it possible for a wide variety of speakers to use the same system.

For the recognizer to function accurately with any speaker, it is necessary to know exactly the typical dialect variations that exist within the United States. To do this, audiotaped samples of speech from a wide range of speakers were obtained for testing and shaping the system. In addition, literature on the subject was surveyed to extract the general regional differences in pronunciation. These two sources of data pointed to the same conclusions, summarized below, regarding how English is spoken in the United States.

5.3.1 Variation of Vowel Pronunciation

The most prominent aspect of dialectic variation in the data is the variation of vowel pronunciation. The variation may be divided into quantitative (length, diphthongization, and triphthongization) and qualitative (place of articulation) variation.

Diphthongization, even triphthongization, of monophthong vowels is fairly common in the southern regions of the United States, and appears frequently in the database. For example:

|  |  |
|---|---|
| /E/ > /EI/ | /i/ > /I&/ |
| /o/ > /aO/ or /OU/ or /O&/ | |
| /u/ > /uw&/, as in 'cool' | |
| /i/ > /iy&/, as in 'machine' | |

Also under the quantitative heading is the weakening, or monopthongization, of a diphthong, where the second element of a diphthong is weakened or lost. In those cases where the second element is lost, the resulting monophthong is typically lengthened. While this phenomenon occurs mainly in the South, it also occurs in the southern Midwest, Midlands, and Plains areas. Diphthong weakening is context sensitive, occurring primarily before voiced consonants and in word-final position. For example:

'eight' [eit] > [e&t]
'five' [faIv] > [fa&v] > [fa:v]

Qualitative alternations of vowel pronunciation occur in most regions of the United States, and in many foreign accents. Alternations include vowel lowering, raising, and fronting. In many cases, the alternations are influenced by the phonetic environment.

Lowering occurs throughout the South, and involves lowering the "standard" point of articulation. For example:

/I/ > /E/, as in 'milk' or 'thing'
/ei/ > /e&/, as in 'eight'

Raising occurs in the South, South Midlands, and to some extent in the Northeast, for example:

/E/ > /I/, as in 'pen' or 'length'
/A/ > /E/, as in 'bat'

Fronting occurs in many regions, and consists of back vowels being articulated from more frontal points. For example:

/O/ or /o/ > /a/, as in 'on'

Like fronting, changes in unstressed vowel quality in word final position occur in many regions. An unstressed vowel in final position often becomes /&/, /i/, or /I/.

5.3.2. Other Types of Variation

Vowel quality and quantity are not the only distinguishing factors for dialects in the United States. Below are several other factors.

For many speakers, /R/ has a retroflex pronunciation in all environments. In the South, and along the Eastern Seaboard, however, a post-vocalic /R/ is pronounced as a non-syllabic /&/, or is marked only by lengthening of the previous vowel. For example: /fo&/ for 'four.'

Among speakers in New England, primary stress may shift from the first to the second element of compounds.

With the number of Hispanic people living and working in the United States, it is anticipated that a Hispanic accent will become a very common dialect in the United States. Typical for Hispanic English is the devoicing of /z/, and the monophthongization of American English diphthongs, such as /ei/ rendered as /e/.

All these regional variations have to be taken into account when developing new vocabulary items for the ASR system, if the system is to remain speaker independent. During the development process it is important to obtain speech samples from a wide variety of dialects to ensure that all variant pronunciations are represented in the SubSyllable spellings.

For more detailed information on dialects, please refer to:

Allen, Harold B. & Michael D. Linn, eds. Dialect and Language Variation. Academic Press, Orlando: 1986;

Cassidy, Frederick G., ed. Dictionary of American Regional English, Volume I. Belknap Press (Harvard University Press), Cambridge: 1985;

Ferguson, Charles & Shirley Heath. Language in the USA. Cambridge University Press, Cambridge: 1981; and Perkell, Joseph S. & Dennis H Klatt. Invariance and Variability in Speech Processes. Lawrence Erlbaum Associates, Hillsdale: 1986.

GLOSSARY

CM5WF2 One of three modes of operation for the recognizer. CM5WF2 is the research mode, which processes batches of speech files. The output is recorded in an Edit file.

C-Shell A Unix-like operating system that runs under the Finder on the Mac. All the delivered programs operate in the Shell environment.

.cspc The extension given to a file of digitized speech. Taken from the full name "companded speech."

Demo One of the three modes of operation for the recognizer. DEMO uses mouse control to digitize or load and then analyze speech samples. Recognition results are reported on the CPU screen.

Edit Support program supplied with the C-Shell used to edit standard ASCII text.

ENDings The mnemonics used for states in the SubSyllable spelling network.

Expander A tool used on SubSyllable source text files.

Filter 1 The component of the recognizer that combines SubWords or syllables to create words.

F1 Tool The program that constructs a packed F1 table from a text F1 source file.

Filter 2 The component of the recognizer that determines whether or not a given phrase is grammatical.

F2 Tool The program that constructs a packed F2 table from a text F2 source file.

Filelist A text file used by CM5WF2, indicating the pathnames of all files to be processed by CM5WF2 in a given batch.

Frame A set of SubSyllable spellings from the acoustic front-end. Frames are distinguished from one another by the mark ")".

GramTools The program that constructs the SubSyllable Grammar. This program must be run each time revisions are made to the vocabulary.

Mrk.Wsyl The program used to create a word-marked file, in which all the words spoken on a .cspc file are recorded, along with pointers to the start and end point of each word in the speech stream. Taken from the full name "mark words/syllables."

Non-Terminal A word or subword unit defined in nt.list. The output of the SubSyllable to word/syllable stage.

nt.list A list giving ASCII spellings (e.g. THREE) for non-terminals (e.g. tri).

Phoneme A phoneme is the perceptual identity assigned to a group of speech sounds.

Phonemics The study of perceived speech sounds. Phonetics The study of the acoustic properties of speech sounds.

Pragmatics Semantic information derived from real-word knowledge, e.g., that a room's ceiling is at its top, or that liquids can trickle but tables cannot.

PTT Lead The amount of speech prior to the PTT signal that is processed for recognition.

Read Me A text file in the F2 folder listing the current source files and recommended usage.

Semantics The word- and phrase-level meaning of an utterance.

SIMSYST One of the three modes of operation for the recognizer. SIMSYST works in conjunction with a flight simulator host computer, receiving commands to begin and end analyzing speech from that host computer. Recognition results are reported to both the host and the Macintosh screen.

SubSyllable A symbol assigned to a cohesive segment of speech, usually less than a complete syllable. Identification of SubSyllables is the first step in the recognition process.

SubSyllable Grammar This consists of all the spellings for all the words in the vocabulary.

SubWord A part of a word that may be linked to other words or SubWords during the recognition process. A SubWord may be one or more syllables. Each SubWord has its own set of spellings recorded in the SubSyllable Grammar, e.g. the word U-H-F has been divided into the SubWords U- and -HF.

Syntax The rules governing the ordering relationship between elements of words and phrases.

Word Grammar The component of the system that verifies word sequences.

Word.log Edit document in which CM5WF2 output is recorded.

.wsyl The extension given to a word-marked file, which identifies words spoken in a particular cspc file. Taken from the full name "word-syllable." Pronounced "weasel."

The foregoing description of the invention is intended to be in all senses illustrative, not restrictive. Modifications and refinements of the embodiments described will become apparent to those of ordinary skill in the art to which the present invention pertains, and those modifications and refinements that fall within the spirit and scope of the invention, as defined by the appended claims, are intended to be included therein.

ASR Appendix A

Version 1.9 SubSyllable Source

```
-file:button.src $butn    BUTTON

- 2nd syllable

*END?  (Vn/Cvn/Cv)

*ENDD  Vn

*ENDD  (V&/Va Cv V&)

*ENDD  (Vx/Vu/Vo/Va) (/Vu/Vo)

-nxt is very short 2nd syl

*ENDM # (/k) C^vn

-nxt is lost /n/

*ENDM Cv D #

$END?

- 2nd syllable - plus loop on /n/

*END?  (Vn/Cvn/Cv)

*ENDD  Vn

*ENDD  (V&/Va Cv V&) (/VY)
```

*ENDD  (Vx/Vu/Vo/Va)  (/Vu/Vo)

*ENDD  (Vx/Vu/Vo)      (Vu/Vo) Vo

-mid button $ENDD

-END 1ST syllable + break

*ENDM (Cv/Cv D/Cv # w C^/Cv # C^/Cv^/Cv #/Cv Vn C^/Cv Vx C^
      /Cv V& C^/Cv # Cv^/Cv Vn T C^)

-very short 1st syl

*(k/T k) C^v (/D/) # (/C^)

$ENDM

-loop 1st vowel

*ENDM (Va/Vo/V&/Vx)

- start consonant and 1st syllable

*           (/k/T k)              (C^/C^v)  (Va/Vo/V&/Vu/Vx)

*ENDo (/k)  (C^/Cv^/C^v)  (Va/Vo/V&/Vu/Vx)

-file:squawk.src $skwk  SQUAWK

-ENDINGS  vowel and final gap

*ENDY  (/Cv)          (/Vx/V&)  #  (/K/k/C^ Vx)

-released final stop without gap

*ENDY   (/Cv)          (T/F)

$ENDY

*ENDY (Va/Vo)

*ENDN (Va/Vo)

*ENDX (Va/Vo)

/ /

$ENDN

-start skwk = /sk/

* (Fs/TFs/Ts) # (/C^/k C^) (/T/Ts/TF/TFs) (/V&/Vx/C^)

-start skwk = /sk/ strong release of /k/

*(Fs/TFs/Ts) # (/k) (T/Ts) (T/Ts) (/V&/Vx/C^)

- missing gap for /k/

*Fs        k                    (/V&/VY/Vu/C^)

*Fs                              (V&/VY/Vu)

-ENDX IN SEVEN HAS (Fs/TFs) (/C^)

-file: tacan.src $takn TACAN

*ENDT (VE/VY/VA/Ve/Va)

*ENDT (Vn/Cv/Cvn)

$ENDT

*ENDT (Vn/Cv/Cvn)

- tacan 2nd vowel to end

*ENDO (/Vx) (VI/VE/VA/VY/Vi/V&/Va/Vx/Ve)

$ENDO

-tacan 2nd vowel loop

*ENDO (VI/VE/VA/VY/Vi/V&/Va/Vx/Ve)

- mid tacan = optional falling vowel + gap

*ENDP  Cv (/D) # (T/TF) .

*ENDP  Cv (/D) # (/T/Ts/TF/TFs/T k/k/T K/K/C^ T/C^ Ts/
       Cv^ T/Cv^ Ts) C^

*ENDP  Cv (/D) # (/k/K)            C^ (T/Ts) C^

*ENDP  Cv (/D) #  (/C^ T/T/C^ Ts/Ts)            C^v

*ENDP  Cv (/D) (T/TF)            (/k/K) (C^/Cv^/C^v)

*ENDP  Cv (/D) (VE/V&/Vx) (/T/Ts) (C^/Cv^/C^v)

```
*ENDP  Cv^ (/T C^/Ts C^/TF C^/TFs C^)

*ENDP Cv^ Vx C^

-short first syllable = C^v

*(Ts/T) (k/K) C^v # (/T/TF) (/k/K) C^

$ENDP

-loop on 1st vowel

*ENDP (Vx/VA/VE/V&)

-from /t/ start defined in two.src

*ENDR (VE/VA/VY/Ve/Vx/V&)

*ENDa (VE/VA/VY/Ve/Vx/V&)

-start /tA/..nasal platform since starts a phrase

*T Vn (/k/K) C^   (VE/VA/VY/Ve/Vx)

*ENDo (/k/K) C^   (VE/VA/VY/Ve/Vx)

*(T Vn/T/TF/Ts/TFs)        Cv^ (VE/VA/VY/Ve/Vx)

*ENDo                      Cv^ (VE/VA/VY/Ve/Vx)

*C^ Vx  (/k/K)     C^   (VE/VA/VY/Ve/Vx)

*ENDo  (/k/K)      C^   (VE/VA/VY/Ve/Vx)

-no gap..talking too soon

*T (/k) C^ (VE/VA)

-sharp onset garbled 1st vowel..looks like button

*T Vn K C^   (V&/Va)

*T Vn K Cv^  (V&/Va)

-file:ils.src $ils

-ends in /s/

*ENDV (/Cv) (Fs/TFs/Ts)

*ENDU (Fs/TFs/Ts)
```

-/Eh/ before /s/

$ENDV

*ENDV (VE/V&/Va/Vx/VY/VA/Ve/Vi/VI)

- /l/ (vocallic L )

$ENDV

*ENDU  Vo  (/Vu/Vo/V&/Va/V& V&) (/Vx) (/C^)

*ENDU Cv Vo (/Vu/Vo/V&/Va/V& V&) (/Vx) (/C^)

*ENDU Cv V& (/Vu/Vo/V&/Va/V& V&) (/Vx) (/C^)

*ENDU Cv Vá (/V&/Vx)            (/Vx) (/C^)

*ENDU Cv^

$ENDU

*ENDU (VA/VE/Vx/V&/Va)

-first vowel (before L)

$ENDU

* (/k C^/C^) (Vr/Va/V&/VE/VA)

-file:iff.src $ie

-end /aiE/

*END8 (Cv/Vx/V&/VE/Vu/Vu Cv)

*ENDm (Cv/Vx)

$ENDm

*END8 Cv

*ENDm (Vi/VI/Ve/VE/VA/C^/Vx/# C^)

$END8

-loop on vowel top finish /aiE/

*END8 (Va/VA/VE/Ve/VI/Vi/V&/Vx)

-start /aiE/

*(/k C^/C^) (Va/VE/V&/Vx/VA)

$fef

*END9 (/Cv) (#/T/TF/F)

-very short vowel in /fEf/

*(F/TF) (Cv/C^v) (#/F/TF)

*SW C^ Vx Vx (/Vx/Vx Vx) (#/T/F/TF)

$END9

*(T/TF/F) (/C^) (VY/VE/V&/Vx/Va/VA/VI/Vo/Vu)

*END9 (Vx/V&/Va/VA/VE/VI)

-file:freq.src $cy _CY

--/si/ very short vowels

*(Fs/TFs) (/k C^v/C^v)

*(Fs/F Fs/TFs/TFs T/Fs T) (Cvi/Cve)

-longer vowels

*END@ (VI/Ve/Vi/Cv)

$END@

*END@ (/Vx) (Vi/Ve/VI)

*(F Fs/TFs T) (/C^) (VI/Vi/Ve/Vx)

*ENDX (VI/Vi/Ve/Vx)

```
$freq FREQUEN_

-   /#kwn/

*END1 (/#) (C^v/Cv^)

*END1 (#/T) C^

*END1 (#/T) (/C^) (Va/Vu/Vn/VE/VY/V&/Vo/Vx) (/Vx/Cv/Vn/
        Cv Vn/Cv Vu)

*END1 (/Vu) (VY/Vx/V&/Vx Vx)

-forms missing 2nd syl

*ENDB (Vr/VY/VE/VI/Vi/Ve/Vn/Vx) Cv

*ENDB (Vr/VY/VE/VI/Vi/Ve/Vn/Vx) (Vi/Vx) Cv

*END5 (Vr/VY/VE/VI/Vi/Ve/Vn/Vx) Cv

*END5 (Vr/VY/VE/VI/Vi/Ve/Vn/Vx) (Vi/Vx) Cv

*ENDa (Vr/VY/VE/VI/Vi/Ve/Vn/Vx) Cv

*ENDa (Vr/VY/VE/VI/Vi/Ve/Vn/Vx) (Vi/Vx) Cv $END1

-    /RI/

*ENDB (Vr/VY/VE/VI/Vi/Ve/Vn/Vx) (/Cv)

*ENDB (Vr/VY/VE/VI/Vi/Ve/Vn/Vx) (Vi/Vx) (/Cv)

*ENDB (C^vr/C^vi/C^vI)

*END5 (Vr/VY/VE/VI/Vi/Ve/Vn/Vx) (/Cv)

*END5 (Vr/VY/VE/VI/Vi/Ve/Vn/Vx) (Vi/Vx) (/Cv)

*END5 (C^vr/C^vi/C^vI)

*ENDa (Vr/VY/VE/VI/Vi/Ve/Vn/Vx) (/Cv)

*ENDa (Vr/VY/VE/VI/Vi/Ve/Vn/Vx) (Vi/Vx) (/Cv)

*ENDa (C^vr/C^vi/C^vI)

*(T/Ts) k (C^/C^r) (Ve/Vr/Vi) (/Cv)

--$END5 in file:three.src = /Q/ before /R/ -= /f/ before    /R/--

$ENDa in file:two.src = /Q/ but might be /t/--

$ENDB in three   = Qr -= fr
```

```
-file:uvhf.src

---------- $chef ends both UHF and VHF $chef

-end chef /f/

*ENDe (#/T/TF/F/T #/T TF)

$ENDe

-loop on vowel

*ENDe (VE/Ve/VI/VA/Vx)

-enter vowel from /tS/ or /S/

*ENDd (VE/Ve/VI/VA/Vx)

*ENDX (VE/Ve/VI/VA/Vx)

$ENDd- /tS/

*(Fs/TFs/TFs T/Ts) k C^

*(Fs/TFs/TFs T/Ts/TF) K (C^/Cv^/C^v)

*C^ Vx (Ts/TFs) (/q) (Cv^/C^)

*(Ts/TFs) C^ Vx Cv^

*TF C^ Vx (/q) C^

--------- $ve = /vie/  for VHF $ve

-vowel to end

*ENDf (Vi/Ve/VI/Vx)

$ENDf

-loop on vowel

*ENDf (Vi/Ve/VE/VI/Vx)

-start with /v/

*(/T/T k/k/F w/T w/Vx k/Vx w) C^

*(w/T #/C^ Vx/C^ T) C^
```

---------- $ue =/yue/ for UHF $ue

- end with /e/

*ENDi (Vi/Ve/Vx)

*ENDh (VA/Vi/Ve/Vx)

$ENDi

-loop on final /e/

*ENDi (Vi/Ve/Vx)

*ENDh (VA/Vi/Ve/Vx)

$ENDh

-loop on /u/

*ENDh (Vu/VY)

-enter from init /y/

*ENDg (Vu/VY)

-missing init /y/

*(/w/k/) C^ (Vu/VY)

$ENDg

-loop on init /y/

* Vi

-start with /y/

*(/w/k/) C^ (Vi/VI)

-file:comm.src $comm

-end comm

*ENDc Vn

-next is for nasal lost in noise or swallowed into vowel

*ENDb Cv $ENDc

-nasal loop at end

*ENDc Vn

-leaving vowel

*ENDb (Vn/Cv Vo/Cv Vx/Cv Va/Cv)

$ENDb

-loop on vowel

*ENDb (Va/Vx)

-enter from uv stop

*ENDR (Va/Vx)

*ENDa (Va/Vx)

-file:uniform.src  $unif= $uni + $form/$four $form

-/fa/

*(SW/TF/T) C^ (/Vx) (Va/Va Va/Va Va Va)

-usual end after /n/ loop

*END1 (Vn/Cv)

$END1

-loop on /n/ or /o/

*END1 (Vn/Vo)

-/fa/ to /n/

*(SW/TF/T) C^ (/Vx) (Va/Va Va/Va Va Va)

-/fn/ or /fo/

*(SW/TF/T) C^ (/Vx)

$uni

*ENDn (/Vi) (Cv/C^) (Vu/Vn) (/Vo/Vn) (/Cv)

*ENDn (Vi/VI/Vn/Vu/Vi Vi Vn/Vu Vn) Cv $ENDn

*(/k/w) C^ (Vi/VY/Vu)

-file:victor.src $vict

-end with Vr

*ENDk (Vr/Vx/V&)

-very short 2nd syl

*ENDj k (C^vA/C^vr)

$ENDk

-loop on Vr

*ENDk (Vr/VA/Vx/V&)

-enter loop from stop

*ENDj (T k/Ts/TF/TFs/SW/T/k/T/T K) (C^/C^v)

$ENDj

-short 1st syl

*(T/SW) k C^v #

-vowel after /v/ (defined in uvhf.src)

*ENDf (VI/Vx/Vi/Ve) Cv (/D) #

-FILE:channel.src $chn

*ENDp (Va/Vo/Vn/Vu/Vx/V&/Cv)

$ENDp

*ENDp (Va/Vo/Vn/Vu/Vx/V&)

--starts with ENDe from chef = /tSE/ /tSA/

*ENDe (Va/Vo/Vn/Vu/Vx/V&/Cv)

-file:point.src

- only using vowel forms since point is highly constrained grammatically $pont

*ENDW (/Cv/w) (#/# K C^/# C^)

*ENDW (Cv/Cv^)

$ENDW

-LOOP on vowel

*ENDW (Vo/Va/Vx/VI/VY/V&/Vi)

$ENDW

-START POINT

* (Cv^/C^v/Cv/C^/T C^) (Vo/Va/V&/VY/Vu/Vn)

*ENDa (Vo/Va/V&/VY/Vu/Vn)

*(T/Ts) C^ Vx Va

-file:decimal.src

-very crude spelling since grammatically very limited occurence $decm DECIMAL

*ENDq (/#) (Vo/Vx/V&/Vn)

*ENDq (/#) (Vo/Vx/V&/Vn) (Vo/Vx/V&) (/Vo/V&/Vx)

$ENDq

*(VE/V&/Vx) (Fs/TFs)

*(VE/V&/Vx) (Fs/TFs)

*ENDa (VE/V&/Vx) (Fs/TFs)

*ENDa (VE/V&/Vx) (Fs/TFs)

-file one.src $one ONE

-endings for ONE

*ENDA (Vn/Cv/Cvn/Cv^n/Cv&/Cva/Cv^/CvY)

*END& (Vn/Cv/Cv&/Cva/Cv^/CvY)

*ENDA (/Cv/Cvn/Cva) (Vu Vu/VY VY) (/Cv)

*ENDA Cv (V&/VY/Vo/Va)

*ENDA (Va/V&) (/Vn/Cv)

*ENDA (Va/V&) (Va/V&) (/Vn/Cv)

*ENDA (Va/V&) (Va/V&) Vx (/Vn/Cv)

$END&

*END& (Vn/Cv/Cv Vx)

*ENDA (Vn/Cv)

*ENDA (Cvn/Cva) (Vu/VY)

*ENDA (/Cv/Cvn/Cva) (Vu Vu/VY VY)

*ENDA Cv (V&/VY/Vo/Va/Vu)

*ENDA (Va/V&) (Vn/Cv/Cv Vx/Cv Vu)

*ENDA (Va/V&) (Va/V&) (Vn/Cv/Cv Vx/Cv Vu)

*ENDA (Va/V&) (Va/V&) Vx (Vn/Cv/Cv Vx/Cv Vu)

$ENDA

*ENDA (V&/Vo)

-beginnings that join to ENDA

*(/w/SW k) (C^u/C^o/Cv^u/Cv^o) Va

-C^ Va Cv can match to too much noise that should be dropped

*(w/SW) C^ Va

*(/w/SW k) (C^u/C^o/Cv^/C^) Vo

*(/w Cv^/w C^/C^/Cv^/SW k C^) Vo VY

*(/w Cv^/w C^/C^/Cv^/SW k C^) V& VY

-initial dipthong -allow k C^ only after break-glottal release

* (/w C^/C^/SW k C^) Vu (/w) (/C^) (Vo/Va/V&)

* (/w C^/C^/SW k C^) Vu (/w) (/C^) (Vo/Va/V&) Vu

* (/w C^/C^/SW k C^) Vu Vu (/w) (/C^) (Vo/Va/V&)

* (/w C^/C^/SW k C^) Vu Vu (/w) (/C^) (Vo/Va/V&) Vu

* (/w C^/C^/SW k C^) Vu (/w) (/C^) Vu (Vo/Va/V&)

* (/w C^/C^/SW k C^/SW k C^o) Vu (/w) (/C^) Vu (Vo/Va/V&) Vu

* (/w C^/C^/SW k C^/SW k C^o) Vo (/w) (/C^) (Va/V&)

* (/w C^/C^/SW k C^/SW k C^o) Vo (/w) (/C^) (Va/V&) Vu

*(/C^) VY (/VY) (Va/Vo/V&)

*VY w C^ (Vo/Va)

C^ Va w C^ Va

-special cases for one $one

Vo VY VY Vn $(one eit)

*ENDA (Ve/VE) (/VE/Ve/VE VE/Ve Ve) (VE/Ve/Vi) (Cv #/Cv^)

-file:two.src $two TWO

*END= (Vu/Vo/Cvu/Cv/VY/CvY/Cv^u/Cv^)

*ENDS (Vu/Cvu/VY/CvY)

*(TFs/Ts) (Vx/V&) (/Vx)

- END= => seeing u (other back mid to high)

$END=

*END= (Vu/Vo/Vx/Cv)

*ENDS (Vu/Cv)

*ENDR (Vu/VY/Vo Vu/Vn Vu)

*ENDa (Vu/VY/Vo Vu/Vn Vu)

- ENDS => seeing high front before high back $ENDS

*ENDS (Vi/Ve/VI/VE/VY/Vx)

*ENDR (Vi/Ve/VI/VE/VY)

*ENDa (Vi/Ve/VI/VE/VY)

-start w/o fric

*SW C^ Vu (/k/K) C^

$ENDR

-next is fractured /t/

TFs Ts Ts

Ts TFs Ts

-next is /t/ causing sharp end to previous syllable

*D # (TFs/Ts) (k/K) C^

*(/D #) C^ (VY/Vi/Vu/VI/Ve/Vx) (K/k) C^

*D # C^ (VY/Vi/Vu/VI/Ve/Vx) C^

*K (C^Y/C^i/C^u/C^)*SW TF (/C^/C^v/Cv^/Cv T C^)

*SW (Ts/T/TFs) (Cv^/Cv T C^)

*SW (Ts/T/TFs/TF) (K/k) (C^/C^v/Cv^)

*SW T # (/k/K) C^

*T k Cv^ (/#) C^

*SW (C^ T C^/C^u/C^i)

*SW (K C^/C^v T K C^/C^ T K C^/K C^u/K C^i/k C^ T K C^/k C^)

*Cv^ (Ts/TF/TFs) (/K) C^

*SW Fs (/C^/K C^)

$ENDa

SW C^ Vx C^

*SW (Ts/T/TFs) (/C^/C^v)

*SW (/C^v T) C^

-file: three.src $thri THREE

-misc w/o ends (no /r/)

*(TF/TFs) q Cv^ (VI/Vi) (/Vi)

-short three

*(F/TF) C^r Vr (CvY/Cvi)

-usual ends

*END3 (Vi/Ve/VI/Cvi/Cve/CvI/Cv) (/#)

*END4 (Vi/Ve/VI/VY/Vu Vi) (/Cv/Cvi) (/#)

*END3 Vi Vx Cvi

*END4 Vi Vx Cvi

*END4 Cvi $END3-looking at /i/'s..can see many

*END3 (Cv/Cvi)

*END3 (Vi/Ve/VI/Vx)

*END4 (/C^) (Vi/Ve/VI/VY Vi/VY Ve/Vu Vi/Vu Cv Vi)

*ENDB (Vi/Ve/VI/VY/Vu Vi/Vu Vu Vi/Vu Cv Vi/Va Vi)

*END5 (Vu Vi/Vu Vu Vi/Va Vi/VY Vi)*ENDa (Vu Vi/Vu Vu Vi/Va Vi)

*ENDX (Vu Vi/Vu Vu Vi)

$END4-saw an /r/ ...can see many /r/'s here

*END4 (Vr/Vr Va)

*ENDB (Vr/Vo Vr/Vx Vr/Vn/Vu Va/VA Vu)

*END5 (Vr/Vo Vr/Vx Vr/Vn/Vn Vn/Vu Va)

*ENDa (Vr/Vo Vr/Vx Vr/Vn/Vn Vn/Vu Va)

*ENDX (Vr/Vo Vr/Vx Vr/Vn/Vn Vn/Vu Va)

-----three possible starts for three  /QR/  /Q/ and /s/

$ENDB

-next line is /Q/ not looking like /t/ at all

*T # (C^/Cv^)

-next is mising /Q/ giving strong start after gap

SW k C^r

-next is verrrry weak /r/

T C^Y

-next is /Q/ alone (but not like /t/)

*T # w (C^/Cv^)

-starts for three  = QR

*TFs Cv D (Ts/#) (/q) C^r

*Ts w C^r

*(F/Fs/TF/TFs/T/Ts) (k Cv^r/q C^r/q Cv^r/C^A/Cv^A)

*(F/Fs/TF/TFs/T/Ts) (/k) Cv^ C^r

*(F/Fs/TF/TFs/T/Ts) (k Cv^r D/q Cv^r D/Cv^A D)

*F (/F) (C^r/Cv^r) *Fs F (C^r/Cv^r)

*Fs (C^r/Cv^r)

*(T/TF) # (T/TF) (/#) (C^r/Cv^r)

*T #          (C^r/Cv^r)

*SW C^v (Vx/T) C^r

*SW TFs (C^r/Cv^r)

*TFs    (C^r/Cv^r)

*TFs (Cv Vr C^/C^ Vr C^)

*(TF/T)   (C^r/Cv^r)

*(TF/T)   (Cv Vr C^/C^ Vr C^)

*SW (T/Ts) (C^r/Cv^r)

*(/T) SW (C^r/C^ Vu C^r)

*SW C^ (VE/V&) C^r

*SW C^ T C^ Vr C^

$END5

SW k C^-starts for three  = Q <no /r/>

*TFs Cv D (Ts/#) (/q) C^

*(F/Fs/TF/TFs/T/Ts) (k Cv^/q C^/q Cv^/w/w C^)

*(F/Fs/TF/TFs/T/Ts) (./k) Cv^   C^

*(F/Fs/TF/TFs/T/Ts) (k Cv^ D/q Cv^ D)

*F (/F), (/C^/Cv^)

*Fs F (/C^/Cv^)

*Fs   Cv^

*(T/TF) # (T/TF) (/#) (C^/Cv^)

*T #            (/C^/Cv^)

*(TF/TFs) Cv (T/Vu) C^

*SW C^v Vx C^

*SW TFs Cv # C^

*TFs    (Cv^/Cv # C^)

*TFs (Cv T C^/Cv Ts C^/Cv Vx C^/Cv V& C^)

*TF   (/C^/Cv^/Cv # C^)

*TF   (Cv T C^/Cv Ts C^/Cv Vx C^/Cv V& C^)

*SW T (Vo C^/C^ Vx C^/C^ V& C^/# T C^&/# T C^/# C^)

*T SW (C^n/C^/C^ Vu C^)

*SW (C^n/C^ Vu C^)

*SW C^ (VE/V&/Vx) C^

*SW C^ T (C^ Vx C^/C^ V& C^/Cv^)

-ENDX in seven has Fs/TFs (/C^)

-file: four.src $four FOUR

-very short special cases   need F/TF

*(F/TF)  k  C^  Vo      (Cv/Cvr)

*(F/TF)     C^  Vu Vo   (Cv/Cvr)

-usual forms with endings

*END] (Vr/Va/V&/Cvr/Cv/Cv&/Cva) (/#)

*END] (Cv^/Cv^r)

*END* (Vr/Va/V&/Cvr/Cv/Cv&/Cva) (/#)

*END* (Cv^/Cv^r)

*END^ (Vr/Cvr/Cv/Cv&/Cva) (/#)

*END^ (Cv^/Cv^r)

*END_ (Vu/Vr/Cvr/Cv/Cv&/Cva) (/#)

*END_ (Cv^/Cv^r)

$END^

-loop on Vr at end

*END^ Vr

*END* Vr

*END] Vr

*END_ Vr $END_

*END] Vu

*END_ Vu $END*

-loop on & a u

*END* (V&/Va)

*END] (Cv/V&/Va)

*END_ (Va/V&)

$END]

-loop on more than two Vo's

*END] Vo

-min of two Vo unless special case above

*ENDC Vo

-/fuo(r)/

*(F/T/TF/T SW/SW T) (C^o/Cv^o/k C^o) (/Vu) Vo

*SW (C^o/Cv^o/k C^o) Vu Vo

*(/SW) C^ Vx (C^o/Cv^o/k C^o) Vu Vo

- starts for /for/

$ENDC

*(F/TF) # k C^*(T C^ T/T # T) (/k/K) C^ Vo (/Vu)

*(F/T/TF/T SW/SW T) (/Cv^/C^o/C^/k Cv^/k C^o/k C^) Vo (/Vu)

*SW (/Cv^o/C^/C^o/k Cv^o/k C^/k C^o) Vo (/Vu)

-weak vowels

*(F/T/TF/T SW/SW T) (C^o/Cv^o/k C^o) V&

*SW (C^o/Cv^o/k C^o) V&

-/fuo(r)/

*(F/T/TF/T SW/SW T) (/C^/k C^) Vu Vo

*SW k C^ Vu Vo

-voicing error on init /f/

*(/T) (/C^) (Vx/VA) C^ Vo

*(/T) (/C^) (Vx/VA) k C^ Vo $(four eit)

*END] (VE/VY/Ve)   (Vi/Ve/VY/VE)  (/Vi/VE/Ve)  (Cv #/Cv^)

*END] (VE/VY/Ve)   (Cv #/Cv^/Cvi #)

$(four one)

*END] (Vo/Vu) (Vo/Va) (/Va/Vn) (/Cv) (Vx Vn/Vn Vn/Vn Vn Vn)

*END] (Vo/Vu) (Vo/Va) (/Va/Vn) Cvn (/Vx Vn/Vn Vn/Vn Vn Vn)

-file:five.src $five FIVE

-ENDings for long & short 'five' all starts have 1 vowel

*ENDF   (/Cv)  (#/T/F/TF)

*ENDF   (Cv^/Cv/Cvi/Cvi #/CvE/CvE #)

-    long vowel forms--no C at end

*ENDF  (Va/VE/VI/Vi/V&/VA)

-MID PIECES FOR LONG FIVE $ENDF

*ENDE  (Va/VE/VI/Vi/V&/VA/VY/Vx)

$ENDE

*ENDE  (Va/V&/VE/VA/VI/Vi/Vx)

-starts for five

*(F/T/TF/T C^ T/T Cv T) (/C^/k C^/C^a) (Va/VA/Vx Va/Vx VA)

*SW     (/C^/k C^/C^a) (Va/VA)

- (add optional C^a to help)

*(F/T/SW/TF/T C^ T/T Cv T)  (/k) C^a    VE

-/&/

*(F/T/TF/T C^ T/T Cv T) (/C^a/k C^a) V&

*SW      (/k)      C^a      V&

-file:six.src $six  SIX

*END6 (/K C^/C^)(Fs/TFs/TFs Fs/T TFs/Ts F/Ts Fs) (/Cv)

*END6 (C^ Ts/Ts #)

$END6

*END2 (/D)  #

$END2

*END2 (Vx/V&)

*END2 (Cv/Cvi)

$END2

-basic start pattern /sI/  ENDX = (FS/TFS/FS T) (/C^) IN SEV.SRC

*ENDX                 (Vx/V&)

*ENDX                 (Ve/VE/VI/VY/V&/Vo/Vr/Vi)

*(TFs/Fs/Fs T/TFs Ts/T Ts/TFs T/Ts #) (C^i/C^e) (Ve/VE/VI/Vi)

*(TFs/Fs/Fs T/TFs Ts/T Ts/TFs T/Ts #) (C^i/C^e) (VY/Vr)

-very weak vowel

*(Fs/TFs/Fs T/TFs Ts/T Ts/TFs T/Ts #) C^v

*(Fs/Fs T) Cv^

*(TFs/Ts) Cv^

*(Fs/TFs/Fs T/TFs Ts) Cv

*(Fs/TFs/Ts) CvI

*(Fs/TFs) CvI $END6

-forms without gap

*(Fs/Fs T) C^v

*(TFs/Ts) C^v

*(Fs/Fs T) Cv^

*(TFs/Ts) Cv^

-file:seven.src $sev SEVEN

*(Fs/TFs) Cv Vn Vn

*END7   (Vn/Cv/Cvn)

*END7   Cv (VY/Vu)

*END7 (C^v/Cv^)

*END+   (Vn/Cv)

*ENDG Cv D (#/Vx/T) (/k) C^v D

*ENDG Cv D # w C^

$END+

*END+ (Vn/Cv)

*END7 (Vn/Cv)

-mid seven- change at center (if any) then vowel loop
$END7

*END7 (VY/V&/Vu/Vo/Va/VE/VA/Vi/Ve/Cv/Vx)

*ENDG Cv (/D) (#/Vx/Vn/T) (/w/k) (C^/C^v)

*ENDG (Cv^/w Cv^/Cv) (/D)

*ENDQ (#/Vx/T) (/k/K) (C^/C^v)

-first syl =C^v

*(Fs/TFs) (/T) (/q) C^v D (/#) (/k/K) (C^/C^v)

*(Fs/TFs) (/T) (/q) C^v # (/k/K) (C^/C^v)

-mid seven-1st vowel $ENDG

*ENDH     (VE/VA/V&/Va/Vx/Vn)

*ENDX     (VE/VA/V&/Va/Vx/Vn)

*ENDH   (Va/Vn/V&/Vx)  (VI/VA/Vn/V&/Vx/Va)

*ENDX   (Va/Vn/V&/Vx)  (VI/VA/Vn/V&/Vx/Va)

*ENDH Vx (VE/VA/V&/Va/Vx/Vn) Vx

*ENDX Vx (VE/VA/V&/Va/Vx/Vn) Vx $ENDQ

*(Fs/TFs) Cv D

*(Fs/TFs) (/k/K) Cv^ D $ENDH

*(TFs/Fs)  (w/q/k) C^

*(TFs/Fs)  wTs C^

$ENDX

*(Fs/TFs/Fs T/Ts # Ts/TFs Ts) (/C^)

-file:eight.src $eit EIGHT

-full form (no ends) missing Cv before gap

*(VE/Ve/Vi/VI) (Vi/Ve) #

-usual endings

*ENDI (Cv/Cvi)   (/D) (/Vi) (#/# K/# k/# T/# Ts/# TF)

*ENDI (Vi/Ve/VY) Cv^ (/D)

*ENDI Vx Cv $ENDI

*ENDI (Vi/Ve/VI/VE) (/Vx)

*ENDI Vx (Vi/Ve/VI/VE)

$ENDI

-start eight

*(/SW k/w) (/C^/C^i/C^e) (Ve/Vi/VI)

*(/SW k/w) (/C^/C^i/C^e) VE (VE/Ve/Vi/VI)

*(/C^/C^i/w C^)     VY          (Ve/Vi/VE)

-dipthong,onset in change interval,final clear

*(C^E/C^e) VY

- start with VA

*(/C^) VA (VE/Ve/Vx) Vi

-file:nine.src

- ends for nine $nine NINE

*ENDK (/Vu/Vu Vu) (CvY/Cvn)

*ENDK (/Vu/Vu Vu) Vu Cv Vu

*ENDK (/Vu/Vu Vu) Vi (/VY)

*ENDK (/Vx) (Cv/Cvi)

*ENDK Cv (Vx/Vu) Vn

*END% (Vn/Cv)

-very short 9 with n start and end

*ENDo C^ Va Cv (Vn/Vn Vn)

- almost ends for nine $END%

*END% (Vn/Cv/Cvn/Cv Vx Vn/Cv Vu Vn)

*ENDK (Vn/Cv/Cvn)

*ENDK (/Vu/Vu Vu) Vu Cv Vu

*ENDK (Vu/Vu Vu)

*ENDK (/Vu/Vu Vu) Vi

*ENDK Vx Cv $ENDK

- mid nine

*ENDK  (Va/VA/VE/VI/Ve/Vi/VY/Vx)

*ENDJ (/Vx) (Va/VA/VE)

*ENDo VA $ENDJ

*(C^n/C^n VY/Cv^n/SW k C^u/SW k C^n/C^ Va C^/Cv^n)
    (Va/VA/VE/Ve)

*ENDo (/C^/w C^/C^ VY/Cv^/C^a/w) (Va/VA/VE/Ve)

*(C^n/C^n VY/Cv^n)     V& Va

*ENDo (C^/C^ VY/Cv^)    V& Va

*(C^n/C^n VY/Cv^n)    Vo (Va/VA/V&/VE/Ve)

*ENDo (C^/C^ VY/Cv^)    Vo (Va/VA/V&/VE/Ve)

*ENDo Vr (Va/VA)

- word init chnge interval--missing init /n/--require 2 vowels

*(C^A/C^/VY C^/Cv^/C^u) (VA/Va) (Va/VA)

$ENDo-

/n/ start..used by other words too

*(/w C^/C^/SW k C^) (Vn/Vx Vn)

*ENDo Vn

-file:zero.src $zero ZERO

-form w/o ends (spcl cases missing /r/ or final vowel)

*TFs (q/w) (C^/Cv^) (/VE) Vr (/Vr/Vr Vr) (Cv/Cvo)

*TFs (q/w) (C^/Cv^) VE Va (Cv/Cvo)

*TFs (q/w) (C^/Cv^) VI Vo Vo (/Vo)

*TFs w  (/VE) Vr (Cv/Cvo)

*TFs w  VE Va (Cv/Cvo)

*TFs w  VI Vo Vo (/Vo)

*ENDL (Va/Vo/Vu) (/Cv)

*ENDO (Va/Vo/Vu/Cv)

*ENDL Vr Cv #$ENDO

*ENDO (Va/Vo/Vu/VA/Cv)

*ENDL (/Vx) (Va/Vo/Vu/VA/VE Vo)
$ENDL

-good start now seeing /r/ --can loop on /r/

*END< (/Vx/Vu) Vr

*ENDL (Vr/Vn)

*ENDX (Vr/Vn)

*END> (Vr/Va Vo/Va Vu/Va Va)

*END[ Vr

-starts for /zero/ that have fric+/r/

*Fs  (C^r/Cvr)

*TFs (C^r/Cvr)

*Ts  (C^r/Cvr)

*Vn Ts C^rw Vr Vrw T C^ Vu Vr $END[

-/a/ before /r/

*END< (Va/VA/Vu) (Vx/Vu)

```
*END> (Va/VA) (Vx/Vu)

*ENDX (Va/VA) (Vx/Vu)

-too many loops  five->zero *END[ (Va/VA/Vu)
$END>

-saw fric+/i/ can loop on /i/

*ENDX (VE/VI/Vi/VY/Vu)

*END> (VE/VI/Vi/VY/Vu)

*(Fs/TFs) w (/C^/C^Y/C^u)

*(Fs/TFs) q C^

*(TFs/Fs) C^u

--$ENDX IN SEVEN HAS Fs/TFs (/C^)
$END<

-special cases unusual starts, but very strong endings--loop on
/i/

*END< (Vi/VY/VI/VE/VY Va)

*Fs   (C^i/C^Y/C^u/Cv)

*TFs (C^i/C^Y/C^u/CvY/Cv)

*(Ts/T) w (/C^)

*Ts (/C^/C^Y)

*C^ Vx (/Vx) Ts (C^/C^u)

*C^ Vx (/Vx) T (C^/C^u)

*VY Vn C^ T

*Cv^

*C^ Vx (/Vx) (C^/C^u/Cv^/w C^)

*C^ Vx (/Vx) C^ Vx C^

*(VY/Vu) Vn (/w) (C^/C^u)

*C^ Vi C^

*SW (C^/C^u)

w T C^
-file:tyteen.src  for $teen  $ty and misc -ty -teen irregularities.
```

$teen

*ENDr (Cv/Vn)

*END/ (Cv/Cvn/Vn)

*ENDR Vi $ty

*END/ (VI/Vi/Cv)

*ENDa (VI/Ve/Vi)

*ENDR (VI/Ve/Vi)

*SW (Ts/TFs/T) (/k) (Cv^i/Cvi/Cv^/Cv)

*Cv^ (Vi/Vi Vi)

$ENDr

*END/ Vn

*ENDr Vn
$END/

*ENDa (VI/Ve/Vi/VY)

*ENDR (VI/Ve/Vi/VY)

*ENDq (VI/Ve/Vi/Cv)

*SW (T/Ts) Cv

------------------------------------------------------------special cases for -ty -teen $trty THIRTY

*ENDB (Vi/VE/Cv^ Vi/Cv^ Ve)

*END4 (Cv^ Vi/Cv^ Ve/Cv Vi/Cv Vi Vi/Cv Vi Ve)

*(F/Fs/TFs/TF) q C^vr Vi

*(TF/TFs/T) C^ Va (/Va/Vr) (/w) Cv^ (/D) (Vi/Ve/VY) (/Vi/Ve)

$fif FIF_

*(TF/F/T) (/q) C^v (T/TF/F)

*(TF/F/T) C^ (VI/Vi) Cv (T/TF/F/#)

*(F/TF) Cv T # (F/TF)

$ffty FIFTY

*(TF/F/T) (/q) C^v (T/TF/F) C^vi

*(TF/F/T) C^ (VI/Vi) Cv (T/TF/F) C^vi
$frty FORTY

*ENDC (Cvi/Vr Vi/Vr Vr Vi/Vr Vi Vi/Va Vr Vi/Va Vr Vr Vi/
        Va Vr Vi Vi)

$eity EIGHTY

*ENDI (Cv^i/Cv^ Vi)

*ENDI Cv D Vi (/Vi/Cv Vi)

$ssty SIXTY

*(Fs/TFs) (C^/Cv) (TFs/Ts) (C^/# Ts Cv/# T Cv)

Appendix B

Version 1.9  Syllable-to-Word (F1) Source

-F1121089.src (seh) sort all number related items to low states

- non numbers to high states.. leave a gap in the middle

- F1091589 (den) NEW SPEECH FILTER 1

- Contains rules for combining XXX + TEEN/TY

- Also IFF, COM1, COM2, CORRECTION, UHF, VHF, UNIFORM

-           added FREQUENCY

-(seh)      added aaa : [rs]  used via ##->aaa to flush f1

-(seh)      drop stragglers like -TY -TEEN

----------------------------------------------------------- thir(1) teen : thrn

*   (1) ty : trty

*   (1) X : [dp]

- four(2) teen : frtn

```
*    (2) ty : frty

--      four is free-standing, so pass it up, then process
current nt

*    (2) X : [rwl]

- fif(3) teen : fftn

*    (3) ty : ffty

*    (3) X : [dp]

- six(4) teen : sstn
```
Emerson & Stern PROPRIETARY
```
*    (4) ty : ssty

*    (4) X : [rwl]

- sev(5) teen : sntn

*    (5) ty : snty

*    (5) X : [rwl]

- eit(6) teen : eitn

*    (6) ty : eity

*    (6) X : [rwl]

- nine(7) teen : nntn

*    (7) ty : nnty

*    (7) X : [rwl]

- twen(8) ty : tnty

*    (8) X : [dp]---

- - - - - - - - - - - - corc(9) tion : corn
```

```
*    (9) X : [dp]
- - - - - - - - - -
ie(10) fef : iff

*  (10) X : [dp]

- comm(11) one : com1
*   (11) two : com2

*   (11) X : [rw1]

- ue(12) chef : uhf

*  (12) X : [dp]

- ve(13) chef : vhf

*  (13) X : [dp]

- uni(14) form : unif
*   (14) four : unif

*  (14) X : [dp]

- freq(15) cy : fre

*   (15) X : [dp]

--------------drop paths for 2nd halves that can't stand alone
fef : [dp]

form : [dp]

teen : [dp]

ty : [dp]

chef : [dp]

cy : [dp]

tion : [dp]

-
```

```
- don't output aaa just used to flush buffer
aaa : [rs]

----everything else just falls thru--------

X : X

--end of tables for f1 on 12/10/89 --highest state=15--
```

ASR Appendix C

Version 1.9 Word Grammar (F2) Source

```
-F2 FOR GD - SPEECH F2        AET
-FILE IS F2GD.AET.new
-FILE IS NEW VERSION OF F2GD.aet
-                    (seh) cncl->canc
-Cancel states have been added as "cncl CANC", where CANC is the
-cancel state from any point in the utterance. CANC has not been
-defined. However, it should return you to the SOM (start of message)
- state.
```

SOM: --start of message...this is state 0
com1 UHF - "COM1" (same as uhf)
unif UHF - "UNIF" (same as uhf)
uhf UHF - "U-H-F" will have ddd.d, range 225.0-399.9
butn BUTN - "BUTN" will have dd, range 0-20
chn BUTN - "CHANL" (same as butn)
fre FRE - "FREQ" can be either VHF or UHF
com2 VHF - "COM2" (same as vhf)
vict VHF - "VICT" (same as vhf)
vhf VHF - "V-H-F" will have ddd.dd, range 108.00-151.97
-takn TAC - "TACAN" ... will have ddd, range 000-126 in f2.gd.2.new
-ils ILS - "I-L-S" ... will gave ddd.d, range 108.1-111.9 in f2.gd.2.new
-iff SKWK - "I-F-F" ... will have dddd, range 0000-7777 in f2.gd.2.new
-skwk SKWK - "SQUAWK" ... will have ddd, range 0000-7777
-                    (same as IFF) in f2.gd.2.new FRE: - saw FREQ will go to VHF1 if 1, to UH2 if 2 or to UH3 if 3
one VHF1
two UH2
thri UH3
canc CANC - cancel state
---------errors for FRE
oh ER13 : {bs}
zero ER13 : {bs}
four ER13 : {bs}
five ER13 : {bs}
six ER13 : {bs}
sev ER13 : {bs}
eit ER13 : {bs}
nine ER13 : {bs}

```
ten ER13 : {bs}
elev ER13 : {bs}
twlv ER13 : {bs}
thrn ER13 : {bs}
frtn ER13 : {bs}
fftn ER13 : {bs}
sstn ER13 : {bs}
sntn ER13 : {bs}
eitn ER13 : {bs}
nntn ER13 : {bs}
twen ER13 : {bs}
trty ER13 : {bs}
frty ER13 : {bs}
ffty ER13 : {bs}
ssty ER13 : {bs}
snty ER13 : {bs}
eity ER13 : {bs}
nnty ER13 : {bs}
hund ER13 : {bs}
hun ER13 : {bs}
pont ER13 : {bs}
decm ER13 : {bs}
com1 ER13 : {bs}
unif ER13 : {bs}
uhf ER13 : {bs}
butn ER13 : {bs}
chn ER13 : {bs}
com2 ER13 : {bs}
fre ER13 : {bs}
vict ER13 : {bs}
vhf ER13 : {bs}
takn ER13 : {bs}
ils ER13 : {bs}
iff ER13 : {bs}
skwk ER13 : {bs}
```

---

BUTN: - saw BUTTON, CHANNEL at SOM
- range 0-20
oh BUT1
zero BUT1
one BUT1
- 2-9, teens and twenty go to final state
two FB2
thri FBUT
four FBUT
five FBUT
six FBUT
sev FBUT
eit FBUT
nine FBUT
ten FBUT
elev FBUT
twlv FBUT
thrn FBUT
frtn FBUT
fftn FBUT sstn FBUT
sntn FBUT
eitn FBUT
nntn FBUT
twen FBUT
canc CANC -cancel state
───── start of errors for BUTN
trty ER7 : {bs}
frty ER7 : {bs}
ffty ER7 : {bs}
ssty ER7 : {bs}
snty ER7 : {bs}
eity ER7 : {bs}
nnty ER7 : {bs}
hun ER7 : {bs}
hund ER7 : {bs}
pont ER7 : {bs}
decm ER7 : {bs}
butn ER7 : {bs}
chn ER7 : {bs}
com1 ER7 : {bs}
unif ER7 : {bs}
uhf ER7 : {bs}
fre ER7 : {bs}
com2 ER7 : {bs}
vict ER7 : {bs}
vhf ER7 : {bs}
takn ER7 : {bs}
ils ER7 : {bs}
iff ER7 : {bs}
skwk ER7 : {bs}

*BUT1: - saw BUTTON oh,0,1
oh FBUT
zero FBUT
one FBUT
two FBUT
thri FBUT
four FBUT
five FBUT
six FBUT
sev FBUT
eit FBUT
nine FBUT
canc CANC - cancel state
───── start errs for BUT1
ten ER7 : {bs}
elev ER7 : {bs}
twlv ER7 : {bs}
thrn ER7 : {bs}
frtn ER7 : {bs}
fftn ER7 : {bs}
sstn ER7 : {bs}
sntn ER7 : {bs}
eitn ER7 : {bs}
nntn ER7 : {bs} twen ER7 : (bs)
trty ER7 : (bs)
frty ER7 : (bs)
ffty ER7 : (bs)
ssty ER7 : (bs)
snty ER7 : (bs)
eity ER7 : (bs)
nnty ER7 : (bs)
hun ER7 : (bs)
hund ER7 : (bs)
pont ER7 : (bs)
decm ER7 : (bs)

---

*FB2: - saw "2" after BUTN
oh FBUT
zero FBUT
canc CANC -cancel state
———————————start errors for FB2
one ER7 : (bs)
two ER7 : (bs)
thri ER7 : (bs)
four ER7 : (bs)
five ER7 : (bs)
six ER7 : (bs)
sev ER7 : (bs)
eit ER7 : (bs)
nine ER7 : (bs)
ten ER7 : (bs)
elev ER7 : (bs)
twlv ER7 : (bs)
thrn ER7 : (bs)
frtn ER7 : (bs)
fftn ER7 : (bs)
sstn ER7 : (bs)
sntn ER7 : (bs)
eitn ER7 : (bs)
nntn ER7 : (bs)
twen ER7 : (bs)
trty ER7 : (bs)
frty ER7 : (bs)
ffty ER7 : (bs)
ssty ER7 : (bs)
snty ER7 : (bs)
eity ER7 : (bs)
nnty ER7 : (bs)
hun ER7 : (bs)
hund ER7 : (bs)
pont ER7 : (bs)
decm ER7 : (bs)

---

*FBUT: - finished with BUTN, any other #s bad
one ER8 : (bs)
two ER8 : (bs)
thri ER8 : (bs)
four ER8 : (bs)
five ER8 : (bs)

six ER8 : {bs}
sev ER8 : {bs}
eit ER8 : {bs}
nine ER8 : {bs}
ten ER8 : {bs}
elev ER8 : {bs}
twlv ER8 : {bs}
thrn ER8 : {bs}
frtn ER8 : {bs}
fftn ER8 : {bs}
sstn ER8 : {bs}
sntn ER8 : {bs}
eitn ER8 : {bs}
nntn ER8 : {bs}
twen ER8 : {bs}
trty ER8 : {bs}
frty ER8 : {bs}
ffty ER8 : {bs}
ssty ER8 : {bs}
snty ER8 : {bs}
eity ER8 : {bs}
nnty ER8 : {bs}
hun ER8: {bs}
hund ER8 : {bs}
pont ER8 : {bs}
decm ER8 : {bs}

---

VHF: - saw COM2, VICT, VHF at SOM
one VHF1
canc CANC - cancel state
——————— errors for VHF
oh ER9 : {bs}
zero ER9 : {bs}
two ER9 : {bs}
thri ER9 : {bs}
four ER9 : {bs}
five ER9 : {bs}
six ER9: {bs}
sev ER9 : {bs}
eit ER9 : {bs}
nine ER9 : {bs}
ten ER9 : {bs}
elev ER9 : {bs}
twlv ER9 : {bs}
thrn ER9 : {bs}
frtn ER9 : {bs}
fftn ER9 : {bs}
sstn ER9 : {bs}
sntn ER9 : {bs}
eitn ER9 : {bs}
nntn ER9 : {bs}
twen ER9 : {bs}
trty ER9 : {bs}
frty ER9 : {bs}
ffty ER9 : {bs}
ssty ER9 : {bs} snty ER9 : {bs}
eity ER9 : {bs}
nnty ER9 : {bs}
hun ER9 : {bs}
hund ER9 : {bs}
pont ER9 : {bs}
decm ER9 : {bs}
com1 ER9 : {bs}
unif ER9 : {bs}
uhf ER9: {bs}
butn ER9 : {bs}
chn ER9 : {bs}
fre ER9 : {bs}
com2 ER9 : {bs}
vict ER9 : {bs}
vhf ER9 : {bs}
takn ER9 : {bs}
ils ER9 : {bs}
iff ER9 : {bs}
skwk ER9 : {bs}

---

VHF1: - saw VHF 1
oh VH1Z
zero VH1Z
one VH1C
two VH1C
thri VH1C
four VH1C
five VH1E
ten FVHF
elev FVHF
twlv FVHF
thrn FVHF
frtn FVHF
fftn FVHF
sstn FVHF
sntn FVHF
eitn FVHF
nntn FVHF
twen VH1D
trty VH1D
frty VH1D
ffty VH1F
hun VH1H
hund VH1H
canc CANC - cancel state
——— errors for VHF1
six ER9 : {bs}
sev ER9 : {bs}
eit ER9 : {bs}
nine ER9 : {bs}
ssty ER9 : {bs}
snty ER9 : {bs}
eity ER9 : {bs}
nnty ER9 : {bs}
pont ER9 : {bs} decm ER9 : {bs}

---

VH1E: - saw 5 after VHF1, 0 or 1 will complete
oh FVHF - go to final VHF state
zero FVHF
one FVHF
canc CANC - cancel state
—————————errors for VH1E
two ER9 : {bs}
thri ER9 : {bs}
four ER9 : {bs}
five ER9 : {bs}
six ER9 : {bs}
sev ER9 : {bs}
eit ER9 : {bs}
nine ER9 : {bs}
ten ER9 : {bs}
elev ER9 : {bs}
twlv ER9 : {bs}
thrn ER9 : {bs}
frtn ER9 : {bs}
fftn ER9 : {bs}
sstn ER9 : {bs}
sntn ER9 : {bs}
eitn ER9 : {bs}
nntn ER9 : {bs}
twen ER9 : {bs}
trty ER9 : {bs}
frty ER9 : {bs}
ffty ER9 : {bs}
ssty ER9 : {bs}
snty ER9 : {bs}
eity ER9 : {bs}
nnty ER9 : {bs}
hund ER9 : {bs} pont ER9 : {bs}
decm ER9 : {bs}

---

VH1F: - saw fifty after VHF1, need a 1 to complete
one FVHF - finishes number before decimal
pont PNT2 - ready for dec. number
decm PNT2 - "
canc CANC - cancel state
—————————errors for VH1F
oh ER : {bs}
zero ER : {bs}
two ER9 : {bs}
thri ER9 : {bs}
four ER9 : {bs}
five ER9 : {bs}
six ER9 : {bs}
sev ER9 : {bs}
eit ER9 : {bs}
nine ER9 : {bs}
ten ER9 : {bs} elev ER9 : {bs}
twlv ER9 : {bs}
thrn ER9 : {bs}
frtn ER9 : {bs}
fftn ER9 : {bs}
sstn ER9 : {bs}
sntn ER9 : {bs}
eitn ER9 : {bs}
nntn ER9 : {bs}
twen ER9 : {bs}
trty ER9 : {bs}
frty ER9 : {bs} ffty ER9 : {bs}
ssty ER9 : {bs}
snty ER9 : {bs}
eity ER9 : {bs}
nnty ER9 : {bs}
hund ER9 : {bs}

---

VH1H: - saw hundred after VHF1, need at least one more #
eit FVHF -goes to final numb state before decimal
nine FVHF
ten FVHF
elev FVHF
twlv FVHF
thrn FVHF
frtn FVHF
fftn FVHF
sstn FVHF
sntn FVHF
eitn FVHF
nntn FVHF
twen VH1D - going here to get one more number 1-9
trty VH1D
frty VH1D
ffty VH1F - getting a 1 for 50
canc CANC - cancel state
————errors for VH1H
oh ER9 : {bs}
zero ER9 : {bs}
one ER9 : {bs}
two ER9 : {bs}
thri ER9 : {bs}
four ER9 : {bs}
five ER9 : {bs}
six ER9 : {bs}
sev ER9 : {bs}
ssty ER9 : {bs}
snty ER9 : {bs}
eity ER9 : {bs}
nnty ER9 : {bs} hun ER9 : {bs}
hund ER9 : {bs}
pont ER9 : {bs}
decm ER9 : {bs}

---

VH1D: - saw 20-40 after VHF1, may take one more # or decimal
one FVHF - going to final state before decimal
two FVHF
thri FVHF
four FVHF
five FVHF
six FVHF
sev FVHF
eit FVHF
nine FVHF
pont PNT2 - ready for decimal number
decm PNT2
canc CANC - cancel state
———— errors for VH1D
oh ER9 : (bs)
zero ER9 : (bs)
ten ER9 : (bs)
elev ER9 : (bs)
twlv ER9 : (bs)
thrn ER9 : (bs)
frtn ER9 : (bs)
fftn ER9 : (bs)
sstn ER9 : (bs)
sntn ER9 : (bs)
eitn ER9 : (bs)
nntn ER9 : (bs)
ffty ER9 : (bs)
ssty ER9 : (bs)
snty ER9 : (bs)
eity ER9 : (bs)
nnty ER9 : (bs)
hun ER9 : (bs)
hund ER9 : (bs)

---

VH1C: - saw numbers 1-4 after VHF1, need one more #
oh FVHF - going to final state before decimal
zero FVHF
one FVHF
two FVHF
thri FVHF
four FVHF
five FVHF
six FVHF
sev FVHF
eit FVHF
nine FVHF
canc CANC - cancel state
———— errors for VH1C
ten ER9 : (bs)
elev ER9 : (bs)
twlv ER9 : (bs)
thrn ER9 : (bs)
frtn ER9 : (bs)
fftn ER9 : (bs)
sstn ER9 : (bs)
sntn ER9 : (bs)

eitn ER9 : {bs}
nntn ER9 : {bs}
twen ER9 : {bs}
trty ER9 : {bs}
frty ER9 : {bs}
ffty ER9 : {bs}
ssty ER9 : {bs}
snty ER9 : {bs}
eity ER9 : {bs}
nnty ER9 : {bs}
hun ER9 : {bs}
hund ER9 : {bs}
pont ER9 : {bs}
decm ER9 : {bs}

---

VH1Z: - saw 0 after VFH1, need 8 or 9 to complete
eit FVFH
nine FVFH
canc CANC - canel state
——— errors for VH1Z
oh ER9 : {bs}
zero ER9 : {bs}
one ER9 : {bs}
two ER9 : {bs}
thri ER9 : {bs}
four ER9 : {bs}
five ER9 : {bs}
six ER9 : {bs}
sev ER9 : {bs}
ten ER9 : {bs}
elev ER9 : {bs}
twlv ER9 : {bs}
thrn ER9 : {bs}
frtn ER9 : {bs}
fftn ER9 : {bs}
sstn ER9 : {bs}
sntn ER9 : {bs}
eitn ER9 : {bs}
nntn ER9 : {bs}
twen ER9 : {bs}
trty ER9 : {bs}
frty ER9 : {bs}
ffty ER9 : {bs}
ssty ER9 : {bs}
snty ER9 : {bs}
eity ER9 : {bs}
nnty ER9 : {bs}
hun ER9 : {bs}
hund ER9 : {bs}

---

FVHF: - final state of VHF # before decimal
pont PNT2
decm PNT2
canc CANC - cancel state
——— errors for FVHF
oh ER9 : {bs} zero ER9 : {bs}
one ER9 : {bs}
two ER9 : {bs}
thri ER9 : {bs}
four ER9 : {bs}
five ER9 : {bs}
six ER9 : {bs}
sev ER9 : {bs}
eit ER9 : {bs}
nine ER9 : {bs}
ten ER9 : {bs}
elev ER9 : {bs}
twlv ER9 : {bs}
thrn ER9 : {bs}
frtn ER9 : {bs}
fftn ER9 : {bs}
sstn ER9 : {bs}
sntn ER9 : {bs}
eitn ER9 : {bs}
nntn ER9 : {bs}
twen ER9 : {bs}
trty ER9 : {bs}
frty ER9 : {bs}
ffty ER9 : {bs}
ssty ER9 : {bs}
snty ER9 : {bs}
eity ER9 : {bs}
nnty ER9 : {bs}
hun ER9 : {bs}
hund ER9 : {bs}
com1 ER9 : {bs}
unif ER9 : {bs}
uhf ER9: {bs}
butn ER9 : {bs}
chn ER9 : {bs}
fre ER9 : {bs}
com2 ER9 : {bs}
vict ER9 : {bs}
vhf ER9 : {bs}
takn ER9 : {bs}
ils ER9 : {bs}
iff ER9 : {bs}
skwk ER9 : {bs}

---

PNT2: - saw a decimal point, ready for dec. values
oh PONG - need one more number to finish VHF
zero PONG
one PONG
two PONG
thri PONG
four PONG
five PONG
six PONG
sev PONG
eit PONG
nine PONG
ten FVHD - these #s complete VHF twlv FVHD
fftn FVHD
sntn FVHD
twen POND - need one more #, can't be a 0,oh
trty POND
frty POND
ffty POND
ssty POND
snty POND
eity POND
nnty POND
canc CANC - cancel state
———— errors for PNT2
elev ER10 : {bs}
thrn ER10 : {bs}
frtn ER10 : {bs}
sstn ER10 : {bs}
eitn ER10 : {bs}
nntn ER10 : {bs}
hun ER10 : {bs}
hund ER10 : {bs}
pont ER10 : {bs}
decm ER10 : {bs}
com1 ER10 : {bs}
unif ER10 : {bs}
uhf ER10 : {bs}
butn ER10 : {bs}
chn ER10 : {bs}
com2 ER10 : {bs}
fre ER10 : {bs}
vict ER10 : {bs}
vhf ER10 : {bs}
takn ER10 : {bs}
ils ER10 : {bs}
iff ER10 : {bs}
skwk ER10 : {bs}

PONG: - saw oh,0-9 need one more dec.# to end
oh FVHD
zero FVHD
two FVHD
five FVHD
sev FVHD
canc CANC - cancel state
———— errors for PONG
one ER10 : {bs}
thri ER10 : {bs}
four ER10 : {bs}
six ER10 : {bs}
eit ER10 : {bs}
nine ER10 : {bs}
ten ER10 : {bs}
elev ER10 : {bs}
twlv ER10 : {bs}
thrn ER10 : {bs}
frtn ER10 : {bs} fftn ER10 : (bs)
sstn ER10 : (bs)
sntn ER10 : (bs)
eitn ER10 : (bs)
nntn ER10 : (bs)
twen ER10 : (bs)
trty ER10 : (bs)
frty ER10 : (bs)
ffty ER10 : (bs)
ssty ER10 : (bs)
snty ER10 : (bs)
eity ER10 : (bs)
nnty ER10 : (bs)
hund ER10 : (bs)
hun ER10 : (bs)
pont ER10 : (bs)
decm ER10 : (bs)
com1 ER10 : (bs)
unif ER10 : (bs)
uhf ER10 : (bs)
butn ER10 : (bs)
chn ER10 : (bs)
fre ER10 : (bs)
com2 ER10 : (bs)
vict ER10 : (bs)
vhf ER10 : (bs)
takn ER10 : (bs)
ils ER10 : (bs)
iff ER10 : (bs)
skwk ER10 : (bs)
———————
*POND: - saw #s 20-90 after PNT2, going to final state
two FVHD
five FVHD
sev FVHD
canc CANC - cancel state
——————— errors for POND
oh ER10 : (bs)
zero ER10 : (bs)
one ER10 : (bs)
thri ER10 : (bs)
four ER10 : (bs)
six ER10 : (bs)
eit ER10 : (bs)
nine ER10 : (bs)
ten ER10 : (bs)
elev ER10 : (bs)
twlv ER10 : (bs)
thrn ER10 : (bs)
frtn ER10 : (bs)
fftn ER10 : (bs)
sstn ER10 : (bs)
sntn ER10 : (bs)
eitn ER10 : (bs)
nntn ER10 : (bs)
twen ER10 : (bs)

trty ER10 : {bs}
frty ER10 : {bs}
ffty ER10 : {bs}
ssty ER10 : {bs}
snty ER10 : {bs}
eity ER10 : {bs}
nnty ER10 : {bs}
hund ER10 : {bs}
hun ER10 : {bs}
pont ER10 : {bs}
decm ER10 : {bs}
com1 ER10 : {bs}
unif ER10 : {bs}
uhf ER10 : {bs}
butn ER10 : {bs}
chn ER10 : {bs}
fre ER10 : {bs}
com2 ER10 : {bs}
vict ER10 : {bs}
vhf ER10 : {bs}
takn ER10 : {bs}
ils ER10 : {bs}
iff ER10 : {bs}
skwk ER10 : {bs}

*FVHD - any #s after this point are errors oh ER10 : {bs}
zero ER10 : {bs}
one ER10 : {bs}
two ER10 : {bs}
thri ER10 : {bs}
four ER10 : {bs}
five ER10 : {bs}
six ER10 : {bs}
sev ER10 : {bs}
eit ER10 : {bs}
nine ER10 : {bs}
ten ER10 : {bs}
elev ER10 : {bs}
twlv ER10 : {bs}
thrn ER10 : {bs}
frtn ER10 : {bs}
fftn ER10 : {bs}
sstn ER10 : {bs}
sntn ER10 : {bs}
eitn ER10 : {bs}
nntn ER10 : {bs}
twen ER10 : {bs}
trty ER10 : {bs}
frty ER10 : {bs}
ffty ER10 : {bs}
ssty ER10 : {bs}
snty ER10 : {bs}
eity ER10 : {bs}
nnty ER10 : {bs}

```
hund ER10 : (bs)
hun ER10 : (bs)
pont ER10 : (bs)
decm ER10 : (bs)
———————— end of sequence for VHF, related comnds
UHF:   - saw com1, unif, or UHF at SOM
two UH2 - going to paths for 200's of UHF freq.
thri UH3 - going to paths for 300's of UHF freq.
canc CANC - cancel state
———————— errors for UHF oh ER11 : (bs)
zero ER11 : (bs)
one ER11 : (bs)
four ER11 : (bs)
five ER11 : (bs)
six ER11 : (bs)
sev ER11 : (bs)
eit ER11 : (bs)
nine ER11 : (bs)
ten ER11 : (bs)
elev ER11 : (bs)
twlv ER11 : (bs)
thrn ER11 : (bs)
frtn ER11 : (bs)
fftn ER11 : (bs)
sstn ER11 : (bs)
sntn ER11 : (bs)
eitn ER11 : (bs)
nntn ER11 : (bs)
twen ER11 : (bs)
trty ER11 : (bs)
frty ER11 : (bs)
ffty ER11 : (bs)
ssty ER11 : (bs)
snty ER11 : (bs)
eity ER11 : (bs)
nnty ER11 : (bs)
hund ER11 : (bs)
hun ER11 : (bs)
pont ER11 : (bs)
decm ER11 : (bs)
com1 ER11 : (bs)
unif ER11 : (bs)
uhf ER11 : (bs)
butn ER11 : (bs)
chn ER11 : (bs)
fre ER11 : (bs)
com2 ER11 : (bs)
vict ER11 : (bs)
vhf ER11 : (bs)
takn ER11 : (bs)
ils ER11 : (bs)
iff ER11 : (bs)
skwk ER11 : (bs)
————————
```

UH2: - saw a 2 after UHF
two UH2A
thri UH2B
four UH2B
five UH2B
six UH2B
sev UH2B
eit UH2B
nine UH2B
twen UH2A
trty UH2C
frty UH2C
ffty UH2C
ssty UH2C
snty UH2C
eity UH2C
nnty UH2C
hun UH2H
hund UH2H
canc CANC - cancel state
———— errors for UH2
oh ER11 : {bs}
zero ER11 : {bs}
one ER11 : {bs}
ten ER11 : {bs}
elev ER11 : {bs}
twlv ER11 : {bs}
thrn ER11 : {bs}
frtn ER11 : {bs}
fftn ER11 : {bs}
sstn ER11 : {bs}
sntn ER11 : {bs}
eitn ER11 : {bs}
nntn ER11 : {bs}
pont ER11 : {bs}
decm ER11 : {bs}

---

UH2A: - saw a 2 or 20, need one more # 5-9 to comp.
five UHP
six UHP
sev UHP
eit UHP
nine UHP
canc CANC - cancel state
———— errors for UH2A
oh ER11 : {bs}
zero ER11 : {bs}
one ER11 : {bs}
two ER11 : {bs}
thri ER11 : {bs}
four ER11 : {bs}
ten ER11 : {bs}
elev ER11 : {bs}
twlv ER11 : {bs}
thrn ER11 : {bs}
frtn ER11 : {bs} fftn ER11 : {bs}
sstn ER11 : {bs}
sntn ER11 : {bs}
eitn ER11 : {bs}
nntn ER11 : {bs}
twen ER11 : {bs}
trty ER11 : {bs}
frty ER11 : {bs}
ffty ER11 : {bs}
ssty ER11 : {bs}
snty ER11 : {bs}
eity ER11 : {bs}
nnty ER11 : {bs}
hund ER11 : {bs}
hun ER11 : {bs}
pont ER11 : {bs}
decm ER11 : {bs}
———————
UH2H: - saw hun, hund need at least one more # before dec.
twen UH2A
trty UH2C
frty UH2C
ffty UH2C
ssty UH2C
snty UH2C
eity UH2C
nnty UH2C
canc CANC - cancel state
———— errors for UH2H
oh ER11 : {bs}
zero ER11 : {bs}
one ER11 : {bs}
two ER11 : {bs}
thri ER11 : {bs}
four ER11 : {bs}
five ER11 : {bs}
six ER11 : {bs}
sev ER11 : {bs}
eit ER11 : {bs}
nine ER11 : {bs}
ten ER11 : {bs}
elev ER11 : {bs}
twlv ER11 : {bs}
thrn ER11 : {bs}
frtn ER11 : {bs}
fftn ER11 : {bs}
sstn ER11 : {bs}
sntn ER11 : {bs}
eitn ER11 : {bs}
nntn ER11 : {bs}
hund ER11 : {bs}
hun ER11 : {bs}
pont ER11 : {bs}
decm ER11 : {bs}
———————

UH2C: - saw 30-90 need 1-9 or dec. to comp
one UHP
two UHP
thri UHP
four UHP
five UHP
six UHP
sev UHP
eit UHP
nine UHP
pont PNT3
decm PNT3
canc CANC - cancel state
———— errors for UH2C
oh ER11 : {bs}
zero ER11 : {bs}
ten ER11 : {bs}
elev ER11 : {bs}
twlv ER11 : {bs}
thrn ER11 : {bs}
frtn ER11 : {bs}
fftn ER11 : {bs}
sstn ER11 : {bs}
sntn ER11 : {bs}
eitn ER11 : {bs}
nntn ER11 : {bs}
twen ER11 : {bs}
trty ER11 : {bs}
frty ER11 : {bs}
ffty ER11 : {bs}
ssty ER11 : {bs}
snty ER11 : {bs}
eity ER11 : {bs}
nnty ER11 : {bs}
hund ER11 : {bs}
hun ER11 : {bs}

UH2B: - saw 0-9 need one more # to comp.
oh UHP
zero UHP
one UHP
two UHP
thri UHP
four UHP
five UHP
six UHP
sev UHP
eit UHP
nine UHP
canc CANC - cancel state
———— errors for UH2B
ten ER11 : {bs}
elev ER11 : {bs}
twlv ER11 : {bs}
thrn ER11 : {bs}
frtn ER11 : {bs}

```
fftn ER11 : (bs)
sstn ER11 : (bs)
sntn ER11 : (bs)
eitn ER11 : (bs)
nntn ER11 : (bs)
twen ER11 : (bs)
trty ER11 : (bs)
frty ER11 : (bs)
ffty ER11 : (bs)
ssty ER11 : (bs)
snty ER11 : (bs)
eity ER11 : (bs)
nnty ER11 : (bs)
hund ER11 : (bs)
hun ER11 : (bs)
-
pont ER11 : (bs)
decm ER11 : (bs)
```
---
```
UH3: - saw a 3 after UHF, starting 300's path
oh UH2B
zero UH2B
one UH2B
two UH2B
thri UH2B
four UH2B
five UH2B
six UH2B
sev UH2B
eit UH2B
nine UH2B
ten UHP
elev UHP
twlv UHP
thrn UHP
frtn UHP
fftn UHP
sstn UHP
sntn UHP
eitn UHP
nntn UHP
twen UH3D
trty UH3D
frty UH3D
ffty UH3D
ssty UH3D
snty UH3D
eity UH3D
nnty UH3D
hun UH3H
hund UH3H
-
canc CANC - cancel state
———— errors for UH3
pont ER11 : (bs)
decm ER11 : (bs)
```
---

UH3D: - saw 20-90
one UHP
two UHP
thri UHP
four UHP
five UHP
six UHP
sev UHP
eit UHP
nine UHP
pont PNT3
decm PNT3
canc CANC - cancel state
——— errors for UH3D
oh ER11 : {bs}
zero ER11 : {bs}
-
ten ER11 : {bs}
elev ER11 : {bs}
twlv ER11 : {bs}
thrn ER11 : {bs}
frtn ER11 : {bs}
fftn ER11 : {bs}
sstn ER11 : {bs}
sntn ER11 : {bs}
eitn ER11 : {bs}
nntn ER11 : {bs}
-
twen ER11 : {bs}
trty ER11 : {bs}
frty ER11 : {bs}
ffty ER11 : {bs}
ssty ER11 : {bs}
snty ER11 : {bs}
eity ER11 : {bs}
nnty ER11 : {bs}
hund ER11 : {bs}
hun ER11 : {bs}

UH3H: - saw hun/hund
one UHP
two UHP
thri UHP
four UHP
five UHP
six UHP
sev UHP
eit UHP
nine UHP
-
ten UHP
elev UHP
twlv UHP
thrn UHP
frtn UHP
fftn UHP sstn UHP
sntn UHP
eitn UHP
nntn UHP
-
twen UH3D
trty UH3D
frty UH3D
ffty UH3D
ssty UH3D
snty UH3D
eity UH3D
nnty UH3D
-
pont PNT3
decm PNT3
-
canc CANC - cancel state
────── errors for UH3H
oh ER11 : {bs}
zero ER11 : {bs}
-
hun ER11 : {bs}
hund ER11 : {bs}

───────────────
UHP: - final state before dec. numb.
pont PNT3
decm PNT3
canc CANC - cancel state
────── errors for UHP
-
oh ER11 : {bs}
zero ER11 : {bs}
one ER11 : {bs}
two ER11 : {bs}
thri ER11 : {bs}
four ER11 : {bs}
five ER11 : {bs}
six ER11 : {bs}
sev ER11 : {bs}
eit ER11 : {bs}
nine ER11 : {bs}
-
ten ER11 : {bs}
elev ER11 : {bs}
twlv ER11 : {bs}
thrn ER11 : {bs}
frtn ER11 : {bs}
fftn ER11 : {bs}
sstn ER11 : {bs}
sntn ER11 : {bs}
eitn ER11 : {bs}
nntn ER11 : {bs}
-
twen ER11 : {bs}
trty ER11 : {bs} frty ER11 : {bs}
ffty ER11 : {bs}
ssty ER11 : {bs}
snty ER11 : {bs}
eity ER11 : {bs}
nnty ER11 : {bs}
hund ER11 : {bs}
hun ER11 : {bs}
com1 ER11 : {bs}
unif ER11 : {bs}
uhf ER11 : {bs}
butn ER11 : {bs}
chn ER11 : {bs}
fre ER11 : {bs}
com2 ER11 : {bs}
vict ER11 : {bs}
vhf ER11 : {bs}
takn ER11 : {bs}
ils ER11 : {bs}
iff ER11 : {bs}
skwk ER11 : {bs}
---

PNT3: - saw decm pt. ready for dec. #
oh FUH
zero FUH
one FUH
two FUH
thri FUH
four FUH
five FUH
six FUH
sev FUH
eit FUH
nine FUH
canc CANC - cancel state
——— errors for PNT3
ten ER12 : {bs}
elev ER12 : {bs}
twlv ER12 : {bs}
thrn ER12 : {bs}
frtn ER12 : {bs}
fftn ER12 : {bs}
sstn ER12 : {bs}
sntn ER12 : {bs}
eitn ER12 : {bs}
nntn ER12 : {bs}
-
twen ER12 : {bs}
trty ER12 : {bs}
frty ER12 : {bs}
ffty ER12 : {bs}
ssty ER12 : {bs}
snty ER12 : {bs}
eity ER12 : {bs}
nnty ER12 : {bs}
hund ER12 : {bs} hun ER12 : {bs}

---

*FUH: - end of UHF freq. number, all else is error
——————— errors for FUH
oh ER12 : {bs}
zero ER12 : {bs}
one ER12 : {bs}
two ER12 : {bs}
thri ER12 : {bs}
four ER12 : {bs}
five ER12 : {bs}
six ER12 : {bs}
sev ER12 : {bs}
eit ER12 : {bs}
nine ER12 : {bs}
-
ten ER12 : {bs}
elev ER12 : {bs}
twlv ER12 : {bs}
thrn ER12 : {bs}
frtn ER12 : {bs}
fftn ER12 : {bs}
sstn ER12 : {bs}
sntn ER12 : {bs}
eitn ER12 : {bs}
nntn ER12 : {bs}
-
twen ER12 : {bs}
trty ER12 : {bs}
frty ER12 : {bs}
ffty ER12 : {bs}
ssty ER12 : {bs}
snty ER12 : {bs}
eity ER12 : {bs}
nnty ER12 : {bs}
-
hund ER12 : {bs}
hun ER12 : {bs}
-
pont ER12 : {bs}
decm ER12 : {bs}

---

*ER7:
oh ER7
zero ER7
one ER7
two ER7
thri ER7
four ER7
five ER7
- six ER7
sev ER7
eit ER7
nine ER7
-
ten ER7 elev ER7
twlv ER7
thrn ER7
frtn ER7
fftn ER7
sstn ER7
sntn ER7
eitn ER7
nntn ER7 twen ER7
trty ER7
frty ER7
ffty ER7
ssty ER7
snty ER7
eity ER7
nnty ER7
hund ER7
hun ER7 pont ER7
decm ER7 com1 ER7
unif ER7
uhf ER7
butn ER7
chn ER7
fre ER7
com2 ER7
vict ER7
vhf ER7
takn ER7
ils ER7
iff ER7
skwk ER7

*ER8:
oh ER8 : {bs}
zero ER8 : {bs}
one ER8 : {bs}
two ER8 : {bs}
thri ER8 : {bs}
four ER8 : {bs}
five ER8 : {bs}
six ER8 : {bs}
sev ER8 : {bs}
eit ER8 : {bs}
nine ER8 : {bs}
ten ER8 : {bs}
elev ER8 : {bs}
twlv ER8 : {bs}
thrn ER8 : {bs}
frtn ER8 : {bs}
fftn ER8 : {bs} sstn ER8 : {bs}
sntn ER8 : {bs}
eitn ER8 : {bs}
nntn ER8 : {bs}
twen ER8 : {bs}
trty ER8 : {bs}
frty ER8 : {bs}
ffty ER8 : {bs}
ssty ER8 : {bs}
snty ER8 : {bs}
eity ER8 : {bs}
nnty ER8 : {bs}
hund ER8 : {bs}
hun ER8 : {bs}
pont ER8 : {bs}
decm ER8 : {bs}
com1 ER8 : {bs}
unif ER8 : {bs}
uhf ER8 : {bs}
butn ER8 : {bs}
chn ER8 : {bs}
fre ER8 : {bs}
com2 ER8 : {bs}
vict ER8 : {bs}
vhf ER8 : {bs}
takn ER8 : {bs}
ils ER8 : {bs}
iff ER8 : {bs}
skwk ER8 : {bs}

*ER9:
oh ER9
zero ER9
one ER9
two ER9
thri ER9
four ER9
five ER9
six ER9
sev ER9
eit ER9
nine ER9
ten ER9
elev ER9
twlv ER9
thrn ER9
frtn ER9
fftn ER9
sstn ER9
sntn ER9
eitn ER9
nntn ER9
twen ER9
trty ER9
frty ER9
ffty ER9
ssty ER9 snty ER9
eity ER9
nnty ER9
hund ER9
hun ER9
pont ER9
decm ER9
com1 ER9
unif ER9
uhf ER9
butn ER9
chn ER9
fre ER9
com2 ER9
vict ER9
vhf ER9
takn ER9
ils ER9
iff ER9
skwk ER9

*ER10:
oh ER10 : {bs}
zero ER10 : {bs}
one ER10 : {bs}
two ER10 : {bs}
thri ER10 : {bs}
four ER10 : {bs}
five ER10 : {bs}
six ER10 : {bs}
sev ER10 : {bs}
eit ER10 : {bs}
nine ER : {bs}
ten ER10 : {bs}
elev ER10 : {bs}
twlv ER10 : {bs}
thrn ER10 : {bs}
frtn ER10 : {bs}
fftn ER10 : {bs}
sstn ER10 : {bs}
sntn ER10 : {bs}
eitn ER10 : {bs}
nntn ER10 : {bs}
twen ER10 : {bs}
trty ER10 : {bs}
frty ER10 : {bs}
ffty ER10 : {bs}
ssty ER10 : {bs}
snty ER10 : {bs}
eity ER10 : {bs}
nnty ER10 : {bs}
hund ER10 : {bs}
hun ER10 : {bs}
pont ER10 : {bs}
decm ER10 : {bs}
com1 ER10 : {bs} unif ER10 : {bs}
uhf ER10 : {bs}
butn ER10 : {bs}
chn ER10 : {bs}
fre ER10 : {bs}
com2 ER10 : {bs}
vict ER10 : {bs}
vhf ER10 : {bs}
takn ER10 : {bs}
ils ER10 : {bs}
iff ER10 : {bs}
skwk ER10 : {bs}

*ER11:
oh ER11
zero ER11
one ER11
two ER11
thri ER11
four ER11
five ER11
six ER11
sev ER11
eit ER11
nine ER11
ten ER11
elev ER11
twlv ER11
thrn ER11
frtn ER11
fftn ER11
sstn ER11
sntn ER11
eitn ER11
nntn ER11
twen ER11
trty ER11
frty ER11
ffty ER11
ssty ER11
snty ER11
eity ER11
nnty ER11
hund ER11
hun ER11
pont ER11
decm ER11
com1 ER11
unif ER11
uhf ER11
butn ER11
chn ER11
fre ER11
com2 ER11
vict ER11
vhf ER11 takn ER11
ils ER11
iff ER11
skwk ER11

•ER12:
oh ER12 : {bs}
zero ER12 : {bs}
one ER12 : {bs}
two ER12 : {bs}
thri ER12 : {bs}
four ER12 : {bs}
five ER12 : {bs}
six ER12 : {bs}
sev ER12 : {bs}
eit ER12 : {bs}
nine ER12 : {bs}
ten ER12 : {bs}
elev ER12 : {bs}
twlv ER12 : {bs}
thrn ER12 : {bs}
frtn ER12 : {bs}
fftn ER12 : {bs}
sstn ER12 : {bs}
sntn ER12 : {bs}
eitn ER12 : {bs}
nntn ER12 : {bs}
twen ER12 : {bs}
trty ER12 : {bs}
frty ER12 : {bs}
ffty ER12 : {bs}
ssty ER12 : {bs}
snty ER12 : {bs}
eity ER12 : {bs}
nnty ER12 : {bs}
hund ER12 : {bs}
hun ER12 : {bs}
pont ER12 : {bs}
decm ER12 : {bs}
com1 ER12 : {bs}
unif ER12 : {bs}
uhf ER12 : {bs}
butn ER12 : {bs}
chn ER12 : {bs}
fre ER12 : {bs}
com2 ER12 : {bs}
vict ER12 : {bs}
vhf ER12 : {bs}
takn ER12 : {bs}
ils ER12 : {bs}
iff ER12 : {bs}
skwk ER12 : {bs}

•ER13:
oh ER13 : {bs}
zero ER13 : {bs} one ER13 : {bs}
two ER13 : {bs}
thri ER13 : {bs}
four ER13 : {bs}
five ER13 : {bs} six ER13 : {bs}
sev ER13 : {bs}
eit ER13 : {bs}
nine ER13 : {bs}
ten ER13 : {bs}
elev ER13 : {bs}
twlv ER13 : {bs}
thrn ER13 : {bs}
frtn ER13 : {bs}
fftn ER13 : {bs}
sstn ER13 : {bs}
sntn ER13 : {bs}
eitn ER13 : {bs}
nntn ER13 : {bs}
twen ER13 : {bs}
trty ER13 : {bs}
frty ER13 : {bs}
ffty ER13 : {bs}
ssty ER13 : {bs}
snty ER13 : {bs}
eity ER13 : {bs}
nnty ER13 : {bs}
hund ER13 : {bs}
hun ER13 : {bs}
pont ER13 : {bs}
decm ER13 : {bs}
com1 ER13 : {bs}
unif ER13 : {bs}
uhf ER13 : {bs}
butn ER13 : {bs}
chn ER13 : {bs}
fre ER13 : {bs}
com2 ER13 : {bs}
vict ER13 : {bs}
vhf ER13 : {bs}
takn ER13 : {bs}
ils ER13 : {bs}
iff ER13 : {bs}
skwk ER13 : {bs}

-F2 FOR GD -- SPEECH F2           AET
- FILE IS F2.GD.2.new
-        derived from F2.GD.2
-        derived from F2.PH.4.29 (den)
-        (seh) new acronum for cancel is canc
-Cancel states have been added as "cncl CANC". CANC is the cancel
-state from any point in the utterance and has not yet been defined
-However, CANC should return you to SOM (start of message).

---

SOM: --start of message...this is state 0
takn TAC - "TACAN"... will have ddd, range 000-126
ils ILS - "I-L-S" ... will have ddd.d, range 108.1-111.9 iff SKWK - "I-F-F" ... will have dddd, range 0000-7777
skwk SKWK - "SQUAK" ... will have dddd, range 0000-7777 (same as I-F-F)
——————————start errs from SOM
— error state = ER: only one error = {bs} bad syntax
one ER : {bs} - all numbers must be identified first, as above
oh ER : {bs}
zero ER : {bs}
two ER : {bs}
thri ER : {bs}
four ER : {bs}
five ER : {bs}
six ER : {bs}
sev ER : {bs}
eit ER : {bs}
nine ER : {bs}
ten ER : {bs}
elev ER : {bs}
twlv ER : {bs}
thrn ER : {bs}
frtn ER : {bs}
fftn ER : {bs}
sstn ER : {bs}
sntn ER : {bs}
eitn ER : {bs}
nntn ER : {bs}
twen ER : {bs}
trty ER : {bs}
frty ER : {bs}
ffty ER : {bs}
ssty ER : {bs}
snty ER : {bs}
eity ER : {bs}
nnty ER : {bs}
hun ER : {bs}
hund ER : {bs}

TAC: -ready for TACAN frequency
- range 0-126
oh TAC0
zero TAC0
one TAC1
-zzk TAC1
canc CANC
——————— start of errs for TAC
two ER1 : {bs} - must have 1 or 0 next
thri ER1 : {bs}
four ER1 : {bs}
five ER1 : {bs}
six ER1 : {bs}
sev ER1 : {bs}
eit ER1 : {bs}
nine ER1 : {bs}
ten ER1 : {bs}
elev ER1 : {bs}
twlv ER1 : {bs}
thrn ER1 : {bs}

```
frtn ER1 : {bs}
fftn ER1 : {bs}
sstn ER1 : {bs}
sntn ER1 : {bs}
eitn ER1 : {bs}
nntn ER1 : {bs}
twen ER1 : {bs}
trty ER1 : {bs}
frty ER1 : {bs}
ffty ER1 : {bs}
ssty ER1 : {bs}
snty ER1 : {bs}
eity ER1 : {bs}
nnty ER1 : {bs}
hun ER1 : {bs}
hund ER1 : {bs}
takn ER1 : {bs}
ils ER1 : {bs}
iff ER1 : {bs}
skwk ER1 : {bs}
```
---
TAC0:  - saw TACAN 0; 2 digits left, range 00-99
-
```
oh TC2A  - go look for last number, 0-9
zero TC2A  - "
one TC2A  - "
two TC2A  - "
thri TC2A  - "
four TC2A  - "
five TC2A  - "
six TC2A  - "
sev TC2A  - "
eit TC2A  - "
nine TC2A  - "

ten FTAC   -all teens finish TACAN code after 0
elev FTAC
twlv FTAC
thrn FTAC
frtn FTAC
fftn FTAC
sstn FTAC
sntn FTAC
eitn FTAC
nntn FTAC
twen TC2B  - go look for last digit, 1-9
trty TC2B
frty TC2B
ffty TC2B
ssty TC2B
snty TC2B
eity TC2B
nnty TC2B canc CANC
```
---------- start errs for TAC0
-     all go to ER1 (Bad Area Code)

hun ER1 : {bs}

---

TAC1: - saw TACAN 1; 2 digits left, range 00-26
-
oh TC2A - go look for last number, 0-9
zero TC2A - "
one TC2A - "
thri TC2A - "
four TC2A - "
five TC2A - "
six TC2A - "
sev TC2A - "
eit TC2A - "
nine TC2A - "

twen TC2D - go look for last number, 1-6 (might terminate)

two TC2C - go look for last number, 0-6 ten FTAC  - teens can end TACAN after 1
elev FTAC
twlv FTAC
thrn FTAC
frtn FTAC
fftn FTAC
sstn FTAC
sntn FTAC
eitn FTAC
nntn FTAC
hun TACH - for one hundred (and) xx
hund TACH
canc CANC - cancel state
——————— start errs for TAC1
-    ER1 is Bad TACAN number. These would be to high
-       for the range required (0-126)
trty ER1 : {bs}
frty ER1 : {bs}
ffty ER1 : {bs}
ssty ER1 : {bs}
snty ER1 : {bs}
eity ER1 : {bs}
nnty ER1 : {bs}

---

*TACH: - saw "one hundred (and)"
-    look for 1-26 only
one FTAC - 1-9 completes TACAN #
two FTAC
thri FTAC
four FTAC
five FTAC
six FTAC
sev FTAC
eit FTAC
nine FTAC
ten FTAC   -all teens finish TACAN number after one hundred
elev FTAC
twlv FTAC
thrn FTAC

```
frtn FTAC
fftn FTAC
sstn FTAC
sntn FTAC
eitn FTAC
nntn FTAC
twen TC2D  - go look for 1-6 to complete TACAN #
canc CANC  - cancel state
───────────── start errs after TACH
-       we saw 1st digit; only 0/1 valid
-   else go to ER1 (Bad Area Code)
oh ER1 : {bs}
zero ER1 : {bs}
trty ER1 : {bs}
frty ER1 : {bs}
ffty ER1 : {bs}
ssty ER1 : {bs}
snty ER1 : {bs}
eity ER1 : {bs}
nnty ER1 : {bs}
hun ER1 : {bs}   - "one hundred hundred" is not good TACAN #
hund ER1 : {bs}
─────────────────────────
TC2A: -saw 2 digits in TACAN, need one more in 0-9
oh FTAC
zero FTAC
one FTAC
two FTAC
thri FTAC
four FTAC
five FTAC
six FTAC
sev FTAC
eit FTAC
nine FTAC
canc CANC  -cancel state
───────────── start err xsns after TC2A
-    we saw 2 digits of TACAN #; only 0..9 valid to end
-    otherwise, ER1 (Bad TACAN)
ten ER1 : {bs}
elev ER1 : {bs}
twlv ER1 : {bs}
thrn ER1 : {bs}
frtn ER1 : {bs}
fftn ER1 : {bs}
sstn ER1 : {bs}
sntn ER1 : {bs}
eitn ER1 : {bs}
nntn ER1 : {bs}
twen ER1 : {bs}
trty ER1 : {bs}
frty ER1 : {bs}
ffty ER1 : {bs}
ssty ER1 : {bs}
snty ER1 : {bs}
eity ER1 : {bs}
``` nnty ER1 : (bs)
hun ER1 : (bs)
hund ER1 : (bs)

---

*TC2B: -saw 2 digits in TACAN as "one (hundred [and]) twenty",
- etc.; need one more in 1-9, or END HERE.
one FTAC
two FTAC
thri FTAC
four FTAC
five FTAC
six FTAC
sev FTAC
eit FTAC
nine FTAC canc CANC - cancel state
——————— start err xsns after TC2B
- we saw 2 digits of TACAN #; only 1..9 valid to end
- otherwise, ER1 (Bad TACAN)
oh ER1 : (bs)
zero ER1 : (bs)

ten ER1 : (bs)
elev ER1 : (bs)
twlv ER1 : (bs)
thrn ER1 : (bs)
frtn ER1 : (bs)
fftn ER1 : (bs)
sstn ER1 : (bs)
sntn ER1 : (bs)
eitn ER1 : (bs)
nntn ER1 : (bs)
twen ER1 : (bs)
trty ER1 : (bs)
frty ER1 : (bs)
ffty ER1 : (bs)
ssty ER1 : (bs)
snty ER1 : (bs)
eity ER1 : (bs)
nnty ER1 : (bs)

hun ER1 : (bs)
hund ER1 : (bs)

---

TC2C: -saw 2 digits in TACAN as "one two",
- etc.; need one more in 0-6
oh FTAC
zero FTAC
one FTAC
two FTAC
thri FTAC
four FTAC
five FTAC
six FTAC canc CANC -cancel state
---------------- start err xsns after TC2C
- we saw 2 digits of TACAN #; only 0..6 valid to end
- otherwise, ER1 (Bad TACAN)

sev ER1 : {bs}
eit ER1 : {bs}
nine ER1 : {bs}
ten ER1 : {bs}
elev ER1 : {bs}
twlv ER1 : {bs}
thrn ER1 : {bs}
frtn ER1 : {bs}
fftn ER1 : {bs}
sstn ER1 : {bs}
sntn ER1 : {bs}
eitn ER1 : {bs}
nntn ER1 : {bs} twen ER1 : {bs}
trty ER1 : {bs}
frty ER1 : {bs}
ffty ER1 : {bs}
ssty ER1 : {bs}
snty ER1 : {bs}
eity ER1 : {bs}
nnty ER1 : {bs} hun ER1 : {bs}
hund ER1 : {bs}

---

*TC2D: -saw 2 digits in TACAN as "one twenty",
- etc.; need one more in 1-6, or END HERE.
one FTAC
two FTAC
thri FTAC
four FTAC
five FTAC
six FTAC ASR    Appendix D

Version 1.9 Message File

[0: No Valid Data]
[1: tacan what?]
[2: ils what?]
[3: squawk what?]
[4: bad start..not cmd?]
[5: Incomplete tacan]
[6: Incomplete tacan]
[7: cancel]
[8: bad tacan #]
[9: Incomplete tacan]

[10: tacan o.k.]
[11: tacan o.k.]
[12: tacan o.k.]
[13: Incomplete tacan]
[14: tacan o.k.]
[15: too many #s for tacan]
[16: Incomplete squawk]
[17: Incomplete squawk]
[18: Incomplete squawk]
[19: bad squawk #]
[20: Incomplete squawk]
[21: squawk o.k.]
[22: squawk o.k.]
[23: too many #s for squawk]
[24: Incomplete ils]
[25: bad ils #]
[26: Incomplete ils]
[27: Incomplete ils]
[28: Incomplete ils]
[29: Incomplete ils]
[30: ils...point what?]
[31: correction]
[32: ils o.k.]
[33: ils: err after point]
[34: uhf what?]
[35: button what?]
[36: freq what?]
[37: vhf what?]
[38: Incomplete vhf]
[39: Incomplete uhf freq]
[40: Incomplete uhf freq]
[41: bad # for uhf freq]
[42: button o.k.]
[43: button o.k.]
[44: button o.k.]
[45: bad    #button]
[46: too many #s after button]
[47: bad # for vhf]
[48: Incomplete vhf]
[49: Incomplete vhf]
[50: Incomplete vhf]
[51: Incomplete vhf]
[52: Incomplete vhf]
[53: Incomplete vhf]
[54: Incomplete vhf]
[55: vhf...point what?]
[56: Incomplete vhf]
[57: vhf...point what?]
[58: vhf o.k.]
[59: vhf...point what?]
[60: vhf: err after point]
[61: er11]
[62: Incomplete uhf]
[63: Incomplete uhf]
[64: Incomplete uhf]
[65: Incomplete uhf]

[66: Incomplete uhf]
[67: uhf...point what?]
[68: Incomplete uhf]
[69: Incomplete uhf]
[70: uhf o.k.]
[71: uhf: err after point]

Version 1.9 nt.List

- file: f2/realnt.list
- AAA's are temporary nt word.
- added "nois NOISE" after zzab (removed zzyl),
  - where filter2 will ignore.
- FREI=FOUR_EIGHT (NEED F2 FIX)
  - zza =? (this is nois2=long vowels)
- REALNT.LIST with permanent names for all
- GD words filled in.(seh)
- separate -TY and -TEEN
- add zzi & zzj
- zzl = nois3 = ? zza = nois2 = ^ (nois unchanged)
- (den) added comp (CompNT), and skip (SkipNT)
- (seh) for f2 remove everything after zzl=?
- moved ? to zzb removed everything after zzb
- call ? nt $zzl to match old version of grammar
- (seh) added subl (SubNTs)

| | |
|---|---|
| aaa | AAA |
| ac | AAA |
| butn | BUTTON |
| call | AAA |
| canc | CANCEL |
| chef | _H_F |
| chn | CHANNEL |
| dng | AAA |
| clxx | AAA |
| com1 | COMM_1 |
| com2 | COMM_2 |
| comm | COMM_ |
| comp | CompNT |
| corc | CORREC_ |
| corn | CORRECTION |
| cy | _CY_ |
| decm | DECIMAL |
| dial | AAA |
| eit | EIGHT |
| eitn | EIGHTEEN |
| eity | EIGHTY |
| elev | ELEVEN |
| end | AAA |
| ennt | AAA |
| fef | _F_F |
| fftn | FIFTEEN |
| ffty | FIFTY |
| fif | FIF- |
| five | FIVE |
| form | _FORM |
| four | FOUR |
| fre | FREQUENCY |

| | |
|---|---|
| freq | FREQ_ |
| frow | AAA |
| frtn | FOURTEEN |
| frty | FORTY |
| hu80 | AAA |
| hu88 | AAA |
| hun | HUNDRED |
| hund | HUNDRED_AND |
| ie | I_ |
| iff | I_F_F |
| ils | I_L_S |
| nine | NINE |
| ninr | NINER |
| nnte | AAA |
| nntn | NINETEEN |
| nnty | NINETY |
| no | NO |
| nois | I |
| numb | NUMBER |
| oh | OH |
| one | ONE |
| pls | AAA |
| pont | POINT |
| sev | SEVEN |
| six | SIX |
| skip | SkipNT |
| skwk | SQUAWK |
| snte | AAA |
| sntn | SEVENTEEN |
| snty | SEVENTY |
| sstn | SIXTEEN |
| ssty | SIXTY |
| subl | SubNTs |
| takn | TACAN |
| teen | TEEN |
| ten | TEN |
| thir | THIR_ |
| thri | THREE |
| thrn | THIRTEEN |
| tion | _TION |
| tnty | TWENTY |
| trty | THIRTY |
| tuow | TWO_OH |
| twen | TWEN_ |
| twlv | TWELVE |
| two | TWO |
| ty | _TY |
| ue | U_ |
| uhf | U_H_F |
| uni | UNI_ |
| unif | UNIFORM |
| ve | V_ |
| vhf | V_H_F |
| vict | VICTOR |
| yes | YES |
| zero | ZERO |
| zza | ^ |
| zzl | ? |

Appendix F

Phonemic Alphabet

Phonemic Symbols

| Vowels | Glides | Stops | Fricatives |
|---|---|---|---|
| I bEEt | y Yet | p Pig | s Sing |
| i bit | w Wet | b Big | z Zoo |
| e bAIt | W WHet | t Top | S SHove |
| E bEt |  | d Dig | Z meaSure |
| A bAt | Liquids | k Key | f File |
| a fAther | R Road | g Give | v Very |
| O bOught | r buttER | K Cold | Q THin |
| o cOAt | L Lamp | G Got | q THese |
| U pUt | l middLE | I buTTon | h Hot |
| u bOOt |  |  |  |
| & bUt | Nasals | Affricates | Special (paired with vowel) |
| Y 'high' & | m MoM | tS CHurCH | x some nasality e.g. /Ix/ |
|  | n NoNe | dZ JuDGe | X strongly nasal e.g. /IX/ |
|  | N saNG |  | H whispered e.g. /aH/ |

Non Speech    # Inhale    % exhale    * other noise

---

What is claim is:

1. In a digital computer, a method of recognizing speech, comprising the steps of:
   entering a cohesive speech segment;
   determining gross acoustic attributes of the entered segment;
   determining fine acoustic attributes of the entered segment;
   assigning at least one subsyllable to the entered segment based on the gross and fine acoustic attributes determined;
   repeating the foregoing steps on successive cohesive speech segments to generate at least one sequence of subsyllables;
   converting the sequence of subsyllables into a sequence of syllables by finding the sequence of subsyllables in a table in which predetermined subsyllable sequences correspond with respective syllables and syllable sequences;
   combining the converted sequence of syllables into words;
   verifying the conformance of the words to a stored first predetermined set of grammatical rules; and
   reporting a recognition result.

2. A method of recognizing speech as claimed in claim 1, wherein said gross acoustic attributes include silence, fricative, vowel and change interval.

3. A method of recognizing speech as claimed in claim 1, wherein said fine acoustic attributes include duration of a silence, strength or weakness of a fricative, articulatory quality of a vowel, the rising or falling amplitude of a change interval.

4. A method of recognizing speech as claimed in claim 1, wherein a primary and a secondary subsyllable spelling is assigned to the entered segment based on the gross and fine acoustic attributes.

5. A method of recognizing speech as claimed in claim 4, wherein penalty points are assessed to analyzed sequences of speech segments that use a secondary subsyllable to generate a match 6. A method of recognizing speech as claimed in claim 5, wherein the sequence of speech segments with the least number of penalty points is considered the recognized result.

7. A method of recognizing speech as claimed in claim 1, further comprising the step of comparing a string of subsyllables to a predetermined set of subsyllable grammar tables.

8. A method of recognizing speech as claimed in claim 7, wherein said subsyllable grammar tables contain spellings of words or parts of words.

9. A method of recognizing speech as claimed in claim 1, further comprising the step of verifying the conformance of a group of words to a predetermined set of word to phrase grammar rules.

10. An apparatus for speech recognition comprising:
means for entering a cohesive speech segment;
means for determining gross acoustic attributes of the entered segment;
means for determining fine acoustic attributes of the entered segment;
means for assigning at least one subsyllable to the entered segment based on the gross and fine acoustic attributes determined;
means for repeating the foregoing steps on successive cohesive speech segments to generate at least one sequence of subsyllables;
means for converting the sequence of subsyllables into a sequence of syllables by finding the sequence of subsyllables in a table in which determined subsyllable sequences correspond with respective syllables and syllable sequences;
means for combining the converted sequence of syllables into words;
means for verifying the conformance of the words to a stored first predetermined set of grammatical rules; and
means for reporting a recognition result.

11. An apparatus for speech recognition as claimed in claim 10, wherein said gross acoustic attributes include silence, fricative, vowel and change interval.

12. An apparatus for speech recognition as claimed in claim 10, wherein said fine acoustic attributes include duration of a silence, strength or weakness of a fricative, articulatory quality of a vowel, the rising or falling amplitude of a change interval.

13. An apparatus for speech recognition as claimed in claim 10, wherein a primary and a secondary subsyllable spelling is assigned to the entered segment based on the gross and fine acoustic attributes.

14. An apparatus for speech recognition as claimed in claim 13, wherein penalty points are assessed to analyzed sequences of speech segments that use a secondary subsyllable to generate a match.

15. An apparatus for speech recognition as claimed in claim 14, wherein the sequence of speech segments with the least number of penalty points is considered the recognized result.

16. An apparatus for speech recognition as claimed in claim 10, further comprising means for storing subsyllable grammar rules and word to phrase grammar rules in lookup tables.

17. An apparatus for speech recognition as claimed in claim 10, wherein the combining means addresses lookup tables of rules relating to both correct and incorrect grammatical usages of subsyllables and words.

18. An apparatus for speech recognition as claimed in claim 10, further comprising means for comprising a string of subsyllables to said predetermined set of subsyllable grammar tables.

19. An apparatus for speech recognition as claimed in claim 18, wherein said subsyllable grammar table contain spellings of words or parts of words.

20. An apparatus for speech recognition as claimed in claim 10, further comprising a means for verifying the conformance of a group of words to said predetermined set of word to phrase grammar rules.

* * * * *

UNITED STATES PATENT AND TRADEMARK OFFICE
CERTIFICATE OF CORRECTION

PATENT NO. : 5,222,188

DATED : June 22, 1993

INVENTOR(S) : Hutchins

It is certified that error appears in the above-identified patent and that said Letters Patent is hereby corrected as shown below:

Column 171, line 12, after "match" insert --.--.

Column 172, line 34, delete "comprising" (2nd occurrence) and insert --comparing--

Column 172, line 38, change "table" to --tables--.

Signed and Sealed this

Twenty-second Day of November, 1994

Attest:

BRUCE LEHMAN

Attesting Officer

Commissioner of Patents and Trademarks